US012587397B2

(12) United States Patent
Thongsom

(10) Patent No.: US 12,587,397 B2
(45) Date of Patent: Mar. 24, 2026

(54) MULTI DIMENSION BLOCKCHAIN

(71) Applicant: ANGEL TIME CO., LTD., Bangkok (TH)

(72) Inventor: Noppadon Thongsom, Bangkok (TH)

(73) Assignee: Angel Time Co., Ltd., Bangkok (TH)

( * ) Notice: Subject to any disclaimer, the term of this patent is extended or adjusted under 35 U.S.C. 154(b) by 264 days.

(21) Appl. No.: 18/287,408

(22) PCT Filed: Dec. 28, 2021

(86) PCT No.: PCT/TH2021/000075
§ 371 (c)(1),
(2) Date: Oct. 18, 2023

(87) PCT Pub. No.: WO2022/225468
PCT Pub. Date: Oct. 27, 2022

(65) Prior Publication Data
US 2024/0205031 A1 Jun. 20, 2024

(30) Foreign Application Priority Data

Apr. 20, 2021 (TH) ................................ 2101002243
Apr. 23, 2021 (WO) ................ PCT/TH2021/000013

(51) Int. Cl.
*H04L 9/00* (2022.01)
(52) U.S. Cl.
CPC .................................... *H04L 9/50* (2022.05)
(58) Field of Classification Search
CPC ..... H04L 9/50; H04L 67/1095; H04L 9/0891; G06F 16/9027
See application file for complete search history.

(56) References Cited

U.S. PATENT DOCUMENTS

| | | | | |
|---|---|---|---|---|
| 11,457,066 | B2 * | 9/2022 | Chakraborty | ........... H04L 63/20 |
| 11,860,863 | B1 * | 1/2024 | Bowes | .................. H04L 9/0891 |
| 12,041,160 | B2 * | 7/2024 | Manevich | ............. H04L 9/3247 |
| 2019/0058696 | A1 * | 2/2019 | Bowman | .............. H04L 9/0897 |
| 2019/0340267 | A1 * | 11/2019 | Vo | ....................... G06F 16/2365 |
| 2019/0340369 | A1 | 11/2019 | Hadi | |
| 2019/0386969 | A1 | 12/2019 | Verzun et al. | |
| 2020/0007313 | A1 * | 1/2020 | Vouk | ....................... H04L 63/12 |

(Continued)

OTHER PUBLICATIONS

International Search Report and Written Opinion for Application No. PCT/TH2021/000075, mailed on Apr. 14, 2022, 19 pages.

(Continued)

*Primary Examiner* — Olugbenga O Idowu
(74) *Attorney, Agent, or Firm* — Sheppard Mullin Richter & Hampton LLP

(57) ABSTRACT

The present disclosure provides a multi dimension blockchain which comprises a main blockchain, a control blockchain and an owner blockchain. The main blockchain stores data in blocks. The control blockchain allows a user allocated as the owner of a data block to modify or forward data stored in that data block. The owner blockchain and the control blockchain allow modifications or forwarding of the data stored in the main blockchain to be recorded in a traceable way. Methods of modifying data stored on the main blockchain, methods of forwarding data stored on the main blockchain and methods of authenticating the data stored on the main blockchain are provided.

18 Claims, 20 Drawing Sheets

(56) References Cited

U.S. PATENT DOCUMENTS

| | | | |
|---|---|---|---|
| 2020/0068573 A1* | 2/2020 | Drozd | H04W 12/08 |
| 2020/0099513 A1* | 3/2020 | Angelo | H04L 63/12 |
| 2020/0160947 A1 | 5/2020 | Rasovsky et al. | |
| 2020/0167319 A1* | 5/2020 | Fritz | G06F 16/1824 |
| 2020/0174990 A1* | 6/2020 | Pratkanis | H04L 9/0637 |
| 2020/0252202 A1* | 8/2020 | Madl | H04L 63/12 |
| 2020/0304290 A1* | 9/2020 | Coulmeau | G06F 21/645 |
| 2020/0320204 A1* | 10/2020 | Venable, Sr. | H04L 9/0637 |
| 2020/0341702 A1 | 10/2020 | Kosaka | |
| 2021/0067321 A1* | 3/2021 | Lu | G06F 16/9027 |
| 2021/0090037 A1 | 3/2021 | Dowding | |
| 2022/0224540 A1* | 7/2022 | Chaudhry | G06F 21/6245 |
| 2022/0231834 A1* | 7/2022 | Das | H04L 63/123 |
| 2022/0407681 A1* | 12/2022 | Shpilrain | H04L 9/3239 |
| 2023/0040025 A1* | 2/2023 | Andreina | G06F 21/64 |
| 2023/0073337 A1* | 3/2023 | Chan | G06Q 20/405 |
| 2023/0259930 A1* | 8/2023 | Liu | G06Q 20/389 |
| | | | 705/75 |
| 2023/0360046 A1* | 11/2023 | Zhu | G06Q 40/123 |

OTHER PUBLICATIONS

International Preliminary Report on Patentability for Application No. PCT/TH2021/000075, mailed on Jul. 14, 2023, 33 pages.
International Search Report and Written Opinion for Application No. PCT/TH2021/000013, mailed on Jul. 22, 2021, 17 pages.

* cited by examiner

MULTI DIMENSION BLOCKCHAIN

CROSS-REFERENCE TO RELATED APPLICATIONS

This application is a National Phase Applications of International Patent Application No. PCT/TH2021/000075, filed on Dec. 28, 2021, which is based on and claims priority to and benefits of Thailand application Ser. No. 21/010, 02243 filed on Apr. 20, 2021 and International Patent Application No. PCT/TH2021/000013, filed on Apr. 23, 2021. The entire content of all of the above-referenced applications is incorporated herein by reference.

TECHNICAL FIELD

The present disclosure relates to blockchain systems and in particular blockchain to the control of modification or forwarding of data stored on a blockchain system.

BACKGROUND

A blockchain is a database system on which digital information is stored. Unlike a conventional databased in which data is stored in a row and column data structure, in a blockchain data is stored in linked data blocks. Each block has an associated timestamp. Each block stores various segments including a header, a timestamp and a data segment which stores the main data of the block. The block also stores a link to the previous block in the form of a hash value which is a unique value representing the previous block which connects the current block to the previous block.

A hash value is a unique value determined by a hash function. A hash function is a mathematical algorithm which transforms digital data to a unique value. This unique value may be in the form a 64-digit hexadecimal number. A hash function is a one-way function as the original data cannot be determined from the hash value. The hash value may be considered as a fingerprint of the digital data.

Hash values play a vital role in blockchain systems, as it is very hard for a hacker to change the information without detection. Any change, no matter how small, of data in a block will result in a change in the hash value and will therefore be detectable as the result of applying the hash function to the data in the block will not match the hash value stored in the next block. Therefore, a blockchain system can be considered as an immutable system as any changes to the stored data can be detected.

In addition to the use of hash values, blockchain systems utilize distributed storage among a number of nodes to provide certainty and trust. Taken as a whole, the nodes of a blockchain store multiple copies of each block and perform reconciliation of the stored data from time to time. If there is any mismatch of a block, the correct data can be determined based on what a majority of nodes deem to be correct.

As described above, the immutable nature of the data stored on a blockchain is a key advantage in many applications of blockchain technology. However, this feature can cause problems in some applications of blockchain to store data. Some jurisdictions have laws which restrict how data can be stored and used. For example, the European Union has introduced the General Data Protection Regulation (GDPR). Such laws often provide a user with a right to control and delete personal data. Thus, the immutable nature of data stored on a blockchain gives rise to obstacles in the implementation of blockchain in certain industries.

In industries such as banking, insurance, e-ticketing, hospitality and tourism once a contract or agreement has been completed, a customer or client may wish to have their personal data deleted. However, conventional blockchain systems do not provide for the deletion of data. Similarly, in educational or healthcare settings detailed personal data may need to be stored for students or patients, however once a course or treatment has ended this data cannot be deleted from a conventional blockchain system.

US Patent Application 2017/0338947 A1 describes a Rewritable Blockchain. U.S. Pat. No. 9,774,578 B1 describes Distributed key secret for rewritable blockchain. US Patent Application 2019/0158475 A1 describes a Hybrid Blockchain.

SUMMARY

The present disclosure provides a multi dimension blockchain which comprises a main blockchain, a control blockchain and an owner blockchain. The main blockchain stores data in blocks. The control blockchain allows a user allocated as the owner of a data block to modify or forward data stored in that data block. The owner blockchain and the control blockchain allow modifications or forwarding of the data stored in the main blockchain to be recorded in a traceable way.

According to a first aspect of the present disclosure, a method of modifying data stored in a blockchain system is provided. The blockchain system comprises a main blockchain system comprising a main blockchain comprising a target block in which the data to be modified is stored, a control blockchain system comprising a modify control blockchain and an owner blockchain comprising a plurality of owner blockchains each corresponding to a respective user of the blockchain system. The method comprises: receiving a modify command request, the modify command request comprising an indication of the target block, an indication of a modify command and an indication of a user requesting the command; creating a new modify control block on the modify control blockchain, the new modify control block comprising an indication of a hash value of the target block of the main blockchain; determining a hash value of the new modify control block; modifying data stored in the target block of the main blockchain according to the modify command; storing an indication of the hash value of the new modify control block in the target block of the main blockchain; and creating a new owner block on the owner blockchain corresponding to the user, the new owner block comprising an indication of the hash value of the new modify control block.

In an embodiment, the indication of the target block is generated in response to a user selection on the owner blockchain corresponding to the user of an owner block which stores a hash value of the target block on the main blockchain.

In an embodiment the method further comprises increasing a modify count indicator stored in the target block of the main blockchain.

In an embodiment, the new modify control block further comprises an indication of a hash value of an owner block immediately preceding the new owner block on the owner blockchain corresponding to the user.

In an embodiment, the modify command request is a delete command request.

In an embodiment, the modify command request is an edit command request.

According to a second aspect of the present disclosure, a method of forwarding data stored in a blockchain system is provided. The blockchain system comprises a main blockchain system comprising a main blockchain comprising a target block in which the data to be modified is stored, a control blockchain system comprising a forward control blockchain and an owner blockchain comprising a plurality of owner blockchains each corresponding to a respective user of the blockchain system, the method comprises: receiving a forward command request, the forward command request comprising an indication of the target block, an indication of a forward command and an indication of a user requesting the command; creating a new forward control block on the forward control blockchain, the new forward control block comprising an indication of a hash value of the target block of the main blockchain, determining a hash value of the new modify control block; forwarding data stored in the target block of the main blockchain according to the forward command; storing an indication of the hash value of the new forward control block in the target block of the main blockchain; and creating a new owner block on the owner blockchain corresponding to the user, the new owner block comprising an indication of the hash value of the new forward control block.

In an embodiment, the indication of the target block is generated in response to a user selection on the owner blockchain corresponding to the user of an owner block which stores a hash value of the target block on the main blockchain.

In an embodiment, the method further comprises increasing a forward count indicator stored in the target block of the main blockchain.

In an embodiment, the new forward control block further comprises an indication of a hash value of an owner block immediately preceding the new owner block on the owner blockchain corresponding to the user.

According to a third aspect of the present disclosure a method of authenticating data stored in a blockchain system is provided. The blockchain system comprises a main blockchain system comprising a main blockchain comprising a target block in which the data to be authenticated is stored, a control blockchain system comprising a modify control blockchain and an owner blockchain comprising a plurality of owner blockchains each corresponding to a respective user of the blockchain system, the method comprises: identifying that a block of the main blockchain has been modified; accessing a modify control block of the modify control blockchain; authenticating the modify control block of the modify control blockchain; and authenticating the modified block based on the result of authenticating the modify control block of the modify control blockchain.

In an embodiment, authenticating that a block of the main blockchain has been modified comprises applying a hash function to the block and comparing the result with a hash value stored in the block.

In an embodiment, assessing a modify control block of the modify control blockchain comprises using a hash value of the modify control block stored in the block of the main blockchain as a pointer.

In an embodiment, assessing a modify control block of the modify control blockchain comprises using a hash value of the block of the main blockchain as a pointer.

In an embodiment, identifying that the block has been modified further comprises accessing a modify count indicator stored in the target block of the main blockchain.

According to a fourth aspect of the present disclosure a computer readable medium carrying computer executable instructions which when executed by a processor cause the processor to carry out a method as set out above is provided.

According to a fifth aspect of the present disclosure, a data processing system configured to carry out a method as set out above is provided.

According to a sixth aspect of the present disclosure, a portable communication device configured to carry out a method as set out above is provided.

BRIEF DESCRIPTION OF THE DRAWINGS

In the following, embodiments of the present invention will be described as non-limiting examples with reference to the accompanying drawings in which.

DETAILED DESCRIPTION

Figure 1:
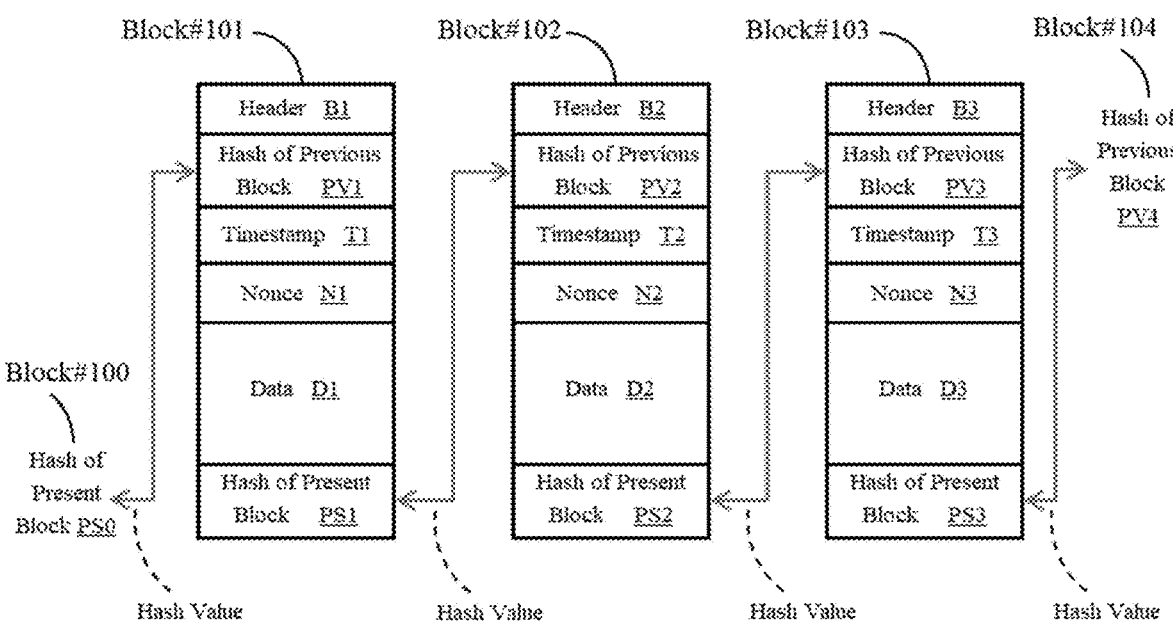
FIG. 1 shows an example of block structure and relationships in a blockchain.

FIG. 1 shows an example of block structure and relationships in a blockchain. Block #101, Block #102 and Block #103, have headers B1, B2, and B3 respectively. The previous block hash values are PV1, PV2 and PV3 respectively. Block #101, Block #102 and Block #103 were created and saved at time T1, T2 and T3 respectively, with nonce values obtained from sampling to build a block are N1, N2 and N3 respectively. Block #101, Block #102 and Block #103 store data D1, D2 and D3 respectively.

The information B1, PV1, T1, N1, and D1 of the Block #101 are processed through the hash function to get the hash value of the present block which is PS1. The hash values of Block #102 and Block #103 are determined in the same way as PS2 and PS3 respectively.

Each block stores the hash values of the previous block such that PS1=PV2 and PS2=PV3. When the next block, Block #104 is saved, the Hash of Previous Block PV4 will be PS3=PV4. Similarly, Block #101 stores the Hash of Previous Block PV1 as PS0=PV1. This allows the accuracy of the data in each data block in the blockchain to be verified by tracing the hash values linking between blocks. Any change occurring within a block makes the hash value of the block change. Therefore, the connection between each block will be detected as error, so that the blockchain system is difficult for data alteration, without detection.

Some implementations of blockchain do not include the hash value of the previous in the hashing process to make "Hash of Present Block". For example, the PS1 may be derived from the hash function of the B1, T1, N1, and D1 without bringing the PV1 a part of the hashing process.

Blockchain systems work by the principle of "Distributed Database System", bringing information as building blocks to store in a device of connection point, called "Node", within a network. One single user with his or her device can be counted as one node as well where the device is connected within a network designed to work together. The creation of block starts from that a user broadcasting its initial information into network system, and other nodes detect it and verify the accuracy of the information before converting it into the form of a block. The prototype block then is broadcasted into network system, where other nodes could collect them and store into its device system.

Figure 2:
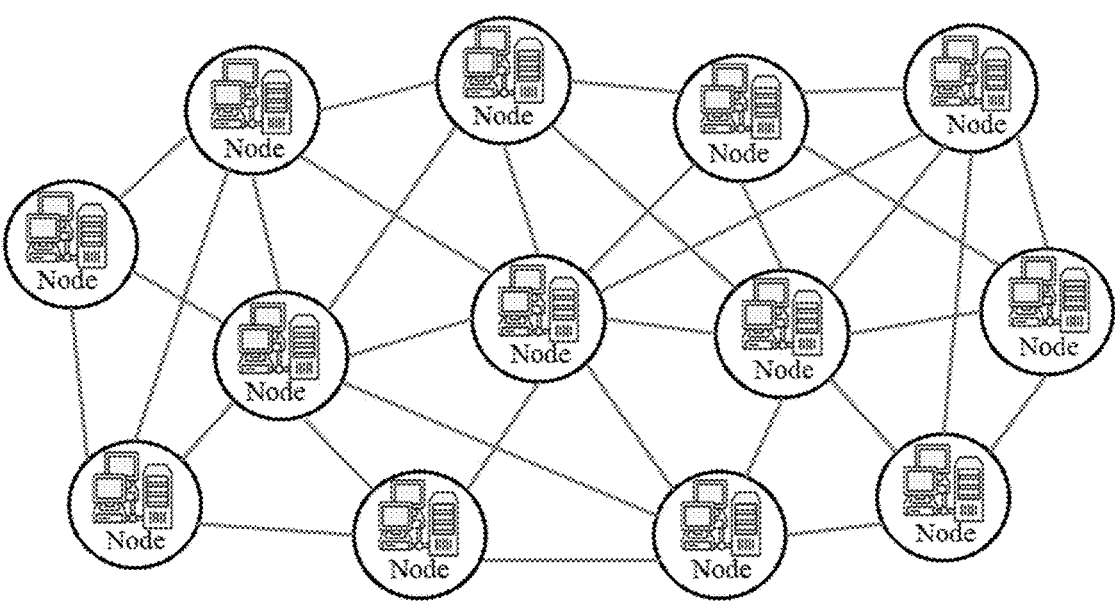
FIG. 2 shows an example of a network of nodes which store a blockchain.

FIG. 2 shows an example of a network of nodes which store a blockchain. Each node sends data, receives data and processes it in the same manner. Periodically, nodes perform data reconciliation by checking the information between each other node. If there is a block on a node that is different from other majority, being received from other nodes, the block will be corrected and updated accordingly. This creates a collaborative network that is difficult to compromise. If a party wants to make a fraud change to the attacked node, it needs more than half of the nodes in the network system to be in consensus to make a complete change. Such attacks are therefore very difficult and costly, especially on a blockchain system with a large number of nodes.

Some blockchains have many nodes, for example, approximately one hundred thousand nodes. Therefore, permission rules to determine how nodes can create a new block, called Proof of Work are defined. The rule is that the new block needs to have its hash value less than any given number. The first node coming up with solution, will have the right to create a prototype block and broadcast it into the network system. The other remaining nodes could store it next to the previous block. The node that generates the prototype block could earn a prize in the form of crypto currency coin as a return. A nonce, which is a random variable, is generated during the Proof of Work stage, once all initial data are collected into a forming block in a specified time, for example every 10 minutes, the nonce will keep changing its value until that the hash value of a forming block meet a given criteria.

A hash function is a mechanism to operate interactively with a part of data or all of it and generate a small message digest, which is the hash value. The vital features and qualifications for hash function are that the original data could not be reversed from its hash value, the hash value must be a unique value from each different original data. These qualifications make the hash value become or close to the fingerprint of its original data. Examples of Hash functions having these properties are those higher than SHA-2 (a secure hash algorithm version 2) onwards.

There are at least 3 sets of such hash functions: SHA-256, regardless of the default size, will process for a result of 256 bits or hexadecimal number (0-F or values 0, 1, 2, 3, 4, 5, 6, 7, 8, 9, A, B, C, D, E, F) of 64 digits. SHA-384, regardless of the default size, will process for a result of 384 bits or hexadecimal number of 96 digits. SHA-512, regardless of the default size, will process for a result of 512 bits or hexadecimal number of 128 digits.

In addition, other hash functions can also be used if their qualifications for non-reverse and unique of hash value are equal or superior. SHA-3, which uses a Keccak algorithm and certified by the NIST is also applicable.

Public Key Infrastructure (PKI) is a set of instructions for digital encryption to prevent information leaks during transmission through various networks, by applying an asymmetric key or a method of encrypting data with a first key and decoding with another key, making in pair.

The creation of the two-key pair is related by a mathematical algorithm. The first key, called the Public Key, is created based on the standard of X.0509, consisting of around 360 characters or 360 bytes. The Public Key of any given person is open for anyone in the system to call for data encryption or data decryption.

The other key, called the Private Key, is created at the same time in pair of Public Key, based on the standard of PKCS #8 with consisting of 3-4 times more characters than the Public Key (over 360 bytes time 3 or 4) is. The Private Key is kept privately by given person only.

When sending data to a certain person in the delivery system, the sender applies the Public Key of the recipient to encrypt the data. Even if that data is stolen or missing in error, no one would be able to decrypt it and read it. The recipient uses their Private Key to decrypt the data. This provides for very secure transmission of data. In embodiments of the present invention, users have a pair of keys: a Private Key which kept confidential and a Public Key available for other users to apply for encryption purposes. Public Key Infrastructure (PKI) is also a crucial factor applying for digital signature.

Figure 3:
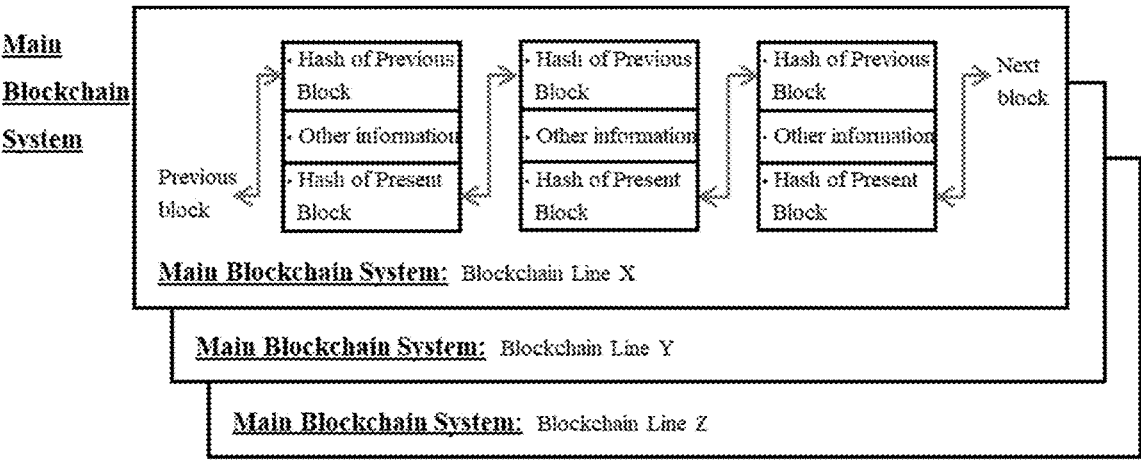
FIG. 3 shows an overview of the structure of a multi dimension blockchain system according to an embodiment of the present invention.
Figure 3:
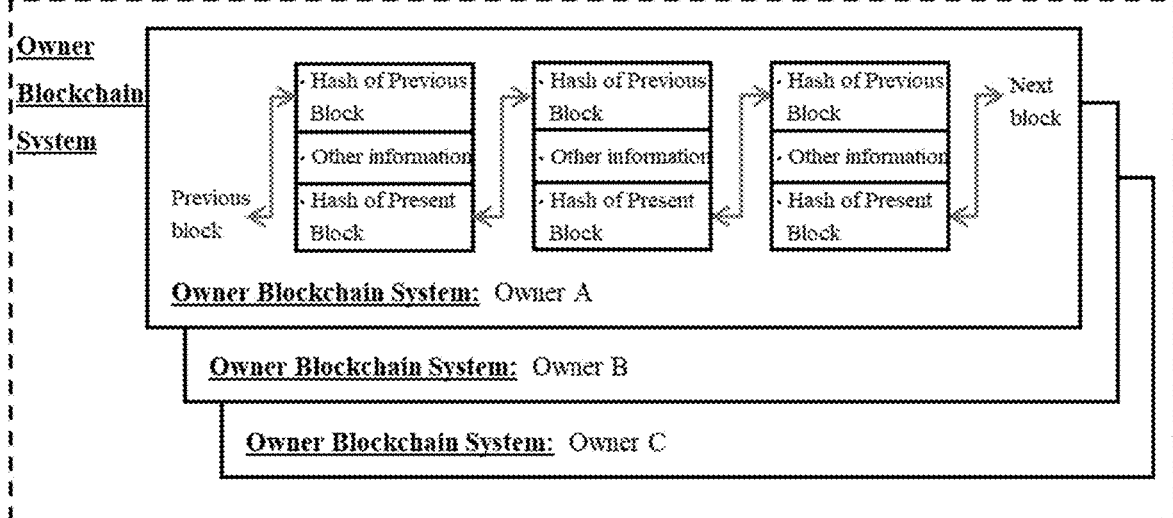
Figure 3:
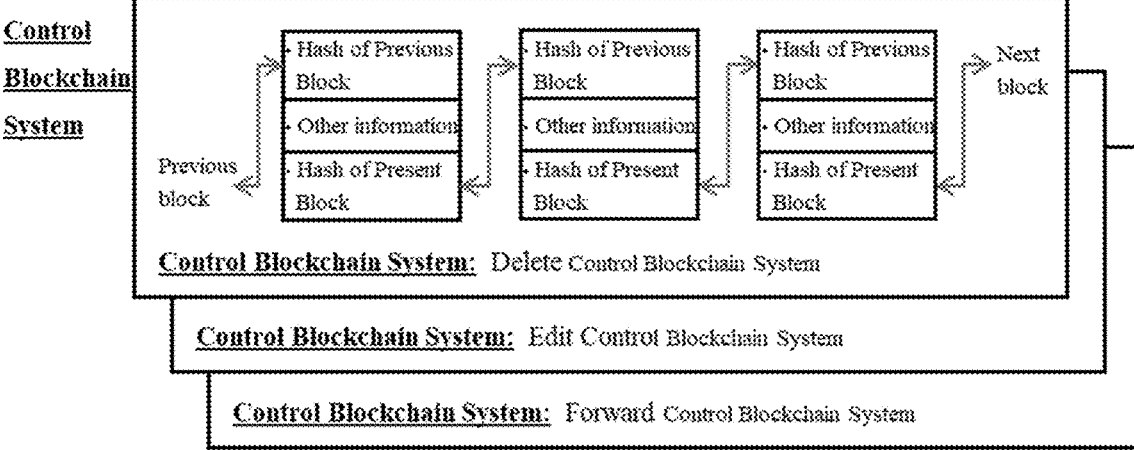

FIG. 3 shows an overview of the structure of a multi dimension blockchain system according to an embodiment of the present invention. The system comprises a Main Blockchain System, an Owner Blockchain System and a Control Blockchain System.

The Main Blockchain System contains many blockchain lines, established for different purposes of use, for example Blockchain X which could be for money transactions, Blockchain Y for medical record, and Blockchain Z for educational record.

The Owner Blockchain System contains many blockchain lines, segregated for each data owner, for example Owner A, Owner B and Owner C. If Owner A performs a financial transaction results generate a block in Blockchain X. Later Owner A goes to see the doctor, his medical record then appears as a block in Blockchain Y. Since Owner A is a student, his educational transcript is a block in Blockchain Z.

The Control Blockchain System consists of Delete Control Blockchain System, Edit Control Blockchain System and Forward Control Blockchain System. In case of that Owner A wants to send his medical record to Owner B, he can manage to do it associated with Forward Control Blockchain System, by calling his medical record from Blockchain Y and forwarding it to Owner B.

A data block within Main Blockchain System is named as "main block". A data block within Delete Control Blockchain System is named as "delete-command block". A data block within Edit Control Blockchain System is named as "edit-command block".

A data block within Forward Control Blockchain System is named as "forward-command block".

Figure 4:
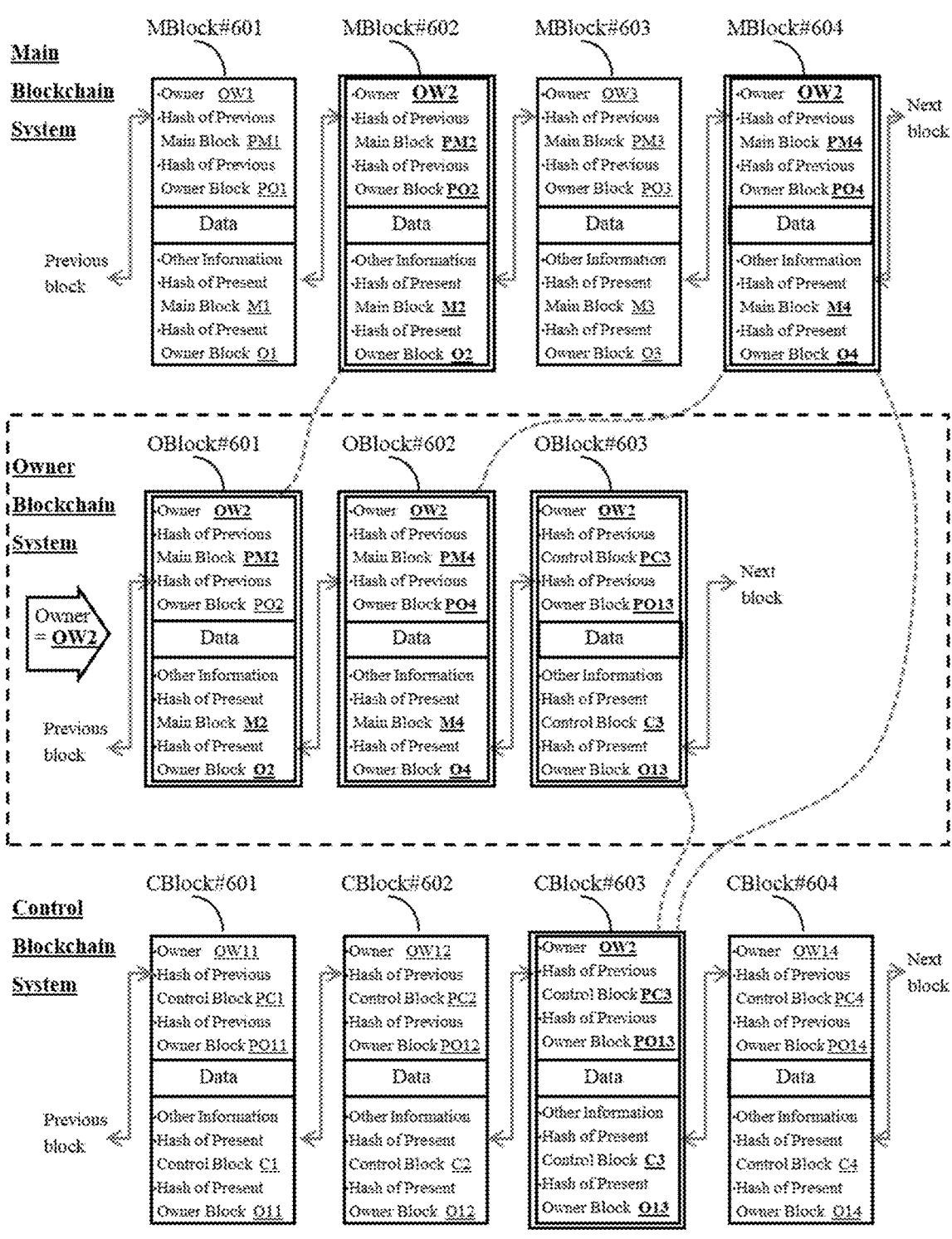
FIG. 4 shows the relationships between blocks in a multi dimension blockchain system according to an embodiment of the present invention.

FIG. 4 shows the relationships between blocks in a multi dimension blockchain system according to an embodiment of the present invention. The Main Blockchain has sample blocks MBlock #601, MBlock #602, MBlock #603 and MBlock #604, the Control Blockchain System has blocks CBlock #601, CBlock #602, CBlock #603 and CBlock #604, and the Owner Blockchain System has blocks OBlock #601, OBlock #602 and OBlock #603.

The blocks contain several fields which are described in more detail below, but for the present description, the key is the "Hash Value" of data within the block:

Hash of Present Main Block is the hash value of those data in the current block within Main Blockchain System.

Hash of Previous Main Block is the hash value of those data in the immediate previous block, before connecting to the current block, within Main Blockchain System. This hash value is contained in the current block and being used as a pointer to link with the previous block. This enables the connection between each block and results in a chain from end to end, for Main Blockchain System.

Hash Of Present Control Block is the hash value of the current block within Control Blockchain System.

Hash of Previous Control Block is the hash value of those data in the immediate previous block, before connecting to the current block, within Control Blockchain System. This hash value is contained in the current block and being used as a pointer to link with the previous block. This enables the connection between each block and results in a chain from end to end, for Control Blockchain System.

Hash of Present Owner Block is the hash value of some selective data associated with owner identity and block identity, either within Main Blockchain System or Control Blockchain System where the block is created.

Hash of Previous Owner Block is the hash value of some selective data associated with owner identity and block identity, in the immediate previous block, either within Main Blockchain System or Control Blockchain System where the block is created. This hash value is contained in the current block and being used as a pointer to link with the previous block. This makes another blockchain line for certain owner and enables the connection between each block of his or her, resulting in a chain from end to end, for Owner Blockchain System.

The sequence of each block within a certain blockchain line will also be recorded in the linked list, and the hash value of block will work as a pointer for pointing to the previous block.

As shown in FIG. 4, the blocks describe the relationship within Main Blockchain System as follows:

MBlock #601; the data owner is OW1, with "Hash Value"=M1,

Where Hash of Previous Main Block=PM1

And Hash of Present Owner Block=O1

MBlock #602; the data owner is OW2, with "Hash Value"=M2,

Where Hash of Previous Main Block=PM2=M1

And Hash of Present Owner Block=O2

MBlock #603; the data owner is OW3, with "Hash Value"=M3,

Where Hash of Previous Main Block=PM3=M2

And Hash of Present Owner Block=O3

MBlock #604; the data owner is OW2, with "Hash Value"=M4,

Where Hash of Previous Main Block=PM4=M3

And Hash of Present Owner Block=O4

Therefore, those blocks in this Main Blockchain System as shown in the example will be linked by the hash values as follows:

M1→PM2 (later emerged M2), M2→PM3 (later merged M3) and M3→PM4 (later merged M4) continuously.

(→indicates as the pointer or link between blocks.)

The blocks in the Main Blockchain System enable another dimension of connecting blocks for the same owner in Owner Blockchain System which in the example shows data owner of OW2 as follows:

OBlock #601 retrieves MBlock #602 to connect with the previous block of the owner OW2.

Therefore, OBlock #601=MBlock #602

Where Hash of Previous Owner Block=PO2

And Hash of Present Owner Block=O2

OBlock #602 retrieves MBlock #604 to connect with OBlock #601. Therefore, OBlock #602=MBlock #604

Where Hash of Previous Owner Block=PO4=O2

And Hash of Present Owner Block=O4

Therefore, those blocks in this Owner Blockchain System as shown in the example will be linked by the hash values as follows:

O2→PO4 (later merged O4) and so on.

(→indicates as the pointer or link between blocks.)

The relationship of blocks in the Control Blockchain System is as follows:

CBlock #601; the data owner who wants to edit or delete or forward the data is OW11, with "Hash Value"=C1, Where Hash of Previous Control Block=PC1

And Hash of Present Owner Block=O11

CBlock #602; the data owner who wants to edit or delete or forward the data is OW12, with "Hash Value"=C2, Where Hash of Previous Control Block=PC2=C1

And Hash of Present Owner Block=O12

9

CBlock #603; the data owner who wants to edit or delete
or forward the data is OW2, with "Hash Value"=C3,
Where Hash of Previous Control Block=PC3=C2
And Hash of Present Owner Block=O13
CBlock #604; the data owner who wants to edit or delete
or forward the data is OW14, with "Hash Value"=C4,
Where Hash of Previous Control Block=PC4=C3
And Hash of Present Owner Block=O14
Therefore, those blocks in this Control Blockchain Sys-
tem as shown in the example will be linked by the hash
values as follows:
C1→PC2 (later emerged C2), C2→PC 3 (later emerged
C3) and C3→PC4 (later emerged C4) continuously.
(→indicates as the pointer or link between blocks.)

Moreover, those blocks in this Control Blockchain Sys-
tem are enabling another dimension of connecting blocks for
the same owner in Owner Blockchain System which in the
example shows the data owner of OW2 as follows:
OBlock #603 retrieves CBlock #603 to connect with
OBlock #602. Therefore,
OBlock #603=CBlock #603
Where Hash of Previous Owner Block=PO13=O4
And Hash of Present Owner Block=O13
Therefore, those blocks in this Owner Blockchain System
as shown in the example will be linked by the hash
values as follows:
O2→PO4 (later emerged O4) and O4→PO13 (later
emerged O13) and so on.
(→indicates as the pointer or link between blocks.).

In summary, Main Blockchain System, containing various
lines of main blockchain, is related with Control Blockchain
System for any further administrations of data which is
subdivided into at least three dimensions; Delete Control
Blockchain System, Edit Control Blockchain System and
Forward Control Blockchain System. In some implementa-
tions, Control Blockchain System may add more dimensions
to further operate and coordinate with Main Blockchain
System and Owner Blockchain System.

Owner Blockchain System is typically subdivided into
several dimensions, depending on the number of data own-
ers in Main Blockchain System, as one data owner for one
blockchain line.

Figure 5:
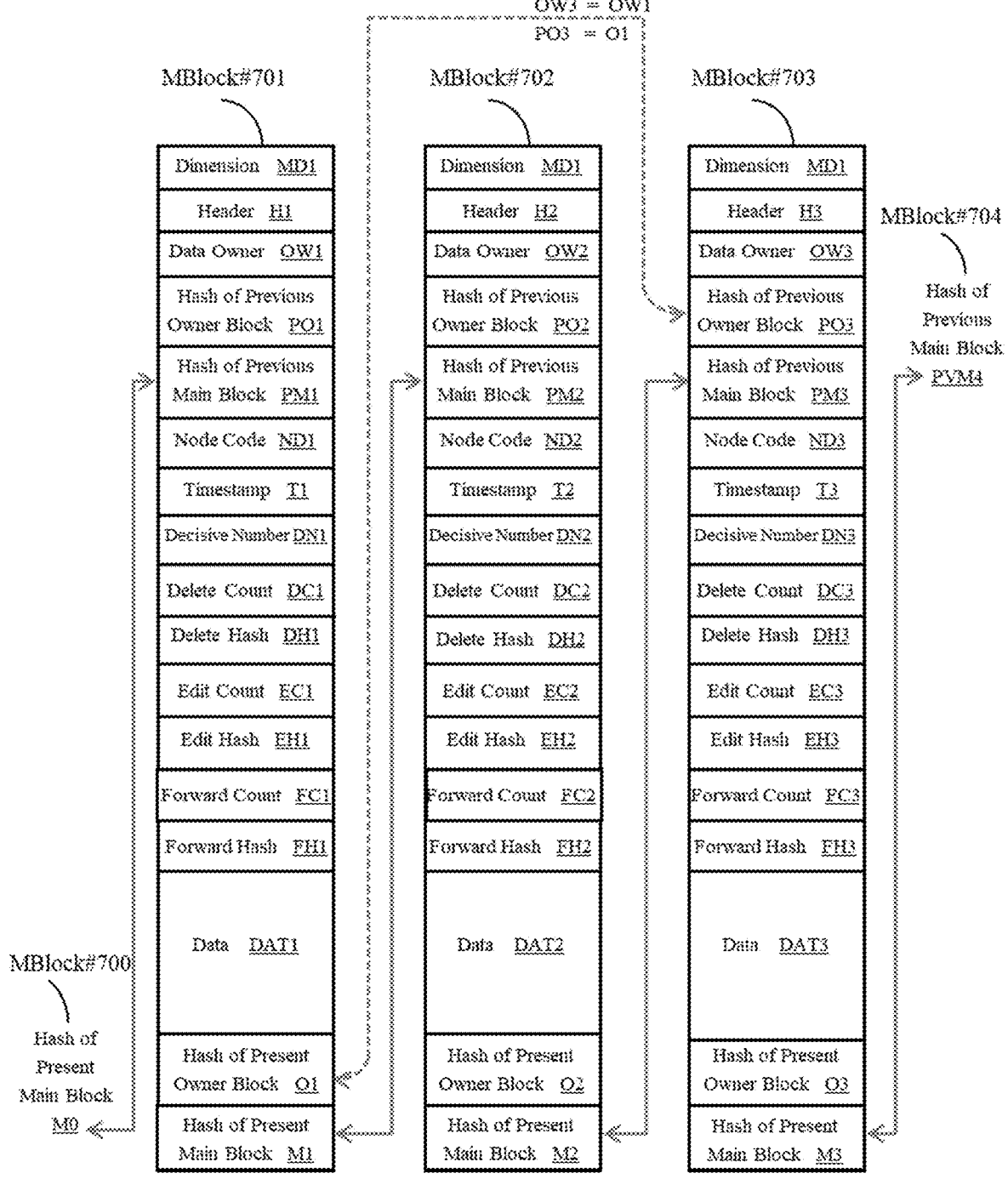
FIG. 5 shows the data fields and segments of main blocks of a Main Blockchain System according to an embodiment of the present invention.

FIG. 5 shows the data fields and segments of main blocks
of a Main Blockchain System according to an embodiment
of the present invention. As shown in FIG. 5, the Main
Blockchain comprise sample blocks MBlock #701, MBlock
702 and MBlock #703.

Dimension MD1 identifies the blockchain line within the
system. Header H1, H2 and H3 indicates the name of the
block as the identity of each block within the system. Data
Owner OW1, OW2 and OW3 is an owner of information.
The owner who has the right to block information, may be
individual person or a group of individual people together.

Hash of Previous Owner Block PO1, PO2 and PO3 is the
"Hash Value" of some certain data associated with the owner
identity and block identity, of the previous block of the same
owner.

Hash of Previous Main Block PM1, PM2 and PM3 is the
"Hash Value" of the previous block within Main Blockchain
System. In the example MBlock #700 is the first block in the
series and has a "Hash Value" of M0. Therefore, PM1=M0;
PM2=M1; and PM3=M2. In some implementations, the
genesis block (the very first block in the series) will not have
any previous block before, so the Hash of Previous Main
Block may be set as zero.

Node Code ND1, ND2 and ND3 identifies a node which
creates the prototype block and broadcast it into the system, before other nodes could deploy and record it into their
operation system. However, in some implementations, there
could be an additional blockchain dimension, by adding data
fields of "Hash of Previous Node Block" and "Hash of
Present Node Block", to cope with node record of creating
blocks into each various blockchain system.

Timestamp T1, T2 and T3 is the time information when
the block was created. Decisive Number DN1, DN2 and
DN3 is a complement parameter that the hash value of block
being created matches the conditions of Main Blockchain
System, before broadcasting it into the system.

Delete Count DC1, DC2 and DC3 is a count of the
number of times that the information kept inside the block
is deleted, with rules as follows: Delete Count=0, is that
there is no deletion of information inside the block at all.
Delete Count=1, is that the information inside the block was
deleted once and for all. In some implementations, Delete
Count can contain either 0 or 1, since the information can
only be deleted once and all information has gone.

Delete Hash DH1, DH2 and DH3 is the hash value of the
delete-command block within Delete Control Blockchain
System, which commands for deleting data kept inside this
block of Main Blockchain System, with rules as follows: If
there is no deletion of information inside the block, there-
fore, Delete Hash=0. If the information kept inside the block
is getting a command for deletion and the data has been
deleted, Delete Hash will keep the Hash Value of the
delete-command block, which exists within Delete Control
Blockchain System. Therefore, Delete Hash="Hash Value"
of delete-command block.

Edit Count EC1, EC2 and EC3 is a count of the number
of times that the information kept inside the block is edited,
with rules as follows: Edit Count=0, is that there is no
editing of information inside the block at all. Edit
Count="number", identifies the number of times the infor-
mation was edited, by an edit-command block which exists
within Edit Control Blockchain System.

Edit Hash EH1, EH2 and EH3 is the hash value of the
edit-command block within Edit Control Blockchain Sys-
tem, which commands for editing data kept inside this block
of Main Blockchain System, with rules as follows: If there
is no editing of information inside the block, therefore, Edit
Hash=0. If the information kept inside the block has
received a command for editing and the data has been edited,
Edit Hash will keep the latest Hash Value of the edit-
command block, which exists within Edit Control Block-
chain System. Therefore, Edit Hash=the latest "Hash Value"
of edit-command block. In some implementations, the cor-
rection of spelling errors or others relevant personal data are
allowed for modification and data improvement.

Forward Count FC1, FC2 and FC3 is a count of the
number of times that the information kept inside the block
is forwarded, with rules as follows: Forward Count=0, is that
there is no forward of information in the block before.
Forward Count="number", identifies the number of times
the information was forwarded, by a forward-command
block which exists within Forward Control Blockchain
System.

Forward Hash FH1, FH2 and FH3 is the hash value of the
forward-command block within Forward Control Block-
chain System, which commands for forwarding data kept
inside this block of Main Blockchain System, with rules as
follows: If there is no forward of information inside the
block, therefore, Forward Hash=0. If the information kept
inside the block is getting a command for forward and the
data has been forwarded, Forward Hash will keep the latest
Hash Value of the forward-command block, which exists within Forward Control Blockchain System. Therefore, Forward Hash=the latest "Hash Value" of forward-command block.

Data DAT1, DAT2 and DAT3 is the information to be kept inside the main block which it could be any types of digital data such as text, parameter, formula, instruction program, data file, object file, video file, etc. It is created and stored according to the purpose of the blockchain line, after data validation for its accuracy.

Hash of Present Owner Block O1, O2 and O3 is the "Hash Value" of some certain data associated with the owner identity and block identity, of the current block. These "Hash Value" are derived from the hash function as below.

Hash of Present Owner Block=Hash of (Data Owner, Hash of (Dimension, Header, Hash of Previous Owner Block, Node Code, Timestamp))

This equation performs a 2-round hash function. The first round of hash function is for the data set within parentheses, giving the result value for the second round of hash function along with "Data Owner". In the example the hash values of those MBlock #701, MBlock #702 and MBlock #703 are derived from as follows:

$$O1 = H(OW1, H(MD1, H1, PO1, ND1, T1))$$

$$O2 = H(OW2, H(MD1, H2, PO2, ND2, T2))$$

$$O3 = H(OW3, H(MD1, H3, PO3, ND3, T3))$$

Where H( ) is the hash function.

Hash of Present Main Block M1, M2 and M3 is the "Hash Value" of the current block within Main Blockchain System. These "Hash Value" are derived from the hash function as below.

Hash of Present Main Block = Hash of (Timestamp,

Hash of (Dimension, Header, Data Owner,

Hash of Previous Owner Block,

Hash of Previous Main Block, Node Code, Decisive Number, Data))

This equation performs a 2-round hash function. The first round of hash function is for the data set within parentheses, giving the result value for the second round of hash function along with "Timestamp". In the example the hash values of those MBlock #701, MBlock #702 and MBlock #703 are derived from as follows:

$$M1 = H(T1, H(MD1, H1, OW1, PO1, PM1, ND1, DN1, DAT1))$$

$$M2 = H(T2, H(MD1, H2, OW2, PO2, PM2, ND2, DN2, DAT2))$$

$$M3 = H(T3, H(MD1, H3, OW3, PO3, PM3, ND3, DN3, DAT3))$$

Where H( ) is the hash function.

The "Hash Value" which is M1 of MBlock #701 will be taken to keep as Hash of Previous Main Block inside MBlock #702, which is PM2. Therefore, PM2=M1. In the same manner, the "Hash Value" which is M2 of MBlock #702 will be taken to keep as Hash of Previous Main Block inside MBlock #703, which is PM3. Therefore, PM3=M2. Thus, the link between MBlock #701 and MBlock #702 is enabled within the Main Blockchain System, and so on for MBlock #702 and MBlock #703. This link between blocks could not be interrupted with any strange data block so that it is hard for hacker to put a data block within the blockchain line in the Multi Dimension Blockchain System. This allows total traceability to be performed and facilitates detection of any data violation.

Figure 6:
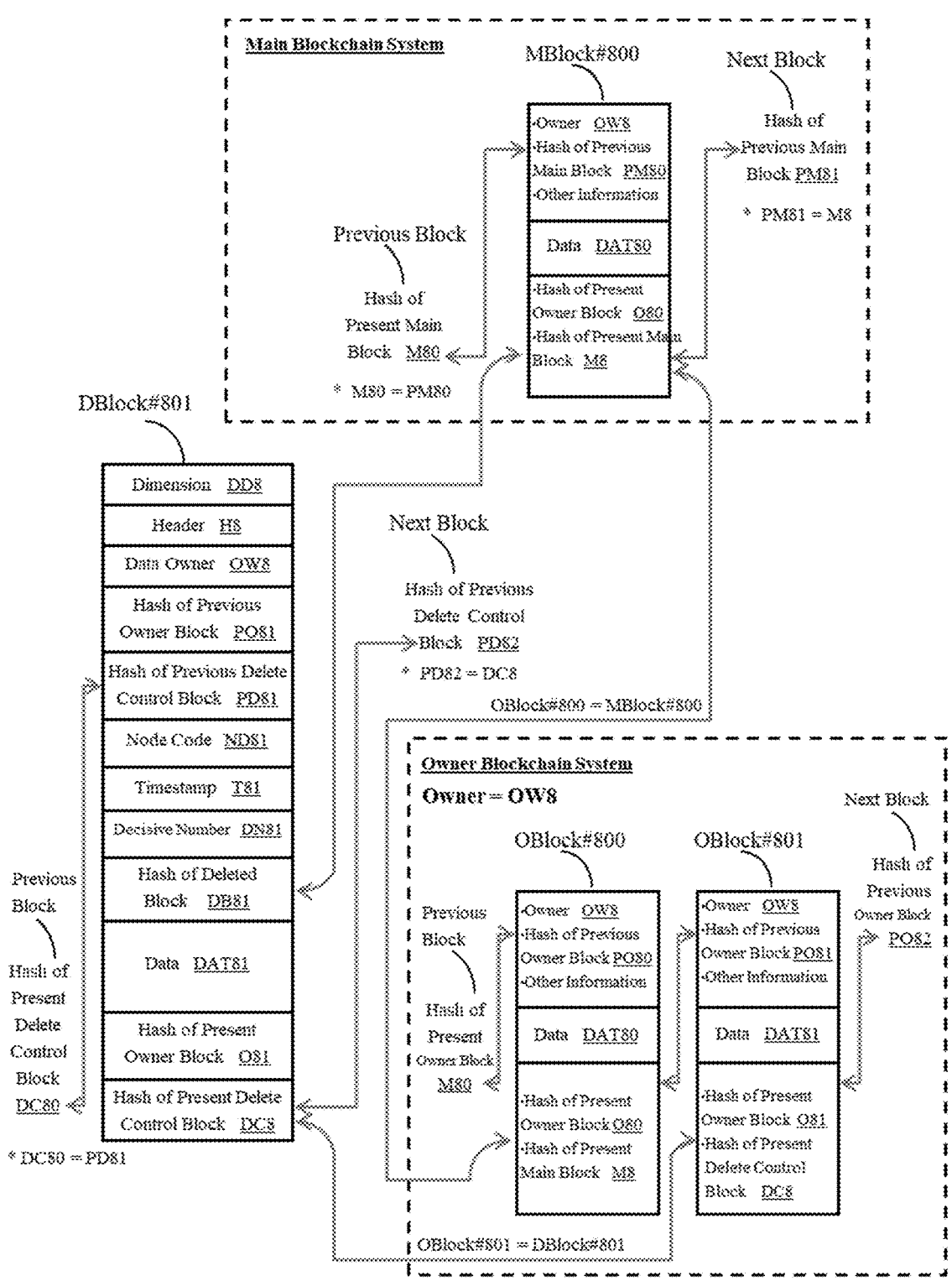
FIG. 6 shows the relationship between a block of the Delete Control Blockchain System, the Main Blockchain System and the Owner Control Blockchain in an embodiment of the present invention.

FIG. 6 shows the relationship between a block of the Delete Control Blockchain System, the Main Blockchain System and the Owner Control Blockchain in an embodiment of the present invention.

The Control Blockchain System may be classified into three systems, which the first one, Delete Control Blockchain System, is responsible for recording a command of deleting data and sending the instruction to execute the deletion. This system supports the traceability across Main Blockchain System and Owner Blockchain System.

An instruction for deleting is not an instruction to delete a whole block, rather it is an instruction to delete only the data from a block of the Main Blockchain. The other parts of the block such as Dimension, Header, Data Owner, Node Code and especially the hash values functioning as a link between blocks remain. This provides for traceability and authentication of the block even after deletion of the data. Since the memory area used to store the data is the largest part within the block, deleting data will return a significant memory space for the storage system.

FIG. 6 shows delete-command block DBlock #801 interacting with MBlock #800 within Main Blockchain System and OBlock #800 and Oblock #801 within Owner Blockchain System.

Dimension DD8 of DBlock #801 identifies the blockchain line within the system. Header H8 indicates the name of the block as the identity of each block within the system. Data Owner OW8 is an owner of information. This specifies the user who has the right to block information, and may be individual person or a group of individual people together. However, before a user can create a delete-command block, the targeted block for deletion must exist in Main Blockchain System and is belonging to that such user. FIG. 6 shows MBlock #800 with its data owner OW8, and within Owner Blockchain System the same block exists as OBlock #800. Therefore, MBlock #800=OBlock #800. Once the delete-command block is generated as DBlock #801 within Delete Control Blockchain System, the same block will exist within Owner Blockchain System as OBlock #801. Therefore, DBlock #801=OBlock #801.

Hash of Previous Owner Block PO81 is the "Hash Value" of some certain data associated with the owner identity and block identity, of the previous block of the same owner. The previous block to link for is within Owner Blockchain System at the same data owner, who is certainly OW8. The example shows it is OBlock #800 with its hash value of O80. Therefore, PO81=O80.

Hash of Previous Delete Control Block PD81 is the "Hash Value" of the previous block within Delete Control Blockchain System. In the example the previous block has a "Hash Value" of DC80. Therefore, PD81=DC80.

In some implementations, the genesis block (the very first block in the series) will not have any previous block before, so that the Hash of Previous Delete Control Block may be set as zero.

Figure 7:
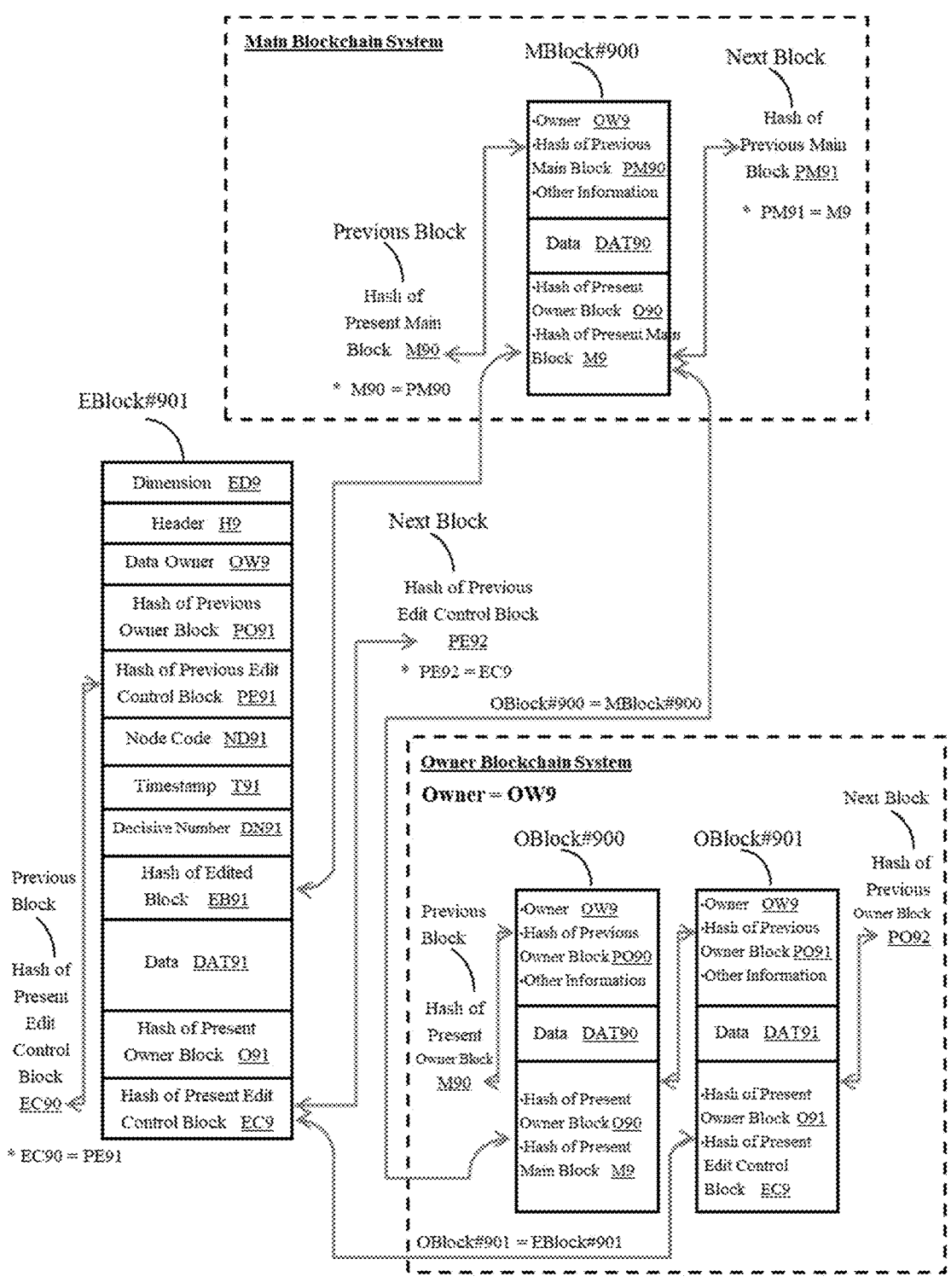
FIG. 7 shows the relationship between a block of the Edit Control Blockchain System, the Main Blockchain System and the Owner Control Blockchain in an embodiment of the present invention.

FIG. 7 shows the relationship between a block of the Edit Control Blockchain System, the Main Blockchain System and the Owner Control Blockchain in an embodiment of the present invention.

As shown in FIG. 7 a block EBlock #901 of the edit control blockchain interacts with a block MBlock #900 of the Main Blockchain System and blocks OBlock #900 and Oblock #901 of the Owner Blockchain System.

Dimension ED9 identifies the blockchain line within the system of the block EBlock #901. The Header H9 indicates the name of the block of EBlock #901 within the system. Data Owner OW9 indicated the owner of information, who has the right to block information, may be individual person or a group of individual people together. However, before a user can create an edit-command block, the targeted block for editing must exist in Main Blockchain System and is belonging to that such user. As shown in FIG. 7 block MBlock #900 has data owner OW9, and within Owner Blockchain System the same block exists as OBlock #900. Therefore, MBlock #900=OBlock #900. Once the edit-command block is generated as EBlock #901 within Edit Control Blockchain System, the same block will exist within Owner Blockchain System as OBlock #901. Therefore, EBlock #901=OBlock #901.

Hash of Previous Owner Block PO91 is the "Hash Value" of data associated with the owner identity and block identity, of the previous block of the same owner. The previous block linked to within Owner Blockchain System having the same data owner OW9. The example it is OBlock #900 with its hash value of O90. Therefore, PO91=O90.

Hash of Previous Edit Control Block PE91 is the "Hash Value" of the previous block within Edit Control Blockchain System. In the example the previous block has a "Hash Value" of EC90. Therefore, PE91=EC90. In some implementations, the genesis block (the very first block in the series) will not have any previous block before, so that the Hash of Previous Edit Control Block may be set as zero.

Node Code ND91 identifies a node which creates the prototype block and broadcasts it into the system, before other nodes could deploy and record it into their operation system. Timestamp T91 is the time information when the block was created. In the example it is. Decisive Number DN91 is such a complement parameter that the hash value of block being created matches the conditions of Edit Control Blockchain System, before broadcasting it into the system. Hash of Edited Block EB91 is the "Hash Value" of the target block whose data is subject to modification. The target block for modification is MBlock #900, with its hash value is M9. Therefore, EB91=M9. This is an important parameter for traceability once the data inside MBlock #900 is edited, it can be traced to the edit-command block of EBlock #901 by the owner OW9. Moreover, the block in Main Blockchain System whose data is edited contains Edit Count and Edit Hash, as described earlier, which record the hash value of the edit-command block (EBlock #901) in Edit Hash. In the example, Edit Count changes its value to the current number of times which the data has been edited and Edit Hash changes its value to EC9. This enables the traceability for both directions, from Main Blockchain System to Edit Control Blockchain System and from Edit Control Blockchain System to Main Blockchain System.

Data DAT91 is the instruction to be recorded inside the block within Edit Control Blockchain System which command to edit information of a particular block within Main Blockchain System associated with the right of data. This instruction must be validated and compliance with rules of modification under Multi Dimension Blockchain System.

Hash of Present Owner Block O91 is the "Hash Value" of some certain data associated with the owner identity and block identity, of the current block.

The "Hash Value" is derived from the hash function as below.

Hash of Present Owner Block=Hash of (Data Owner, Hash of (Dimension, Header, Hash of Previous Owner Block, Node Code, Timestamp))

This equation performs a 2-round hash function. The first round of hash function is for the data set within parentheses, giving the result value for the second round of hash function along with "Data Owner". In the example the hash value of this EBlock #901 is derived from below.

$$O91 = H(OW9, H(ED9, H9, PO91, ND91, T91))$$

Where H( ) is a format of processing the hash function. In the example EBlock #901 is the same block as OBlock #901 with a Hash of Present Owner Block of O91. Later if the data owner OW9 creates a new block, that hash value of O91 will be taken to keep as Hash of Previous Owner Block inside the new block, which is PO92. Therefore, PO92=O91. Thus, the link between OBlock #901 and the new block is enabled within Owner Blockchain System.

Hash of Present Edit Control Block EC9 is the "Hash Value" of the current block within Edit Control Blockchain System. This "Hash Value" is derived from the hash function as below.

Hash of Present Edit Control Block=Hash of (Timestamp, Hash of (Dimension, Header, Data Owner, Hash of Previous Owner Block, Hash of Previous Edit Control Block, Node Code, Decisive Number, Hash of Edited Block, Data))

This equation performs a 2-round hash function. The first round of hash function is for the data set within parentheses, giving the result value for the second round of hash function along with "Timestamp". In the example the hash value of this EBlock #901 is derived from below.

$$EC9 = H(T91, H(ED9, H9, OW9, PO91,$$
$$PE91, ND91, DN91, EB91, DAT91))$$

Where H( ) is a format of processing the hash function. Later if there is a new edit-command block, that hash value of EC9 will be taken to keep as Hash of Previous Edit Control Block inside the new block, which is PE92. Therefore, PE92=EC9. Thus, the link between EBlock #901 and the next edit-command block is enabled within Edit Control Blockchain System, whose traceability is difficult for a hacker to attack.

Figure 8:
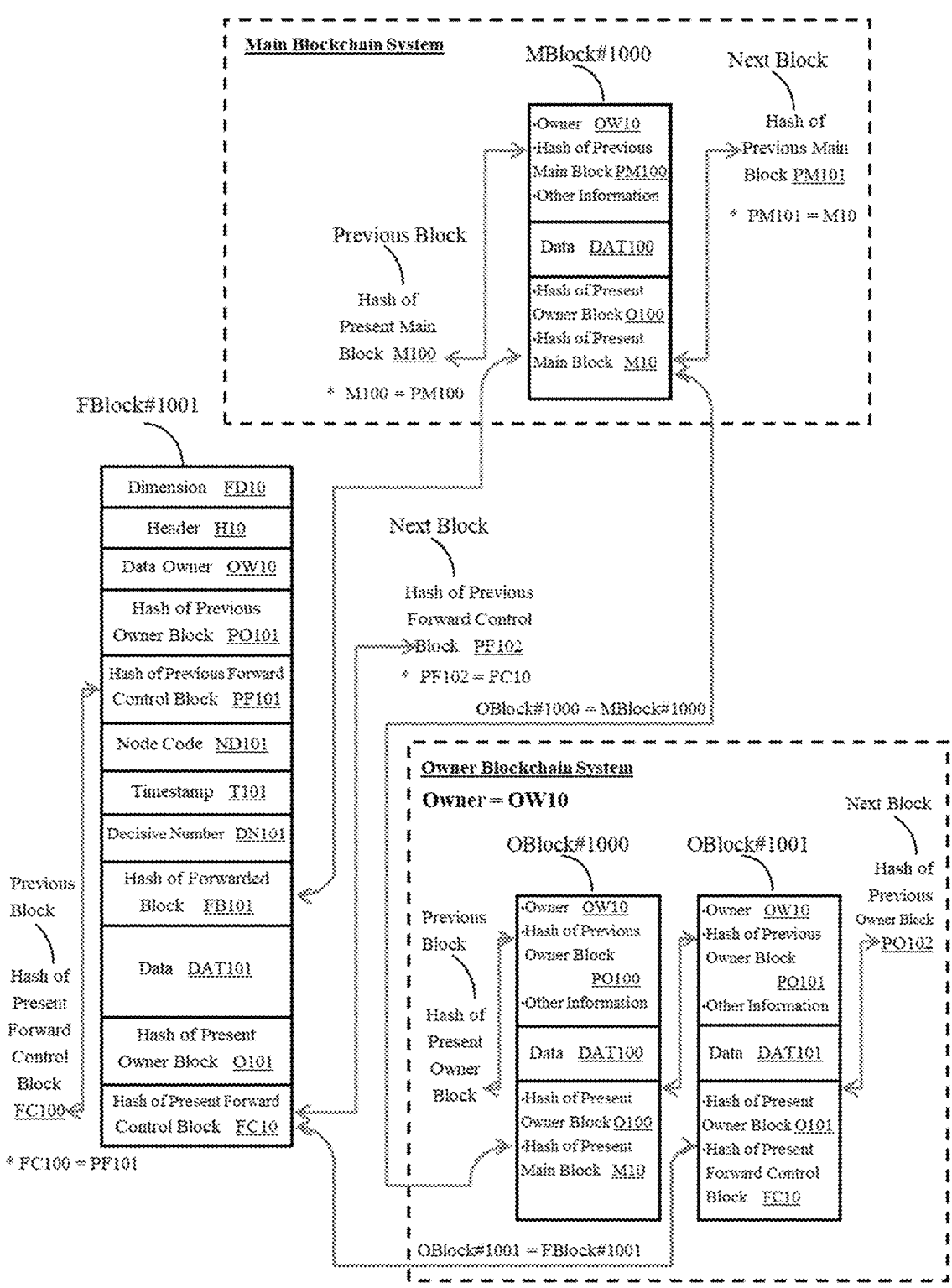
FIG. 8 shows the relationship between a block of the Forward Control Blockchain System, the Main Blockchain System and the Owner Control Blockchain in an embodiment of the present invention.

FIG. 8 shows the relationship between a block of the Forward Control Blockchain System, the Main Blockchain System and the Owner Control Blockchain in an embodiment of the present invention. The Forward Control Blockchain System, records a command for forwarding data and sends an instruction to execute forwarding of data. This provides traceability across the Main Blockchain System and Owner Blockchain System.

As shown in FIG. 8, the forward-command block FBlock #1001 of the Forward Control Blockchain System contains a number of data fields and segments and interacts with a block MBlock #1000 within Main Blockchain System and blocks OBlock #1000 and Oblock #1001 within Owner Blockchain System.

Dimension FD10 identifies the blockchain line within the system. Header H10 indicates the name of the block FBlock #1001 as the identity of each block within the system.

Data Owner OW10 is an owner of information. This indicates who has the right to control the block information, the owner may be an individual person or a group of people together. However, before a user can create a forward-command block, the target block for forward must exist in the Main Blockchain System and must belong to that user.

As shown in FIG. 8, MBlock #1000 has data owner OW10, and within the Owner Blockchain System the same block exists as OBlock #1000. Therefore, MBlock #1000=OBlock #1000. Once the forward-command block is generated as FBlock #1001 within the Forward Control Blockchain System, the same block will exist within Owner Blockchain System as OBlock #1001. Therefore, FBlock #1001=OBlock #1001.

Hash of Previous Owner Block PO101 is the "Hash Value" of some certain data associated with the owner identity and block identity, of the previous block of the same owner. The previous block linked to is within the Owner Blockchain System with same data owner OW10. As shown in FIG. 8, OBlock #1000 has hash value O100. Therefore, PO101=O100.

Hash of Previous Forward Control Block PF101 is the "Hash Value" of the previous block within Forward Control Blockchain System. The previous block has a "Hash Value" of FC100. Therefore, PF101=FC100. In some implementations, the genesis block (the very first block in the series) will not have any previous block preceding it, so that the Hash of Previous Forward Control Block may be set as zero.

Node Code ND101 identifies a node which creates the prototype block and broadcast it into the system, before other nodes could deploy and record it into their operation system. Timestamp T101 is the time information when the block was created. Decisive Number DN101 is a complement parameter that the hash value of block being created matches the conditions of Forward Control Blockchain System, before broadcasting it into the system. The conditions of creating a prototype block will be discussed in more detail below.

Hash of Forwarded Block FB101 is the "Hash Value" of the target block whose data is to be forwarded. The target block for forwarding is MBlock #1000, and its hash value is M10. Therefore, FB101=M10. This is an important parameter for traceability since once the data inside MBlock #1000 is forwarded to other user, it can be traced to the forward-command block of FBlock #1001 by the owner OW10.

Moreover, the block in Main Blockchain System whose data is forwarded contains Forward Count and Forward Hash, as described earlier, will record the hash value of the forward-command block (FBlock #1001) in Forward Hash. The Forward Count changes its value to the current number of times which the data has been forwarded and Forward Hash changes its value to FC10. This enables the traceability for both directions, from Main Blockchain System to Forward Control Blockchain System and from Forward Control Blockchain System to Main Blockchain System.

Data DAT101 is the instruction to be recorded inside the block within Forward Control Blockchain System which command to forward information of a particular block within Main Blockchain System associated with the right of data. This instruction must be validated and compliance with rules of forward under Multi Dimension Blockchain System.

Hash of Present Owner Block O101 is the "Hash Value" of some certain data associated with the owner identity and block identity, of the current block.

The "Hash Value" is derived from the hash function as below.

Hash of Present Owner Block = Hash of (Data Owner,

Hash of (Dimension, Header,

Hash of Previous Owner Block, Node Code, Timestamp))

This equation performs a 2-round hash function. The first round of hash function is for the data set within parentheses, giving the result value for the second round of hash function along with "Data Owner". In the example the hash value of this FBlock #1001 is derived from below.

$$O101 = H(OW10, H(FD10, H10, PO101, ND101, T101))$$

Where H( ) is a format of processing the hash function.

In the example FBlock #1001 is the same block as OBlock #1001 as described above, with its Hash of Present Owner Block is O101. Later if the data owner OW10 creates a new block, that hash value of O101 will be taken as Hash of Previous Owner Block inside the new block, which is PO102. Therefore, PO102=O101. Thus, the link between OBlock #1001 and the new block is enabled within Owner Blockchain System.

Hash of Present Forward Control Block FC10 is the "Hash Value" of the current block within Forward Control Blockchain System. In the example it is. This "Hash Value" is derived from the hash function as below.

Hash of Present Forward Control Block=Hash of (Timestamp, Hash of (Dimension, Header, Data Owner, Hash of Previous Owner Block, Hash of Previous Forward Control Block, Node Code, Decisive Number, Hash of Forwarded Block, Data))

This equation performs a 2-round hash function. The first round of hash function is for the data set within parentheses, giving the result value for the second round of hash function along with "Timestamp". In the example the hash value of this FBlock #1001 is derived from below.

$$FC10 = H(T101, H(FD10, H10, OW10,$$
$$PO101, PF101, ND101, DN101, FB101, DAT101))$$

Where H( ) is the hash function.

Later if there is a new forward-command block, that hash value of FC10 will be taken as Hash of Previous Forward Control Block inside the new block, which is PF102. Therefore, PF102=FC10. Thus, the link between FBlock #1001 and the next forward-command block is enabled within Forward Control Blockchain System, whose traceability is difficult for a hacker to attack.

The Owner Blockchain System includes all blocks from the Main Blockchain System and the Control Blockchain System organized according to data owner. Thus, the Owner Blockchain System allows the owner to connect each data block with which they are designated as the data owner. The blocks associated with an owner are connected as a block-chain line, with the hash value of the previous owner block, stored in the subsequent block. This provides for easy and transparent management by the data owner. It also supports a function of Control Blockchain System to retrieve a block within Main Blockchain System for deleting, editing and forward its data, by the right of the data owner.

Figure 9:
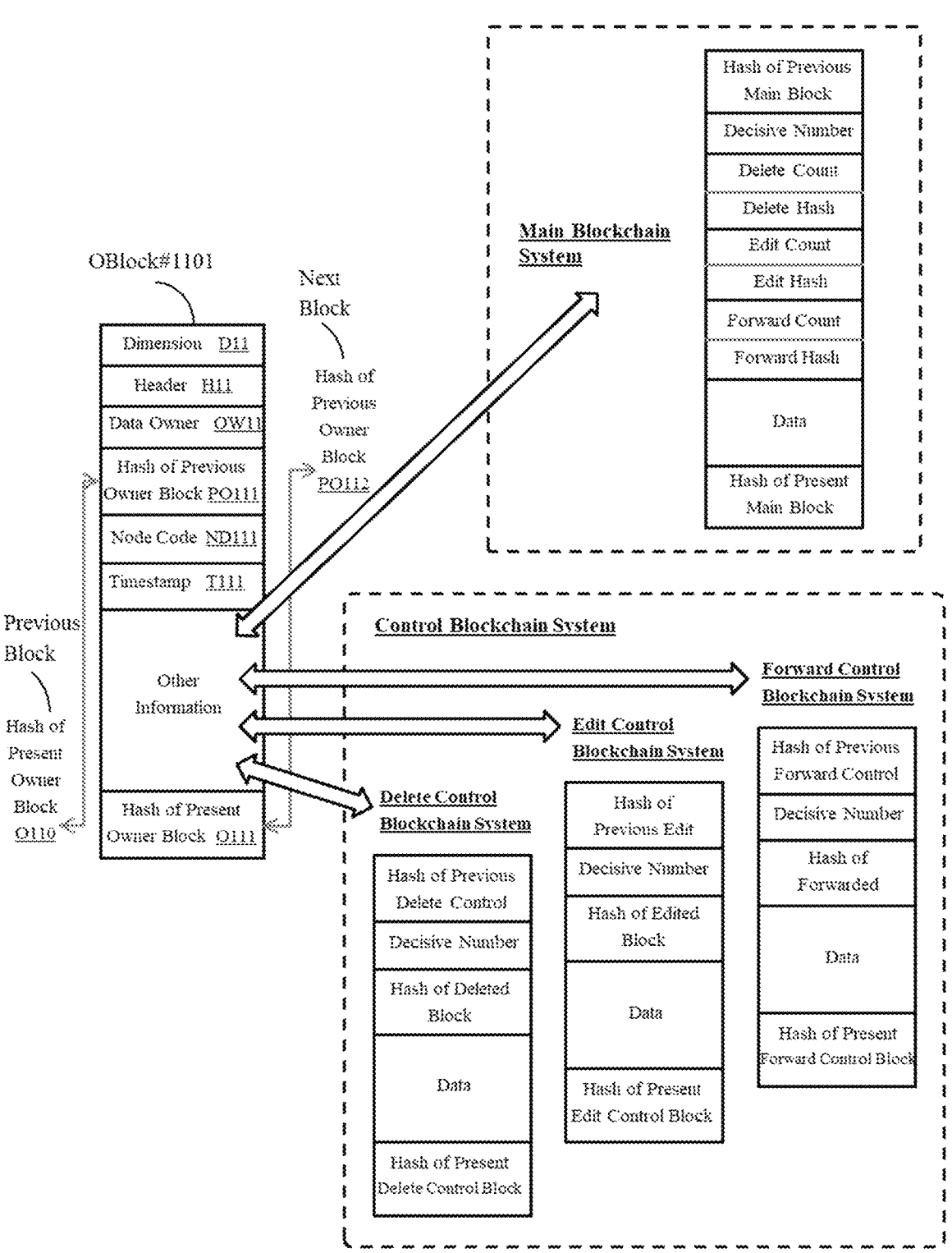
FIG. 9 shows the information stored in the data block of an owner blockchain block according to an embodiment of the present invention.

FIG. 9 shows the information stored in the data block of an owner blockchain block according to an embodiment of the present invention. The data block of Owner Blockchain System contains a number of various fields and segments associated with different types of the data block, which could be a main block, a delete-command block, an edit-command block, and a forward-command block. These can be classified into two groups of data, a common data group (for every type of data block) and a specific data group (for a specific type of data block).

The common data group (for every type of data block), having data fields and segments any type of blockchain system, is defined as follows.

The Dimension D11 of the owner block OBlock #1101 identifies the blockchain line within the system. The Header is H11 indicates the name of the block as the identity of each block. The Data Owner OW11 is the owner of information. The Hash of Previous Owner Block PO111 is the "Hash Value" of some certain data associated with the owner identity and block identity, of the previous block of the same owner. The previous block has the hash value of O110. Therefore, PO111=O110. In some implementations, the genesis block will not have any previous block before, so that the Hash of Previous Owner Block may be set as zero. The Node Code is ND111 identifies a node which creates the prototype block and broadcast it into the system, before other nodes could deploy and record the block into their operation system. The Timestamp is ND111 is the time information when the block was created. Hash of Present Owner Block is the "Hash Value" of some certain data associated with the owner identity and block identity, of the current block. In the example it is O111. The "Hash Value" is derived from the hash function as below.

$$\text{Hash of Present Owner Block} = \text{Hash of (Data Owner,}$$
$$\text{Hash of (Dimension, Header,}$$
$$\text{Hash of Previous Owner Block, Node Code, Timestamp))}$$

This equation performs a 2-round hash function. The first round of hash function is for the data set within parentheses, giving the result value for the second round of hash function along with "Data Owner". In the example the hash value of this OBlock #1101 is derived from below.

$$O111 = H(OW11, H(D11, H11, PO111, ND111, T111))$$

Where H( ) is a format of processing the hash function. Later if the data owner OW11 creates a new block, that hash value of O111 will be taken to keep as Hash of Previous Owner Block inside the new block, which is PO112. Therefore, PO112=O111. Thus, the link between OBlock #1101 and the new block is enabled within Owner Blockchain System.

A specific data group (for a various type of data block), whose data fields and segments are varied by the type of blockchain system, may be split into 4 subgroups.

Subgroup 1: a block which emerges from Main Blockchain System will have the following fields and segments of data. Hash of Previous Main Block is the hash value of those data in the immediate previous block, before connecting to the current block, within Main Blockchain System. Decisive Number is a complement parameter for which the hash value of block being created matches the conditions of Main Blockchain System, before broadcasting it into the system. Delete Count is a count of the number of times that the information kept inside the block is deleted. Delete Hash is the hash value of the delete-command block within Delete Control Blockchain System, which commands for deleting data kept inside this block of Main Blockchain System. Edit Count is a count of the number of times that the information kept inside the block is edited. Edit Hash is the hash value of the edit-command block within Edit Control Blockchain System, which commands for editing data kept inside this block of Main Blockchain System. Forward Count is a count of the number of times that the information kept inside the block is forwarded. Forward Hash is the hash value of the forward-command block within Forward Control Blockchain System, which commands for forwarding data kept inside this block of Main Blockchain System. Data is the information to be kept inside the block within Main Blockchain System. This could be a type of record or instruction or even digital files, which is validated for its accuracy. Hash of Present Main Block is the hash value of those data in the current block within Main Blockchain System, which the hash function is defined by rules of Main Blockchain System.

Subgroup 2: a block which emerges from Delete Control Blockchain System, will have the following fields and segments of data. Hash of Previous Delete Control Block is the hash value of those data in the immediate previous block, before connecting to the current block, within Delete Control Blockchain System. Decisive Number is a complement parameter that the hash value of block being created matches the conditions of Delete Control Blockchain System, before broadcasting it into the system. Hash of Deleted Block is the "Hash Value" of the target block whose data is subject to deletion. Data is the instruction to be recorded inside the block within Delete Control Blockchain System which command to delete information of a particular block within Main Blockchain System associated with the right of data. Hash of Present Delete Control Block is the hash value of those data in the current block within Delete Control Blockchain System, which the hash function is defined by rule of Delete Control Blockchain System.

Subgroup 3: a block which emerges from Edit Control Blockchain System, will have the following fields and segments of data. Hash of Previous Edit Control Block is the hash value of those data in the immediate previous block, before connecting to the current block, within Edit Control Blockchain System. Decisive Number is a complement parameter that the hash value of block being created matches the conditions of Edit Control Blockchain System, before broadcasting it into the system. Hash of Edited Block is the "Hash Value" of the target block whose data is subject to modification. Data is the instruction to be recorded inside the block within Edit Control Blockchain System which command to edit information of a particular block within Main Blockchain System associated with the right of data. Hash of Present Edit Control Block is the hash value of those data in the current block within Edit Control Blockchain System, which the hash function is defined by rule of Edit Control Blockchain System.

Subgroup 4: a block which emerges from Forward Control Blockchain System, will have the following fields and segments of data. Hash of Previous Forward Control Block is the hash value of those data in the immediate previous block, before connecting to the current block, within Forward Control Blockchain System. Decisive Number is a complement parameter such that the hash value of block being created matches the conditions of Forward Control Blockchain System, before broadcasting it into the system. Hash of Forwarded Block is the "Hash Value" of the target block whose data is subject to forward. Data is the instruction to be recorded inside the block within Forward Control Blockchain System which command to forward information of a particular block within Main Blockchain System associated with the right of data. Hash of Present Forward Control Block is the hash value of those data in the current block within Forward Control Blockchain System, which the hash function is defined by rule of Forward Control Blockchain System.

Figure 10:
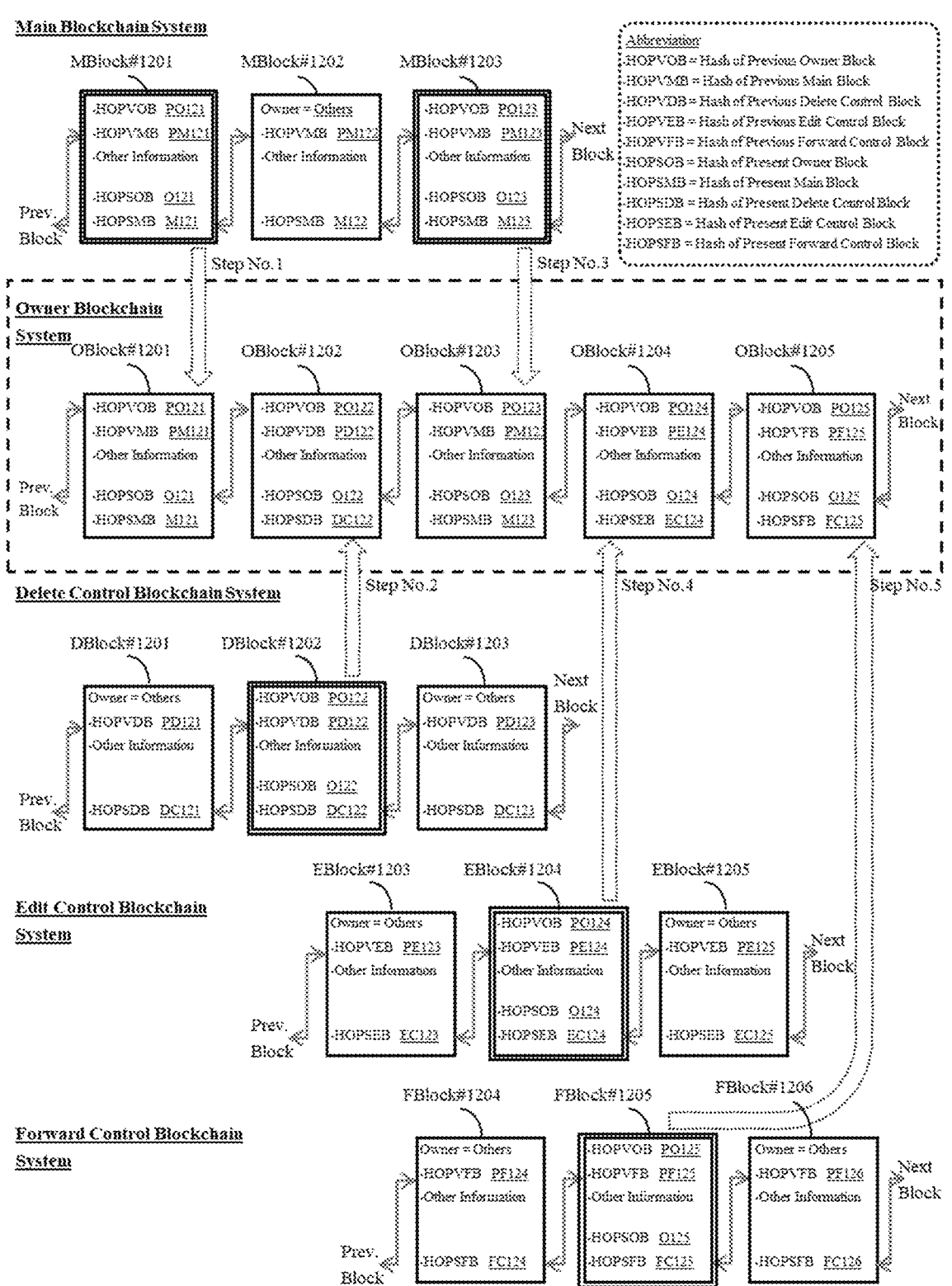
FIG. 10 shows the creation of a block within an owner blockchain system in parallel with the creation of blocks in a main blockchain system and a control blockchain system in accordance with an embodiment of the present invention.

FIG. 10 shows the creation of a block within an owner blockchain system in parallel with the creation of blocks in a main blockchain system and a control blockchain system in accordance with an embodiment of the present invention.

Owner blocks OBlock #1201, OBlock #1202, OBlock #1203, OBlock #1204 and OBlock #1205 have the same data owner as main blockchain blocks MBlock #1201 and MBlock #1203 and control blockchain blocks DBlock #1202, EBlock #1204 and FBlock #1205. The process of creating the blocks has 5 steps as follows:

Step No. 1: MBlock #1201 is created within Main Blockchain System and Hash of Previous Owner Block is PO121, to connect with the previous block of the same owner within Owner Blockchain System. OBlock #1201 is then created with OBlock #1201=MBlock #1201. The naming the block for OBlock #1201 or MBlock #1201 is just an alias to distinguish these two from different blockchain systems. However, all values inside the block, are the same. Later, another data owner creates MBlock #1202 within the Main Blockchain System, and this does not affect the Owner Blockchain System shown in FIG. 10 since MBlock #1202 will exist within that different owner's blockchain line under Owner Blockchain System.

Step No. 2: The data owner of MBlock #1201 exercises their right to delete the data inside the block. Once the request has been reviewed and approved, DBlock #1202 will be created within Delete Control Blockchain System and Hash of Previous Owner Block is PO122, which stores the "hash value" as O121 (hash value of OBlock #1201) or PO122=O121. Thus, within Owner Blockchain System, there is new block OBlock #1202 such that OBlock #1202=DBlock #1202. As mentioned above, the naming of the block for OBlock #1202 or DBlock #1202 is just to distinguish these two from different blockchain systems. All values inside the block, which are the same. Subsequently, the system will delete the data inside MBlock #1201 according to the approved delete-command-block. Since OBlock #1201=MBlock #1201 or they are the same block, the data inside OBlock #1201 has also been deleted.

Step No. 3: then, MBlock #1203 is created within Main Blockchain System by the same data owner, and Hash of Previous Owner Block is PO123, which stores the "hash value" as O122 (hash value of OBlock #1202) or PO123=O122. Thus, within Owner Blockchain System, there is new block OBlock #1203 with OBlock #1203=MBlock #1203.

Step No. 4: Then, the data owner of MBlock #1203 exercises their right to edit the data inside the block. Once the request has been reviewed and approved, EBlock #1204 will be created within Edit Control Blockchain System and Hash of Previous Owner Block is PO124, which stores the "hash value" as O123 (hash value of OBlock #1203) or PO124=O123. Thus, within Owner Blockchain System, there is new block OBlock #1204 with OBlock #1204=EBlock #1204. Subsequently, the system will edit the data inside MBlock #1203 according to the approved edit-command-block. Since OBlock #1203=MBlock #1203, the data inside OBlock #1203 has also been edited.

Step No. 5: Lastly, the data owner of MBlock #1203 has exercised their right to forward the previously modified data inside the block. Once the request has been reviewed and approved, FBlock #1205 will be created within Forward Control Blockchain System and Hash of Previous Owner Block is PO125, which stores the "hash value" as O124 (hash value of OBlock #1204) or PO125=O124. Thus, within Owner Blockchain System, there was emerging OBlock #1205 which OBlock #1205=FBlock #1205. Subsequently, the system will forward the data inside MBlock #1203 according to the approved forward-command-block.

Creating a user as a person with identity in the system is very important. This must be done in a strict manner and must be secure. Making sure that a person with identity in the system is the person who exists in the real world with the correct factors and conditions, to be legally binding with all of his or her transactions and record in Multi Dimension Blockchain System. The person with identity in the system has the rights to the data associated with law and regulation, and is responsible for the data he or she broadcasts to the system. So, there must be a legitimate identity registration system that verifies his or her identity, including identification and authentication process, before enabling the Public Key Infrastructure to generate a pair of electronic key, Private Key and Public Key, for accountability in Multi Dimension Blockchain System.

Figure 11:
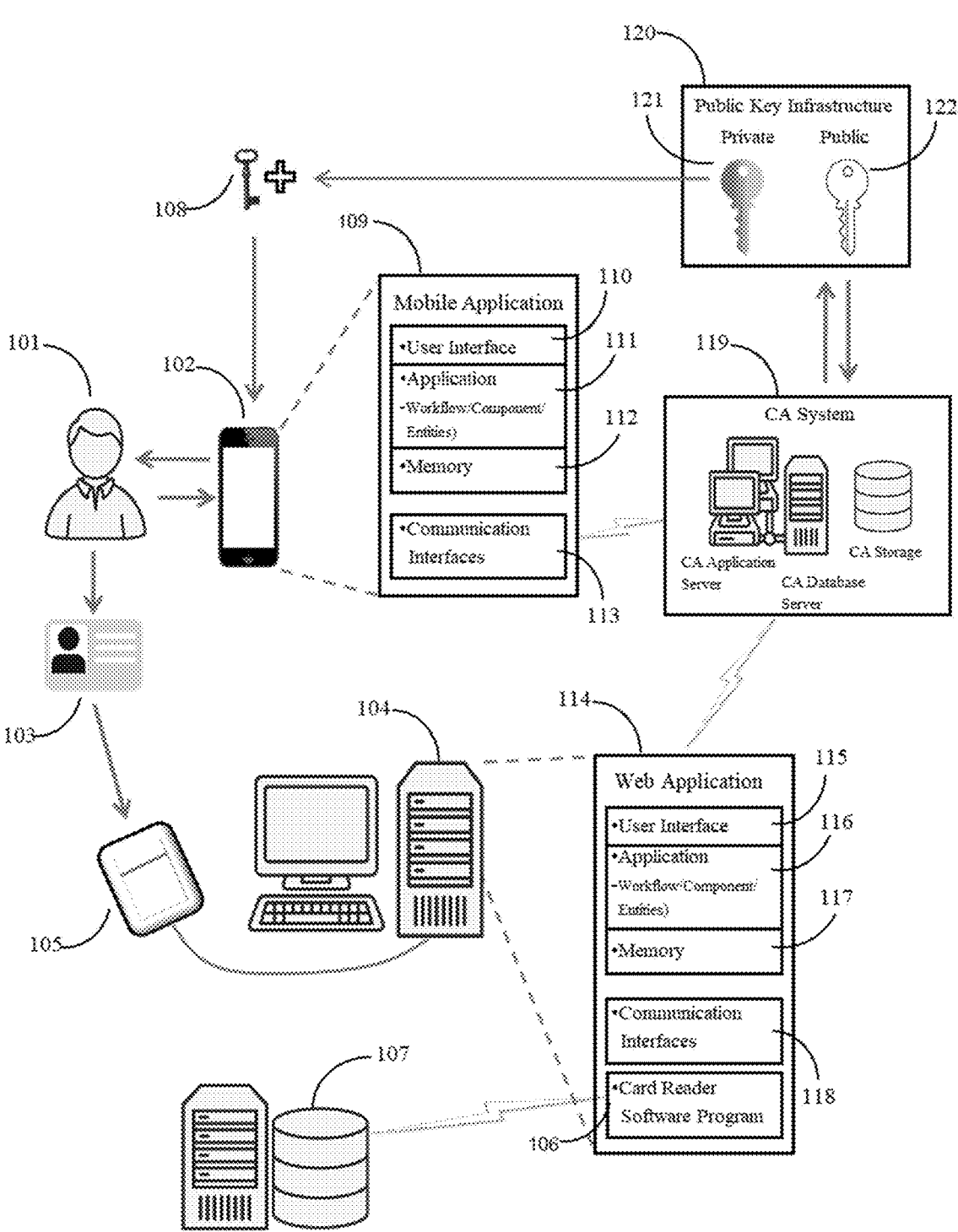
FIG. 11 shows an identity registration system for use in embodiments of the present invention.

FIG. 11 shows an identity registration system for use in embodiments of the present invention. As shown in FIG. 11, a person requesting for identity registration 101 has a portable communication device 102 registered in their name. The portable communication device 102 may be a mobile phone, with smartphone function. The person requesting for identity registration 101 has a Personal Identification Card 103 issued by a government agency. The Personal Identification Card 103 may be, for example a national ID card or a passport. The system comprises a Personal Computer 104 for person in charge of identity registration, The Personal Computer 104 is coupled to a Card Scanner 105 for reading information kept inside personal identification card 103. A database system 107 of the government unit stores official personal data associated with personal identification card 103, such as name, surname, ID number, date of birth, personal photo, etc. The portable communication device 102 stores an electronic key 108 for encoding and decoding data. A Mobile Application System 109 is installed on the portable communication device 102 for operating the Multi Dimension Blockchain System. The Mobile Application System 109 comprises a User Interface System 110 allows a user to perform a program functionality via screen display on the portable communication device 102, such as button, selection, drop-down list and data input, an Application System 111 to process all instructions, along with workflow, algorithm and record, which have been developed, a Memory System 112 which provides data storage for program and record, which need to reserve a memory size within the portable communication device 102, and a Communication Interface System 113 for data transmission between Mobile Application System 109 and wireless internet system, using the phone signal of 3G/4G/5G/LTE/or other technology in the future, or via Wi-Fi of any internet service provider.

The Personal Computer 104 implements a Web Application System 114 that the person in charge of identity registration can access through a browser. The Web Application System 114 comprises a User Interface System 115 that allows the person in charge of identity registration to perform a program functionality being displayed on monitor of personal computer 104, an Application system 116 to process all instructions, along with workflow, algorithm and record, which have been developed, a Memory System 117 which provides a data storage for program and record, which need to reserve a memory size within the personal computer 104 and a Communication Interface System 118 for data transmission between web application system 114 and internet system, using the communication signal either wired or wireless access, such as cabling via Ethernet, or wireless access via Wi-Fi of any internet service provider, or using the phone signal of 3G/4G/5G/LTE/or other technology in the future.

The system further comprises a Certification Authority System 119 and Public Key Infrastructure 120. The Certification Authority System 119 is to validate the authentication of person requesting for identity registration 101 and issue an electronic certification after validity, so that he or she becomes the person with identity in Multi Dimension Blockchain System. The Public Key Infrastructure 120 supports operations of Certification Authority System 119, to generate a pair of electronic keys specifically for a person requesting for identity registration 101 who pass the validation and becomes the person with identity in the system. This pair of electronic keys is capable of encrypting data with one key and decrypting it once another key is paired into it. This pair of electronic keys comprises a Private Key 121 which will be sent to the person with identity in the system to store privately in portable communication device 102 and a Public Key 122 which will be stored in Certification Authority System 119 and is available for any other users in the system to use it as tool to communicate with the key owner.

The process of identity registration is as follows:

1) A person requesting for identity registration (101) comes and presents himself or herself to the person in charge of identity registration, along with his or her portable communication device (102) registered in his or her name.

2) Download and install Mobile Application System 109 for using Multi Dimension Blockchain System, by filling in the information specifying name, last name and personal identification card 103 number as well as creating a password. Then press confirm for registration. For this step, the person requesting for identity registration has an option to complete the process before coming to see the person in charge of identity registration, or do it right in front of him or her.

3) The person requesting for identity registration presents his or her personal identification card 103.

4) The person in charge of identity registration validates the personal identification card such as comparing the person photo on the ID card against face of the person.

5) The person in charge of identity registration opens the personal computer 104 and access Web Application System 114.

6) The person in charge of identity registration uses the card scanner 105 to read the information on the personal identification card, operated by card reader software program 106. The following information may be read: Full name; Date of birth; Identification number; Address; Photo. The information was stored on the card at the time when the person had applied for the personal identification card 103.

7) The person in charge of identity registration confirms for continuing the process, by pressing "continue" to submit the request for current information of the person requesting for identity registration 101 to the database system 107 of the government unit.

8) The person in charge of identity registration validates the information of the person requesting for identity registration 101 with the current information receiving from the database system 107 of the government unit. If correct, press "Confirm".

9) The information processed on Web Application System 114 will be transmitted through the Internet to Certification Authority System 119 to perform the processing against the information obtained from Mobile Application System 109 whether they are correct.

10) If correct, Certification Authority System 119 will send a Pin Code, which is a figure of 3 to 6 digits, to appear on screen display of Web Application System 114. Then the person in charge of identity registration informs it to the person requesting for identity registration 101 for acknowledgement.

11) Portable communication device 102 has a notification on Mobile Application System 109 asking for continuing the process with Pin Code.

12) The person requesting for identity registration 101 fills in Pin Code and then presses "Confirm".

13) The screen display of Mobile Application System 109 changes to camera mode automatically, along with the camera reference frame of shooting personal photos.

14) The person requesting for identity registration 101 may use the front camera to take himself or herself photos, or ask the person in charge of identity registration to use the rear camera to do so. If not satisfied with the photos, the person can select to retry for new shooting photos.

15) Once the photos are captured, the person requesting for identity registration command for uploading photos. In case of using the front camera, the image will switch left and right automatically, before uploading.

16) The photos will be sent to Web Application System 114 and appear on screen display for which the person in charge of identity registration can lastly validate it. If correct, press "Confirm".

17) Photos and its validation information are submitted to Authority Certification System 119 and Public Key Infrastructure 120 will generate a pair of electronic keys specifically for the person requesting for identity registration 101, by applying his or her personal data, such as name, surname, identification card number, digital value of the photo and random values to process with specific algorithm.

18) Certification Authority System 119 maintains the Public Key 122 of the person requesting for identity registration 101.

19) Certification Authority System 119 will encrypt Private Key 121 of the person requesting for identity registration 101 with an electronic key of single key type 108. Then send it to Mobile Application System 109 on the portable communication device 102.

20) Certification Authority System 119 will send information of electronic key of single key type 108 to Web Application System 114.

21) The person in charge of identity registration informs the information of electronic key of single key type 108 to the person requesting for identity registration 101.

22) The portable communication device 102 has a notification on Mobile Application System 109 regarding the existence of decrypted Private Key 121.

23) The person requesting for identity registration 101 input electronic key of single key type 108 and the press "Confirm". Private Key will be decrypted and installed in Mobile Application System 109. The relevant information is submitted to Authority Certification System 119 that the person requesting for identity registration 101 was present and is accountable in Multi Dimension Blockchain System, with readiness of Private Key.

24) Mobile Application System 109 will notify for completeness of identity registration process, and the person has just become the person with identity in the Multi Dimension Blockchain System.

25) Web Application System (114) will notify the person in charge of identity registration for the completion of process.

The person in charge of identity registration is also required for going through identity registration process, to be the person with identity in the system. The list of persons in charge of identity registration is defined as well. In some implementations, once the regulations allow that identity registration process, requiring an identification process and an authentication process, can perform through online system, the whole process of online identity registration would be much more convenient and fast as follows:

1) A person requesting for identity registration 101 turns on his or her portable communication device 102 registered in his or her name.

2) Download and install Mobile Application System 109 for using Multi Dimension Blockchain System, by filling in the information specifying name, last name, personal identification card 103 number and email address as well as creating a password. Then press confirm for registration.

3) The screen display of Mobile Application System 109 will change to camera mode automatically, along with the camera reference frame of shooting ID card. The person requesting for identity registration 101 takes a photo of his or her personal identification card 103 and press "Upload".

4) The screen display of Mobile Application System 109, still in camera mode, will show the camera reference frame of shooting personal photos. The person requesting for identity registration 101 take a photo of himself or herself and press "Upload". In case of using the front camera, the image will switch left and right automatically, before uploading.

5) Information and photos taking from Mobile Application System 109 are submitted to Authority Certification System 119 for processing as follows: Read the information that the person requesting for identity registration 101 fill in during installing Mobile Application System 109 such as name, surname, personal identification card number, date of birth, expired date, etc. Scan and read the photo of ID card to detect name, surname, personal identification card number, date of birth, etc. Compare the correctness of name, surname, personal identification card number, date of birth, etc. from both source of information. Execute a face recognition program to analyze and compare photos of person and picture of person in ID card. If the information is correct, the program proceeds to the next steps.

6) Certification Authority System 119 submits the request for current information of the person requesting for identity registration 101 to the database system 107 of the government unit. Once receive the information per request, the process of validation continues as follows: Compare the correctness of name, surname, personal identification card number, date of birth, etc. Execute a face recognition program once again to analyze and compare photos of person from three source; one from shooting himself or herself, one from shooting ID card and one from the database system 107 of the government unit. If all the information is correct, the program proceeds to the next steps.

7) Public Key Infrastructure 120 will generate a pair of electronic keys specifically for the person requesting for identity registration 101, by applying his or her personal data, such as name, surname, identification card number, digital value of the photo and random values to process with specific algorithm.

8) Certification Authority System 119 maintains the Public Key 122 of the person requesting for identity registration 101.

9) Certification Authority System 119 will encrypt Private Key 121 of the person requesting for identity registration 101 with an electronic key of single key type 108. Then send it to Mobile Application System 109 on the portable communication device 102.

10) Certification Authority System 119 will send information of electronic key of single key type 108 to email address of the person requesting for identity registration.

11) The portable communication device 102 has a notification on Mobile Application System 109 regarding the existence of decrypted Private Key 121.

12) The person requesting for identity registration 101 input electronic key of single key type 108 which is informed via email, and the press "confirm". Private Key will be decrypted and installed in Mobile Application System 109 completely. The relevant information is submitted to Authority Certification System 119 that the person requesting for identity registration 101 has presently existed and been accountable in Multi Dimension Blockchain System, with readiness of Private Key.

13) Mobile Application System 109 will notify for completeness of identity registration process, and the person has just become the person with identity in the Multi Dimension Blockchain System.

In some implementations, to increase the security of generating Private Key, the whole process of generating a pair of electronic keys can be processed within the portable communication device 102 without being sent via internet. This could be done by adding an extra program for generating that pair of electronic keys on Mobile Application System 109 of Multi Dimension Blockchain System. Then the process of generating a pair of electronic keys would be as follows:

1) A person requesting for identity registration 101 turns on his or her portable communication device 102 registered in his or her name.

2) Download and install Mobile Application System 109 which includes the program for generating a pair of electronic keys, for using Multi Dimension Blockchain System, by filling in the information specifying name, last name, personal identification card 103 number and email address as well as creating a password. Presenting ID card and taking photos per requirements for identification and authentication and submitting to Certification Authority System 119.

3) Certification Authority System will validate information and photos by communicating with the database system 107 of the government unit, for requesting the relevant information.

4) If the information is correct, Certification Authority System 119 will generate a Pin Code, which is a figure of 4-6 digits, for authorization to generate a pair of electronic keys. The Pin Code is sent to email address of the person requesting for identity registration 101 with notification on Mobile Application System 109.

5) The portable communication device 102 has a notification on Mobile Application System 109 asking for continuing the process with Pin Code. The person requesting for identity registration accesses through Mobile Application System 109 for a functionality of "A pair of electronic keys" and select a sub-function of "Generating a pair of electronic keys".

6) The system will ask to repeat entering information, indicating name, surname, ID card number, and date of birth. Then require for inputting a Pin Code, which is informed via email, before pressing "Confirm".

7) The system will generate a pair of electronic keys specifically for the person requesting for identity registration 101, by applying his or her personal data, such as name, surname, identification card number, digital value of the photo and random values to process with specific algorithm.

8) The system sends Public Key 122 along with information of name, identity ID card number and Pin Code to Certification Authority System 119.

9) Certification Authority System 119 receives such the information and validate whether it is the same set of information permitting for authorization to generate a pair of electronic keys.

10) If the information is correct, Certification Authority System 119 will keep Public Key 122 in the state of "Inactive" or not yet available.

11) Certification Authority System 119 generates another Pin Code for permission to install Private Key and send it to email address of the person requesting for identity registration, with notification on Mobile Application System 109.

12) The portable communications device 102 has a notification on the Mobile Application System 109 asking to install Private Key with Pin Code. The person requesting for identity registration accesses through Mobile Application System 109 for a functionality of "A pair of electronic keys" and select a sub-function of "Installing Private Key".

13) The system will ask to repeat entering information, indicating name, surname, ID card number, and date of birth. Then require for inputting a Pin Code, which is informed via email, before pressing "Confirm".

14) Mobile Application System 109 will install Private Key 121 into the system, within the portable communication device 102.

15) The system sends information of name, identity ID card number and Pin Code which permitting for Private Key installation to Certification Authority System 119.

16) Certification Authority System 119 receives such the information and validate whether it is the same set of information permitting for installing Private Key.

17) If the information is correct, Certification Authority System 119 will maintain Public Key 122 in the system and change the state of "Inactive" to "Active" for use.

18) Certification Authority System 119 will notify to the Mobile Application System 109 for completeness of identity registration process, and the person has just become the person with identity in the Multi Dimension Blockchain System.

In some implementations, the process of identity registration may use or cooperate with the services of agencies or service providers who provide the service of identification and authentication for a certain person. Some application of data communication may be deployed for collaboration. Once the validation of the person is confirmed, Certification Authority System 119 can continue with a process of generating a pair of electronic keys and creating the person with identity in Multi Dimension Blockchain System.

Figure 12:
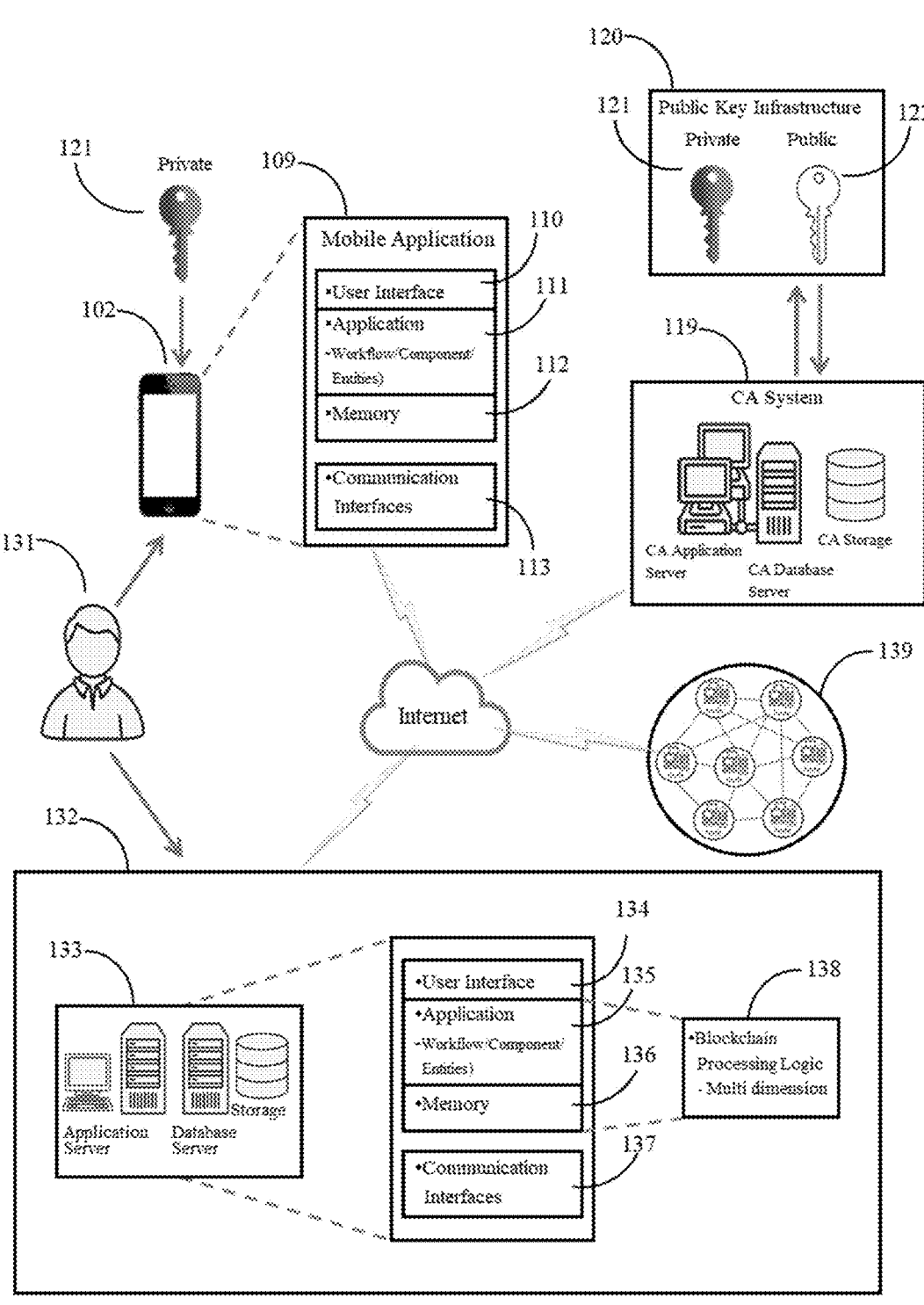
FIG. 12 shows a system for operating with blockchains according to an embodiment of the present invention.

FIG. 12 shows a system for operating with blockchains according to an embodiment of the present invention.

FIG. 12 shows a person with identity in the system 131, who has already passed the identity registration process, being listed in Certification Authority System 119 and having Private Key 121 installed within his or her portable communication device 102.

A Portable communication device 102 has been used for the identity registration process, has Private Key 121 installed. Mobile Application System 109 is installed on the portable communication device 102 for operating the Multi Dimension Blockchain System, which consisting of important parts as follows. The Mobile Application System 109 has the following components. User Interface System 110 is a supporting system that allows a user to perform a program functionality via screen display on the portable communication device 102, such as button, selection, drop-down list and data input, with the following functions: Identity registration; Group of persons with identity in the system; Creating data; Deleting data; Editing data; Forwarding data; Broadcasting an initial data; Data access; Digital signature; Traceability; and Notification. In some embodiments, some of the functionalities may be performed by the computer system 133. Application System 111 is an operating system to process all functions and instructions, along with workflow, algorithm and record, which have been developed. Memory System 112 is the data storage for program and record, which need to reserve a memory size within the portable communication device 102. Communication Interface System 113 is for data transmission between Mobile Application System 109 and wireless internet system, using the phone signal of 3G/4G/5G/LTE/or other technology in the future, or via Wi-Fi of any internet service provider.

Node 132 one of a set of computing systems, consisting of computer equipment which could be a small set as a personal computer or big set of a data center (integrating system of application server, database server, storage system, routing & switching system, and etc.). Node 132 belongs to a person with identity in the system 131. Computer System 133 which could be a small set as a personal computer or big set of a data center (integrating system of application server, database server, storage system, routing & switching system, and etc.). Computer system 133 operates the following functionalities. User Interface System 134 is a supporting system that allows the person with identity in the system 131 to perform a program functionality being displayed on monitor of computer system 133, with the following functions: Identity registration; Group of persons with identity in the system; Creating data; Deleting data; Editing data; Forwarding data; Broadcasting initial data; Data access; Digital signature; Creating-block mode; Creating a new blockchain line within Main Blockchain System; Creating a new blockchain line for personal privilege management; Personal privilege management; Coin management; Traceability; Notification; Printout management. Application system 135 is an operating system to process all instructions, along with workflow, algorithm and record, which have been developed. Memory System 136 is the data storage for program and record, which need to reserve a memory size within the computer system 133. Blockchain Processing Logic System 138 is a processing unit associated with all programs, applications, instructions, conditions and records being set in Multi Dimension Blockchain System to process all following working systems: Main Blockchain System; Delete Control Blockchain System; Edit Control Blockchain System; Forward Control Blockchain System; Owner Blockchain System; Data Broadcast and Receiving System; New Block Creating System; Data Reconcile System; and Total Traceability System. Communication Interface System 137 is for data transmission between computer system 133 and internet system, using the communication signal either wired or wireless access, such as cabling via Ethernet, or wireless access via Wi-Fi of any internet service provider, or using the phone signal of 3G/4G/5G/LTE/or other technology in the future. Certification Authority System 119 is to validate the authentication of a person with identity in the system 131 and a group of persons with identity in the system 151 by issuing an electronic certification, so that they exist and are accountable in Multi Dimension Blockchain System. Public Key Infrastructure 120 is an infrastructure, supporting operations of Certification Authority System 119, to generate a pair of electronic keys specifically for the person with identity in the system 131. This pair of electronics keys is as below comprises a Private Key 121 which will be stored in a portable communication device 102 and a Public Key 122 which will be stored in Certification Authority System 119 and is available for any other users in the system to use it as tool to communicate with the key owner.

Figure 13:
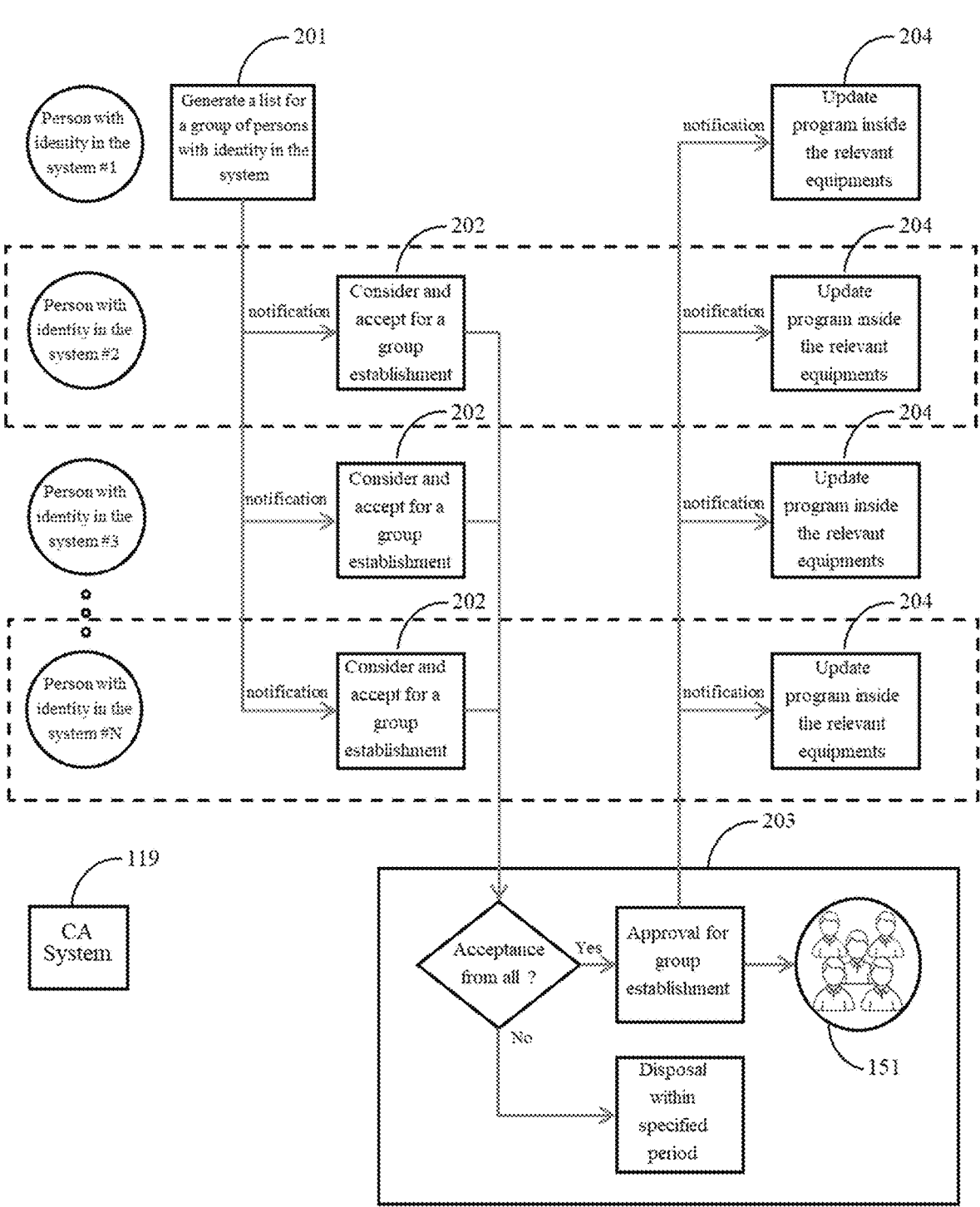
FIG. 13 illustrates the process of creating a group of persons in a blockchain system according to an embodiment of the present invention.

FIG. 13 illustrates the process of creating a group of persons in a blockchain system according to an embodiment of the present invention.

In step 201, a list for a group of persons with identity in the system is generated. The person with identity in the system 131 who initiates a group establishment turns on the program of Multi Dimension Blockchain System and goes to functionality of "Group of persons with identity in the system". Then there are details of rules and conditions along with the processes as follows: Select a sub-function of "Creating a new group" to start the process. Select the name of the person with identity in the system to form a group, by using drop-down list of names. Define the rights as a member of the established group for each person, with the following among options that may be selected: right to generate initial data; right to approve initial data; right to approve new member of the group; right to approve the removal of member from the group; and right to approve the personal privilege. The right to generate initial data is to grant the member the ability to generate the initial data and present it to the group for approval. If getting approved, then it will be broadcasted to the system on behalf of the group. Number of members in the group is not limited. Once a list of persons to be as member of the group is finished, there is a need to define the name of the group. Define rule for approval of initial data on behalf of the group, before broadcasting to the system. For example, define for total of 7 members who have a right to approve initial data with the approval conditions of 5 out 7, plus 2 others must not reject within 7 days as of starting the approval process. Then this initial data is considered as approval and is broadcasted to the system. After completing the list of members and naming the group, press "Confirm". The system will send a request for a group establishment to all persons in the list of members.

In step 202, the members consider and accept group establishment. All persons with identity in the system 131 who are in the list of members, will receive a notification through their portable communication device 102 regarding a request for a group establishment. The system will display a request with conditions of rights, and other relevant information as follows: Group name; List of persons with identity in the system to be in the group; Right to generate initial data by each person in the group; Right to approve initial data by each person in the group; Rule for approval of initial data on behalf of the group; Right to approve new member of the group by each person in the group; Right to approve the removal of member from the group by each person in the group; Right to approve the personal privilege by each person in the group. Then each user will consider to accept the conditions and join the group or to reject it. The system will take the feedback information forwarded to Certification Authority System 119.

In step 203, approval for group establishment is carried out. Certification Authority System 119 will process all feedback information from each member in the list of members. Once there is a rejection or not enough approval feedback within some certain days, the request for a group establishment will be disposed. On the other hand, there is approval per defined conditions, Certification Authority system 119 will issue an electronic certification to establish the existing of "the group of persons with identity" 151 in Multi Dimension Blockchain System. The electronic certification will be sent to all members of the group. During the process of group establishment, a person in the list of members can go to functionality of "Group of persons with identity in the system" and select a sub-function of "Create a new group" to view the status of the group, such as who accept or reject the request for a group establishment.

In step 204, the program inside the relevant equipment of all members of the group is updated. All members of the group of persons with identity in the system 151 will receive a notification through their portable communication device 102 regarding the approval status of a group establishment. Then Mobile Application System 109 will update all those relevant functionalities and information regarding the new established group, as well as adding the status of membership. If the person with identity in the system 131 owns or controls a Node 132, he or she need to go through process of updating the program and information inside the computer system 133, in the manner with Mobile Application System 109. This will enable the person to act as one of the group of persons with identity in the system 151, with joint rights the data.

The group of persons with identity in the system 151 can operate all functions in Multi Dimension Blockchain System for creating initial data, creating a new block, deleting data in the block, editing data in a block and forwarding data in a block, in the same manner of which the person with identity in the system 131. Except that those operations need an additional process of approval by members of the group to earn the right to create and broadcast data on behalf of the group.

A block being created by the group of persons with identity in the system 151 will be kept within Main Blockchain System, administrated by Control Blockchain System and appeared in Owner Blockchain System, in the same manner of which the block being created by the person with identity in the system 131 as well.

In some implementations, establishment of a group of persons with identity in the system can apply for a company, corporation, public company or legal entity to exist in Multi Dimension Blockchain System. To do so, member of the group of persons with identity in the system will be all authorized directors of the company, corporation, public company or legal entity. In some implementations, establishment of a group of persons with identity in the system can apply for an organization, institution, government unit or state enterprise to exist in Multi Dimension Blockchain System. To do so, member of the group of persons with identity in the system will be all member of the board of directors of the organization, institution, government unit or state enterprise. In some implementations, establishment of a group of persons with identity in the system can apply for an association, federation of profession or independent entity to exist in Multi Dimension Blockchain System. To do so, member of the group of persons with identity in the system will be all member of the board of directors of the association, federation of profession or independent entity. In some implementations, establishment of a group of persons with identity in the system can apply for a club or group of people who have a common interest to exist in Multi Dimension Blockchain System. All people need to go through the entity registration process to become the person with identity in the system. Then start to establish a club as the group of persons with identity in the system so that all people can have a common data with joint right of information. The rights of each member can be defined to fit with the purpose of the club.

Initial data is information which a person with identity in the system or a member of the group of persons with identity in the system has created in the form of new data or request for action with the existing data in the system, such as to delete, edit or forward data.

Figure 14:
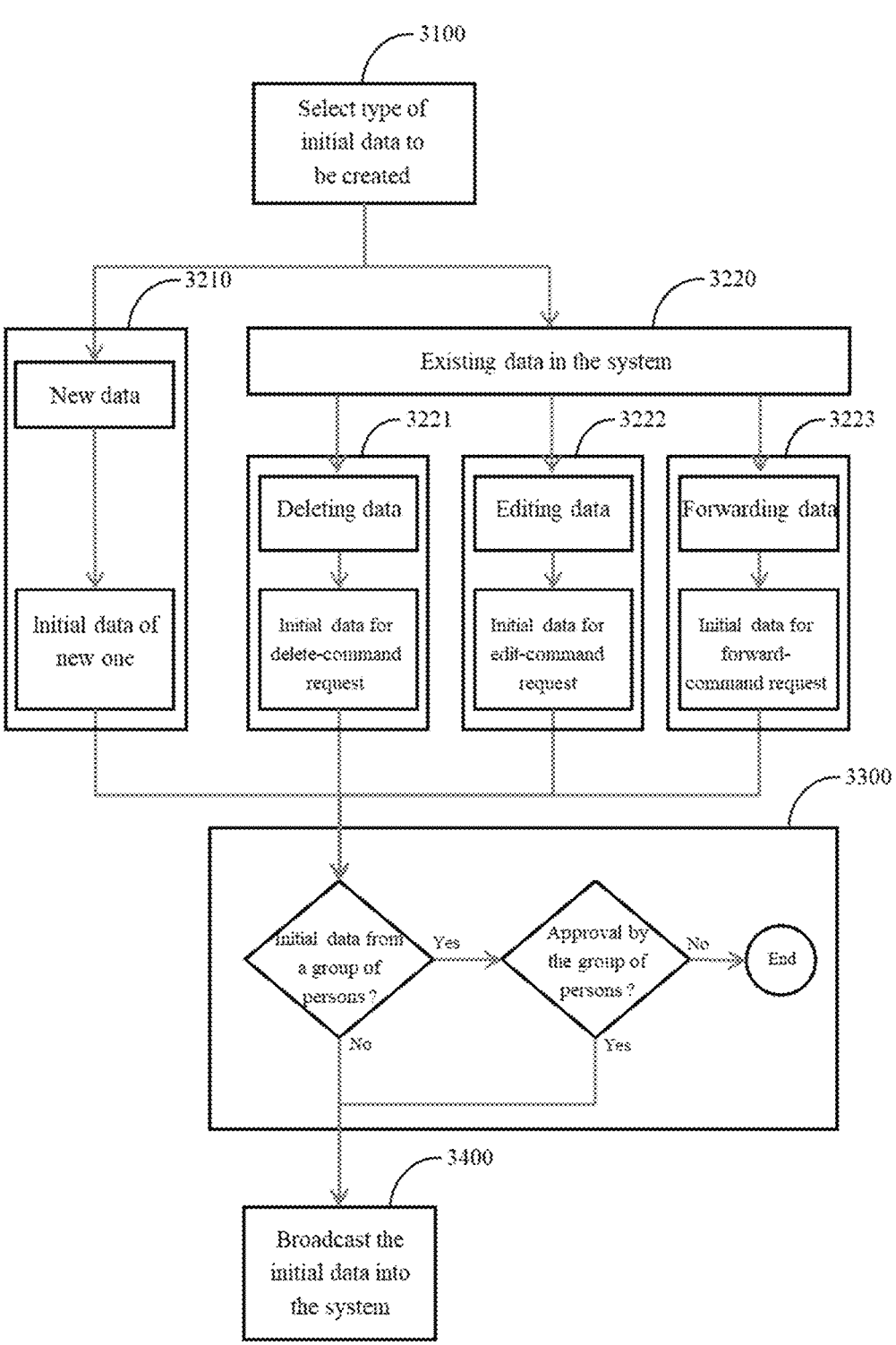
FIG. 14 shows a method of creating initial data and broadcasting the initial data to nodes of blockchain according to an embodiment of the present invention.

FIG. 14 shows a method of creating initial data and broadcasting the initial data to nodes of blockchain according to an embodiment of the present invention.

In step 3100, a selection of the type of initial data to be created is made. Within the Multi Dimension Blockchain System, a person with identity in the system or a member of a group of persons with identity in the system can create an initial data with the consideration of type of the data. This consideration is to determine whether to create new data, or modify from existing data in the system, or delete the previous existing data before creating new one. In some implementations, the application of Multi Dimension Blockchain System may limit some types of request for editing or deleting the existing information to comply with the exemptions being defined by law.

If a selection to create new data is made, the method moves to step 3210. If a selection to proceed with existing data is made, the method proceeds to step 3220.

The step 3210 of creating new data involves creating a main block within the Main Blockchain System, which needs to create initial data relevant to requirements of that certain blockchain. For example, if that certain blockchain is for car trade, the initial data must be relevant to car trade subject. There are two types of data created: data being generated automatically by the system, such as data owner, and information which the person with identity in the system or the members of the group of persons with identity in the system creates. The data can be any form of text, audio file, image file, movie file or other digital data, which is relevant to requirements of particular blockchain. In some implementations for financial business, the initial data could be the number of money and types of transaction, such as deposit money, withdraw money or transfer money. In some implementations for healthcare business, the initial data could be a prescription which defines patient name along with order of medical drug, dose and its quantity, to drug store. In some implementations for registration of artwork, the initial data could be a list of artworks associated with name in charge of possession and date of starting possession.

The step of proceeding with existing data in the system 3220 may comprise deleting data 3221, editing data 3222 or forwarding data 3223.

Deleting data 3221 involves creating a delete-command block within Delete Control Blockchain System. User interface system will help to provide a desired main block, from the Owner Blockchain System. This step may involve the user searching for and selecting the corresponding block on their owner blockchain. In some implementations, there may be a tool for searching by dimension or by time of when the block was created. Once select the desired block, press "Confirm". Then, the system will generate initial data as follows: Data owner defines the person or the group creating the initial data has ownership and Information of command to delete the data part inside the specified block. However, the initial data may not be approved by Nodes or any specified approvers to delete the existing data, if not complied with rules and regulations of deleting data. In some implementations for financial business, the existing data of deposit money or withdraw money may not be allowed for deleting, since it can affect the whole reconciliation of money transaction within bank system, associated with the exemption defined by law. In some implementations for healthcare business, the existing data of prescription may be allowed for deleting once it lasts longer than a period of time defined by law. In some implementations for registration of artwork, the existing data of possession of artwork may be allowed for deleting as of personal data protection regulation, except if any exemption specified by law.

Editing data 3222 involves creating an edit-command block within Edit Control Blockchain System. User interface system will help to provide a desired main block from Owner Blockchain System. This step may involve the user searching for and selecting the corresponding block on their owner blockchain. In some implementations, there may be a tool for searching by dimension or by time of when the block was created. Once select the desired block, press "Confirm". Then, the system will generate initial data as follows: Data owner defines the person or the group creating the initial data has ownership and Information of command to edit the data part inside the specified block. This can be a modification of or replacement of the existing text, audio file, image file, movie file or other digital data inside the block.

However, the initial data may not be approved by Nodes or any specified approvers to edit the existing data, if not complied with rules and regulations of editing data. In some implementations for financial business, the existing data of deposit money or withdraw money may not be allowed for editing the amount of money in transaction or type of money transaction. In some implementations for healthcare business, the existing data of prescription may be or may not be allowed for editing which depends on what kind of editing. Editing the misspelling of drug name may be allowed, but editing the drug name, from one specific drug to another, may not be allowed. In some implementations for registration of artwork, the existing data of artwork may be allowed for editing in the case of misspelling or new defined term of subject.

Forwarding data 3223 involves creating a forward-command block within Forward Control Blockchain System. User interface system will help to provide a desired main block from Owner Blockchain System. This step may involve the user searching for and selecting the corresponding block on their owner blockchain. In some implementations, there may be a tool for searching by dimension or by time of when the block was created. Once select the desired block, press "Confirm". Then the system will generate initial data as follows: Data owner defines the person or the group creating the initial data has ownership and Information of command specifying which part of data inside the specific block to be forwarded, and to whom. The recipients can be specified as more than one person with entity in the system or one group of persons with entity in the system. However, the initial data may not be approved by Nodes or any specified approvers to forward the existing data, if not complied with rules and regulations of forwarding data. In some implementations for financial business, the existing data of deposit money or withdraw money may be allowed for forwarding to others, except for some certain transactions. In some implementations for healthcare business, the existing data of prescription may be or may not be allowed for forwarding which depends on what kind of forwarding. Forwarding to other irrelevant persons may not be allowed, but forwarding to the relevant doctor may be allowed. In some implementations for registration of artwork, the existing data of artwork may be allowed for forwarding to others who are interesting in buying that artwork.

Step 3300 of approving the initial data on behalf of the group of persons with identity in the system follows step 3210, or one of step 3221, step 3222 and step 3223. If the initial data is created by the person with identity in the system, the processing can skip this step. However, the initial data was created by a member of a group on behalf of the group, approval from members of the group who have right to approve the initial data may be required.

The system will submit the request for creating initial data to all those members with right to approve. They will receive a notification through their portable communication device 102 regarding an approval request. The system will show a list of approval requests. In response the user can select the approval request for creating the initial data as desired, and the system will move to the functionality and screen display with relevant to the request. For example, if the initial data is a request for creating new data, the system will go to functionality of "Creating data" automatically. For another example, if the initial data is a request for deleting the existing data, the system will go to functionality of "Deleting data" automatically. The approver will take a consideration and can either approve or reject the request. The rejection will result in canceling the request, as the initial data is on behalf to the group, which requires no reject of any. Once the number of approvals for the request reaches the minimum of requirement without any rejection within required period, the request is counted as approved and ready to proceed. The system will notify the member who creates the initial data for each result of approval and reject by each approver.

If the request is approved, the method moves to step 3400 in which the initial data is broadcast into the system. Once the initial data is ready to proceed, the creator of the initial data selects to the functionality of "Broadcasting an initial data". Then select the desired initial data and presses "Confirm". The system will broadcast the initial data via internet system to all nodes within Multi Dimension Blockchain System.

All Nodes will receive the initial data, before validating and creating as a new block, which will be described in the next section.

Figure 15:
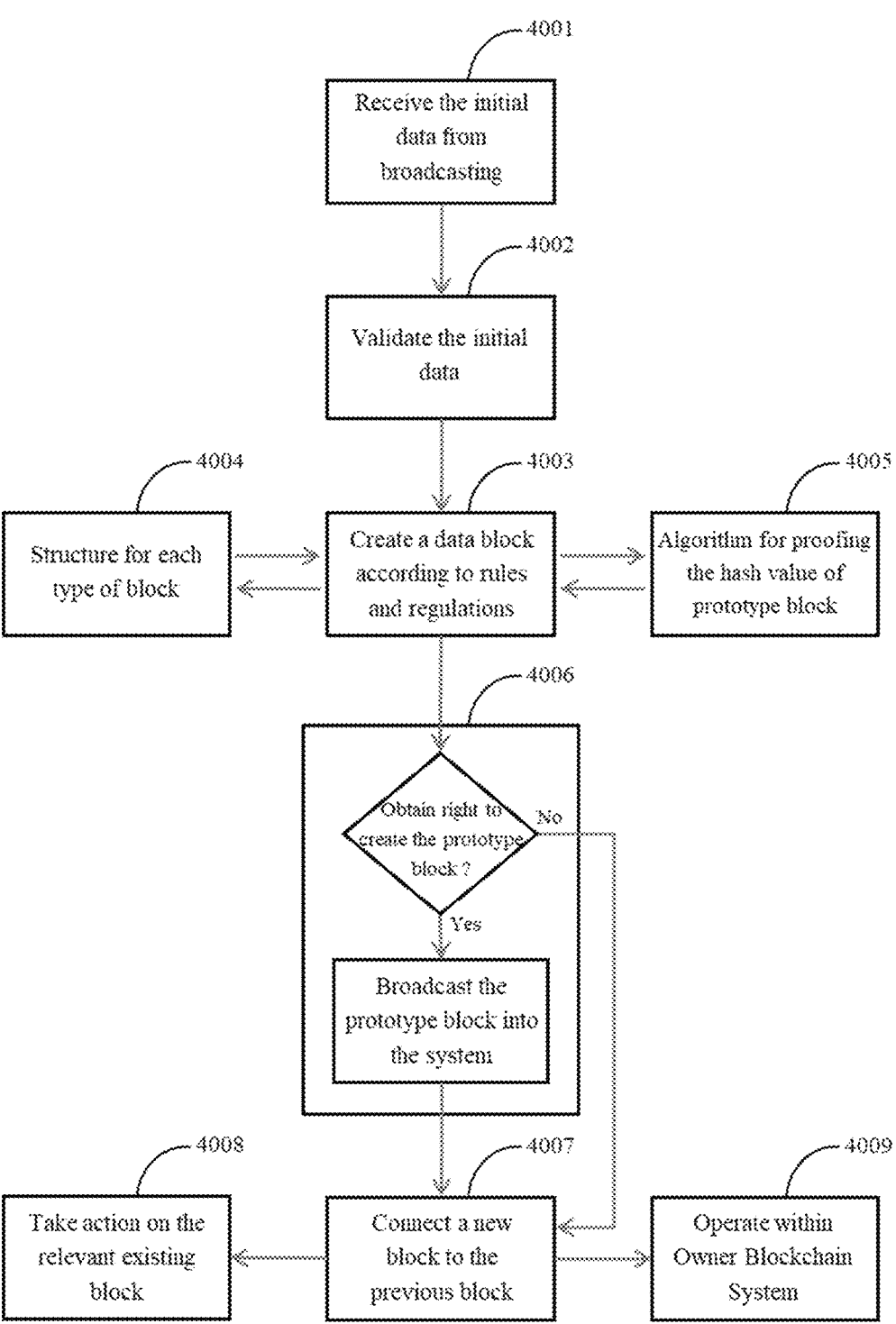
FIG. 15 shows a method of creating a block and determining a Node to create the prototype block according to an embodiment of the present invention.

FIG. 15 shows a method of creating a block and determining a Node to create the prototype block according to an embodiment of the present invention. Once the initial Data is created and broadcasted via the internet system into Multi Dimension Blockchain System, all Nodes 132 then receive the initial data and proceed for creating a data block according to a defined structure. However, only one Node is granted permission to create a new block as the prototype and broadcast it to the system, so that other Nodes can take that prototype block. The block will be stored in their database system and connected to the previous block in the relevant blockchain line.

In step 4001, the initial block is received from the broadcasting. Node 132 has a Communication Interface System 137 which operates for connecting the signal and transmitting data to the external network via the internet. All data which other users broadcast into Multi Dimension Blockchain System will be received, imported and then processed. Blockchain Processing Logic System 138 will take the initial data to validate and create as a block. All Nodes 132 will operate in the same manner, except for the node that sent the initial data, with the logic and reason of conflict of interest. The Node that created the initial data could be bias of validation and could take advantage of obtaining the right to create the prototype, because it knows the initial data before broadcasting to other Nodes.

In step 4002, the initial data is validated. At this stage, Blockchain Processing Logic System 138 will check the nature of the initial data, the compliance with rules and regulations, and accuracy of information. There is a linked list, which records the structure and order of blocks in blockchain line, with pointers to facilitate the accessing to a desired block. In case of creating a new data, the system will check the relationship and the correctness of the information against the information inside the previous blocks, using a linked list. In some implementations for financial business, the request for withdrawing money or transferring money needs to be checked whether the owner of money has enough money for withdrawing or transferring or not. If enough, this is one point of validating information. However, there may be some more points to validate further. In some implementations for healthcare business, the prescription needs to be checked whether the drug exists and is permitted by Food and Drug Administration or not. If existing and being permitted, this is one point of validating information. However, there may be some more points to validate further. In some implementations for registration of artwork, the request for a registration of new artwork needs to be checked whether it duplicates with any previous one or not. If not, this is one point of validating information. However, there may be some more points to validate further. In some implementations of digital signature for an authorized person, it needs to be checked whether the one who signs has the authority according to his or her status or not. If have the authority, this is one point of validating information. However, there may be some more points to validate further. In case of interacting with an existing data, such as deleting, editing and forwarding data, the system will check the rules and regulations whether it can be performed or not, as well as check the correctness of the information against the information inside the previous blocks. In some implementations for financial business, the request for deleting the record of deposit money or withdraw money may not comply with rules and regulations. Then this initial data does not pass the validation. In some implementations for registration of artwork, the request for deleting the registration record by the owner of the artwork, may comply with rules and regulations, unless there is a special rule to prohibit. Then this initial data passes the validation. In some implementation for healthcare business, the request for forwarding the prescription to drug store with a pharmacist in charge, may comply with rules and regulations, unless there is a special rule to prohibit. Then this initial data passes the validation.

In step 4003, block data is created according to the rules and regulations. After passing the validation, the initial data will be created as a block according to the specification of block structure, which is interactively relates within all three dimensions of Main Blockchain System, Control Blockchain System and Owner Blockchain System. The essential part of the initial data, for example which is the "new data" for new block or "delete-demand request" for the existing block, will be stored in "Data" segment inside the block, whereas other data will be stored in other different fields and segments inside the block, according to each type of block structure.

The structure for each type of block 4004 is used in step 4003 to generate the relevant block type. The structures of main blocks, delete control blocks, edit control blocks and forward control blocks are described above.

An algorithm for proofing the hash value of the prototype block is executed in step 4005. There are several Nodes 132 within Multi Dimension Blockchain System, with likely expansion on number of Nodes. To prevent potential problems in duplicating a new building block, the system requires only one Node to create the prototype block. Then broadcast the prototype block to other Nodes for storing in their database system. To determine which node is eligible to create the prototype block, there is an algorithm for proofing the hash value of prototype block. The first Node which comes with the solution, earns the right to create the prototype block. The "hash value" that demand as a solution, is defined by the system for either the specific value or the range of value. In some implementations, the system may renew the value every 7 days. Algorithm for proofing the hash value of prototype block varies according to the type of block. For a new main block which is created within Main Blockchain System.

Data to be processed through the hash function is as follows: Header; Data Owner; Hash of Previous Owner Block; Hash of Previous Main Block; Node Code; Decisive Number; and Data. For a delete command block which is created within Delete Control Blockchain System, the data to be processed through the hash function is following: Header; Data Owner; Hash of Previous Owner Block; Hash of Previous Delete Control Block; Node Code; Decisive Number; Hash of Deleted Block; and Data. For an Edit-command block which is created within Edit Control Blockchain System, the data to be processed through the hash function as follows: Header; Data Owner; Hash of Previous Owner Block; Hash of Previous Edit Control Block; Node Code; Decisive Number; Hash of Edited Block; and Data. For a forward-command block which is created within Forward Control Blockchain System, the data to be processed through the hash function is as follows: Header; Data Owner; Hash of Previous Owner Block; Hash of Previous Forward Control Block; Node Code; Decisive Number; Hash of Forwarded Block; and Data. All data processed through the hash function is constant, except for Decisive Number which is variable. Therefore, the processing system of Node 132 will keep changing the value of the Decisive Number until reaching the desired result. For example, the desired result is to get the hash value of X1 or less than X1. The Decisive Number keeps changing randomly until that the algorithm for proofing the hash value$\leq$X1, then the process is completed. The first Node achieving the desired result is eligible for creating the prototype block. In some implementations, Decisive Number may be randomly assigned a value number and process it together with other constant values through the hash function. If not desired result, then randomize new value number and replace it in processing the hash function, until that the desired result is achieved. The final value of Decisive Number will be stored inside the prototype block. In some implementations, Decisive Number may use an ascending method. Beginning with the value "0" and processing it together with other constant values through the hash function. If not desired result, then increase the value to "1" and replaced in processing the hash function, until that the desired result is achieved. The final value of Decisive Number will be stored inside the prototype block. Once achieving the desired result, then complete creating the prototype block according to the structure for each type of block, by storing Decisive Number and Time-stamp of which time the block is created.

In step 4006, one node obtains the right to create the prototype block and broadcast it. After creating the prototype block and no other Node broadcasting of its prototype, the Node obtains the right to broadcast its prototype block into the system. Then that Node broadcasts the prototype block into Multi Dimension Blockchain System so that other Nodes can store it into their database system. If another Node has broadcast its prototype block into the system, the Node will not broadcast its recent-finishing-of-prototype block into the system. Unless there is a proof that the prototype block of other Node does not comply with the algorithm for proofing the hash value.

In step 4007, the new block is connected to the previous block. When the prototype block is broadcast into Multi Dimension Blockchain System, all Nodes 132 will receive it via Communication Interface System 137. The Nodes then take the prototype block through validation process to determine whether it complies with the algorithm for proofing the hash value or not. The process is quick since Decisive Number now is the constant value. If correct, Nodes will store it in their database system. One of the essential parameters inside the prototype block is Hash of Previous Block, applicable for all types of the block including Main Block, Delete Control Block, Edit Control Block, Forward Control Block and Owner Block. The Hash of Previous Block is an internal pointer to link with its relevant previous block. The system will also update its linked list, together with its pointer. All Nodes 132, including both the one which created the prototype block and the others which receive it, now have the same data of blockchain and linked list.

In step 4008, if appropriate, action is taken on the relevant existing block. If creating a new block within Main Blockchain System, then there is nothing to do with any existing block. However, if creating a delete-command block, edit-command block or forwarding-command block, Blockchain Processing Logic System 138 will execute the existing main block according to the instruction inside the command block.

In case of delete-command block, the system will access to the existing block specified in the instruction, and proceed as follows: All data in the Data filed will be erased. It is a free-up memory, which the value inside is not "0" so that the memory can be used to store other data. This helps to save the space within data storage. Change the value of Delete Count field from "0" to "1". Change the value of Delete Hash from "0" to "hash value" of the delete-command block. This helps to enable traceability and check for what the Data segment inside the block is empty, and which block commands for this deletion.

In case of edit-command block, the system will access to the existing block specified in the instruction, and proceed as follows: Modify data in the Data segment to what identified in edit-command block. Change the value of Edit Count field from "0" to "1".

In case of not the first time of editing data which there was modification before, the value of Edit Count will be increased by one (+1), representing the current number of time being edited. Change the value of Edit Hash from "0" to "hash value" of the edit-command block. In case of not the first time of editing data which there was modification before, the value of Edit Hash will be changed from previous value to "hash value" of this latest edit-command block. This helps to enable traceability and check for what the Data segment inside the block is edited, and which block commands for this modification.

In case of forward-command block, the system will access to the existing block specified in the instruction, and proceed as follows: Forward data in the Data segment to whom it is identified in forward-command block. Change the value of Forward Count field from "0" to "1". In case of not the first time of forwarding data which there was forward of this data before, the value of Forward Count will be increased by one (+1), representing the current number of times being forwarded. Change the value of Forward Hash from "0" to "hash value" of the forward-command block. In case of not the first time of forwarding data which there was forward of this data before, the value of Forward Hash will be changed from previous value to "hash value" of this latest forward-command block. This helps to enable traceability and check which block commands for this forward.

In step 4009, operations within the owner blockchain system are carried out. The Multi Dimension Blockchain System enables the eligible person with identity in the system 131 and the eligible group of persons with identity in the system 151 with the ownership of data block. The new block is not only connected within either Main Blockchain System or Control Blockchain System, but it is also connected with the previous block within Owner Blockchain System for the same ownership. The connection interactively comes from the same value of Data Owner and the same hash value kept inside the blocks. "Hash of Previous Owner Block" of the current block and "Hash of Present Owner Block" of the previous block has the same value and then enables the link between blocks within the blockchain line of the same data owner. At this point, the initial data created by the person or the group as mentioned earlier, has become the data block and has stored in database system of all Nodes 132 connected via internet system. The new block will connect in the sequence with the previous block within Multi Dimension Blockchain System completely. However, there is a processing of traceability within blockchain system and data reconciliation between all Nodes which to prevent from and correct for system failure or malicious attacks.

In some embodiments, a person with an identity in the system can digitally sign an attachment file of the initial data, with legal binding effect. Later the initial data, along with its attachment file, digital signature and relevant data, is created as a main block within Main Blockchain System, which has the significant specifications as follows: in the Data segment, three related data parts are stored regarding the use of digital signature. They are a digital document (being signed), digital signature (legal binding the document with the owner of signature) and time record of signing; all data inside Data segment of the main block, once being accessed and read, will always present the same data as original data at time of being stored, complying with the legal regulations. This enables the data stored inside the block is effective as original. The digital signature can be verified by applying of the pair of electronic keys, which is belong to the specific person. It can be confirmed that the specific person who owns the pair of electronic keys signed the relevant digital document with undeniable.

The document to be signed can be created either on the computer system 133 or Mobile Application System 109 of the portable communication device 102. Digital signature requires Private Key 121 stored on the signer's the portable communication device 102.

Figure 16:
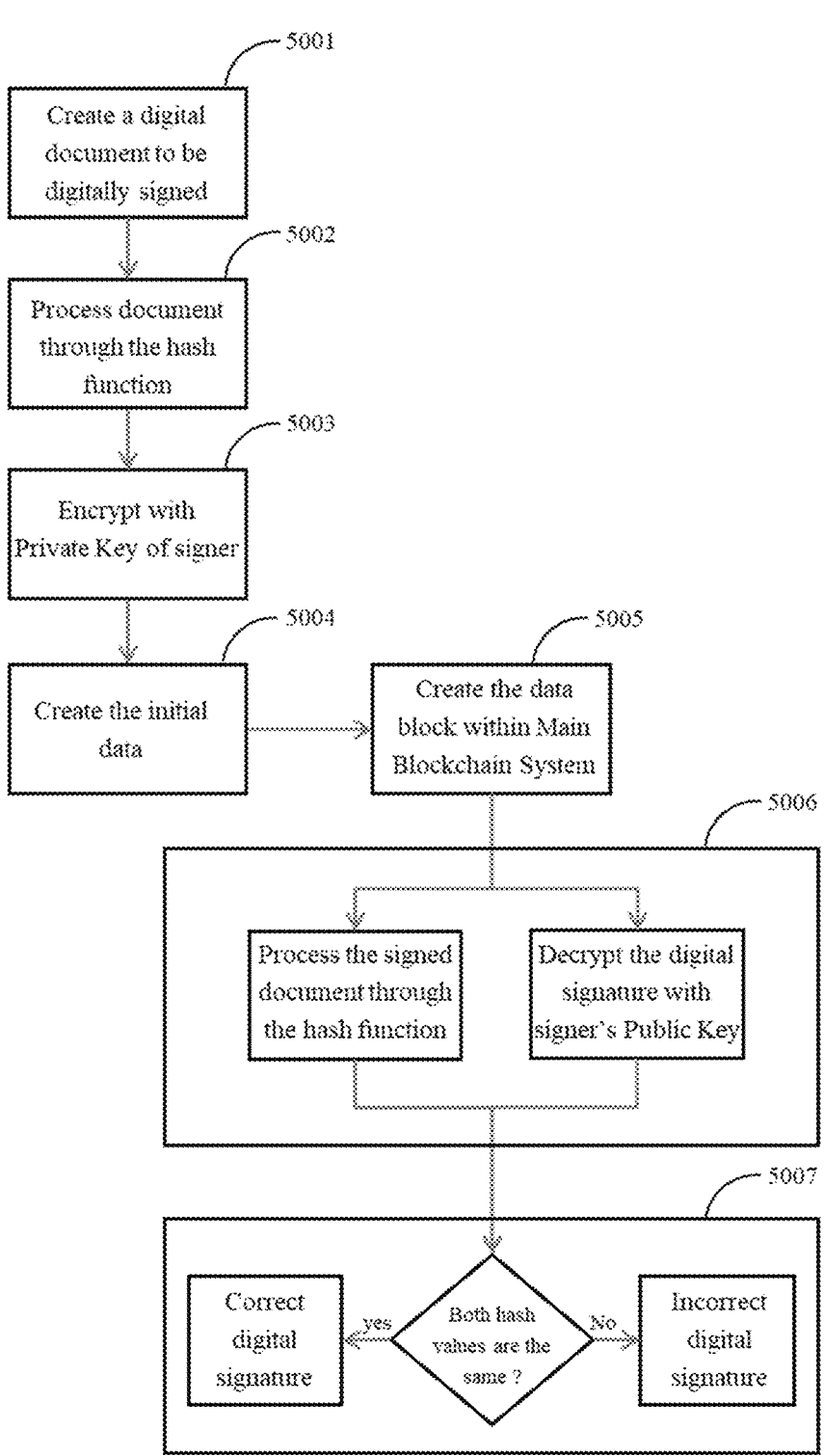
FIG. 16 shows a process to digitally sign a document and to verify the digital signature in an embodiment of the present invention.

FIG. 16 shows a process to digitally sign a document and to verify the digital signature in an embodiment of the present invention.

In step 5001, a document to be digitally signed is created. A person with identity in the system selects a functionality of "Creating data", which is the entry path through creating a main block within Main Blockchain System. There is a requirement to create the initial data according to the purpose of the blockchain line, such as to record an agreement of purchasing goods between individuals. There are 2 types of data created: automatically generated data and user created data. The automatically created data, such as data owner is generated automatically by the system. The user created data is created by the person with identity in the system 131 or the members of the group of persons with identity in the system 151 creates. This can be any form of text, audio file, image file, movie file or other digital data, which is relevant to requirements of particular blockchain. In some implementations, the information to be signed by the digital signature may be in form of data file, such as .PDF file and etc., and may have more than one file to be signed.

In step 5002, the document is processed through the hash function. The system will process the selected document through the hash function. The derived hash value will be encrypted with an electronic key of single key type, which is shown on screen display of the computer system 133 for further use of decoding. The hash value that is encrypted with an electronic key of single key type, is sent to Mobile Application System 109 of the portable communication device 102 with notification of the hash value of a document pending for signing process.

In step 5003, the hash value is encrypted with the Private Key of the signer. The user may access a functionality of "Digital signature" and select a sub-function of "Hash value of a document pending for signing process" through Mobile Application System 109. Then, the user selects the desired hash value of the document and press "Sign the selected hash value of the document with digital signature". The system will demand for input of the electronic key of single key type. The user Enters the electronic key of single key type, which shown on the screen display of the computer system 133. This enables the decryption of the hash value (of the document to be signed) which is sent to Mobile Application System 109 of the portable communication device 102. The system will process the decrypted hash value (of the document to be signed) with encryption of Private Key 121 of the signer (whose Private Key is stored in his portable communication device). The hash value (of the document being signed) with encryption of Private Key is the "Digital Signature" which is attached to the selected document. Time while Private Key is encrypted will be recorded as "Time of signing the document".

The "Digital Signature" and "Time of signing the document" will be encrypted with another electronic key of single key type, which is shown on screen display of the portable communication device 102 for further use of decoding. The "Digital Signature" and "Time of signing the document" that is encrypted with another electronic key of single key type, is sent to the computer system 133 with notification of encrypted Digital Signature and its data. In some implementations, creating a digital document (to be signed) is done on the computer system 133 while the encryption with Private Key is carried out on Mobile Application system 109 operating on the portable communication device 102. This is suitable for a digital document with large size and supports for any common types of programming file. In some implementations, creating a digital document (to be signed) is done on Mobile Application System 109 operating on the portable communication device 102 and it is then encrypted with Private Key on the same Mobile Application system 109 of the portable communication device 102. This is suitable for a digital document with small size and supports for some simple specific types of programming file.

In step 5004, initial data is created. The computer system 133 has a notification regarding encrypted Digital Signature and its data. The user goes to the functionality of "Digital signature" and selects a sub-function of "Decrypt digital signature and its data". Select the encrypted Digital Signature and its data and press "Confirm". The system will demand for input of the electronic key of single key type. Enter the electronic key of single key type, which shown on the screen display of the portable communication device 102. This enables the decryption of the Digital Signature and Time of signing the document which having been sent to the computer system 133. Then go to the functionality of "Broadcasting an initial data" and select the digital document (being signed), the Digital Signature and Time of signing the document. Press "Confirm". The system will broadcast the initial data of the digital document (being signed), the Digital Signature and Time of signing the document via internet system to all Nodes. In some implementations, the display of a digital document (being signed) may present with an attached symbol to indicate that the document was signed, such as the picture of signature.

In step 5005, a data block is created on the main blockchain system. All Nodes 132 will receive and then validate the initial data. Eventually, if all validation is correct, the data block is created within Main Blockchain System associated with the processes as described above. The process of creating a block and determining a Node to create the prototype block. The Digital Signature which is stored inside Data segment of the block can be verified in the following step 5006. In some implementations, the right to verify the Digital Signature is limited to some certain persons associated with the digital document. For example, if the signer submits the digital document to a recipient, then the recipient will have the right to verify it.

In step 5006, the digital signature is verified. The person who has the right to verify the Digital Signature turns on the program and goes to the functionality of "Digital signature" and selects the sub-function of "Digital signature verification". They then select the digital document and the Digital Signature and press "Confirm". The system will process the digital document through the hash function, which the same algorithm used to create a digital signature. The hash value is derived (to avoid any confusion in next step, this is referred to as the "hash value of Doc"). The system will decrypt the Digital Signature with the signer's Public Key, resulting in the original hash value before being encrypted (to avoid any confusion in next step, this is referred to as the "hash value of Sig").

In step 5007, the verification result is determined. The system compares the hash value derived from the hash function of the digital documents (hash value of Doc) and the hash value resulted from decryption of the Digital Signature with the signer's Public Key (hash value of Sig). If they are the same value, it is confirmed that the digital document was signed by the right person (who owns Public Key). If there is a mismatch, this indicates that the digital document was not signed by the indicated person whose Public Key used in the validation process. This could come from following causes. In case of that Public Key of the indicated person cannot decrypt the Digital Signature, the indicated person did not sign on the document. In case of that Public Key of the indicated person can decrypt the Digital Signature (getting hash value of Sig) but not the same hash value of the digital document (hash value of Doc), the indicated person technically signed on the other digital document. Not sign on the presented digital document. The system reports the verification result of the Digital Signature to the person who has the right to verify it.

Many persons with identity in the system 131 can jointly sign on the same attachment file of the initial data, with legal binding effect. Later the initial data along with its attachment file and digital signatures of each signer is created as a main block in Main Blockchain System, which has the significant specifications as follows. In Data segment, three related data parts are stored regarding the use of digital signatures. They are a digital document (being signed), digital signatures (legal binding the document with the owner of signature) of each signer and time records of each signing. All data inside Data segment of the main block, once being accessed and read, will always present the same data as original data at time of being stored, complying with the legal regulations. This enables the data stored inside the block is effective as original. Digital signatures of each signer can be verified by applying of each pair of electronic keys, which is belonging to the specific person. It can be confirmed that each specific person who owns the pair of electronic keys signed the relevant digital document with undeniable. Creating digital document (to be signed) can be performed either on the computer system 133 or Mobile Application System 109 of the portable communication device 102 which is based on the limitations of the data files. The portable communication device 102 may only support some certain types of data files. Digital signature requires Private Key 121 stored on the signer's the portable communication device 102.

The process for many persons with identity in the system 131 to jointly sign the same digital document with each digital signature and to verify the signature is as follows:

Step No. 1: Create a digital document that needs to be digitally signed jointly. A person with identity in the system 131 turns on the program of Multi Dimension Blockchain System on the computer system 133 and goes to functionality of "Creating data", which is the entry path through creating a main block within Main Blockchain System. There is a requirement to create the initial data according to the purpose of the blockchain line, such as to record a contract of purchasing goods which requires 2 or more persons to sign. There are types of data created: Automatically generated data and data created by a user. In some implementations, the information requiring to be signed by the digital signature may be in form of data file, such as .PDF file and etc., and may have more than one file to be signed.

Step No. 2 Create a list of joint signers. A person with identity in the system 131 goes to functionality of "Digital signature" and selects a sub-function of "Creating a document to be signed by more than one person". Select the desired document which has been created in Step No. 1, from drop-down list. Press "Confirm". Then select a person with identity in the system 131, one by one, whom needs to jointly sign the document. The person who creates a digital document also needs to select himself or herself, if he or she is one of the signers. The system will encrypt the selected document with an electronic key of single key type, which has a different code for each person in the list of joint signers. The code of the electronic key will be sent to email address of each person particularly. The digital document, being encrypted with the electronic key of single key type, is sent to Mobile Application System 109 of the portable communication device 102 of each signer with notification of a document pending for joint signing process.

Step No. 3 Encrypt with Private Key of signer. The portable communication device 102 has a notification regarding a document pending for joint signing process. Then each person in the list of joint signers accesses through Mobile Application System 109 for a functionality of "Digital signature" and selects a sub-function of "A document pending for joint signing process". Select the document and press "Sign the selected document with digital signature". The system will demand for input of the electronic key of single key type. Enter the electronic key of single key type, which is informed via email. This enables the decryption of the digital document (to be signed). The system will process the decrypted digital document through the hash function. The hash value of the digital document is derived. The system will process the hash value of the digital document with encryption of Private Key 121 of each signer. The hash value of the digital document with encryption of Private Key of each signer is the "Digital Signature" of each signer which is attached to the selected document. Time while Private Key is encrypted will be recorded as "Time of signing the document" of each signer. The digital document, "Digital Signature" and "Time of signing the document" will be encrypted with another electronic key of single key type. The code of the electronic key will be sent to email address of the person who created a digital document and the list of joint signers. The digital document, "Digital Signature" and "Time of signing the document" that is encrypted with another electronic key of single key type, is sent to the computer system 133 of the person who created the digital document and the list of joint signers, with notification of encrypted Digital Signature and its data for joint signing.

Step No. 4 Verify each Digital Signature and create the initial data. The computer system 133 of the person who created the digital document and the list of joint signers, has a notification of encrypted Digital Signature and its data for joint signing, which coming one by one from each signer. Then turn on the program and go to the functionality of "Digital signature" and select a sub-function of "Decrypt digital signature and its data for joint signing". Select the encrypted Digital Signature and its data for joint signing, and press "Confirm", one by one. The system will demand for input of the electronic key of single key type. Enter the particular electronic key of single key type, which is informed by the particular signer via email. This enables the decryption of the digital document, Digital Signature and Time of signing the document which having been sent to the computer system 133. Once completing all decryption processes of encrypted Digital Signature and its data for joint signing of all signers, then go to the functionality of "Digital signature" and selects the sub-function of "Digital signatures verification for joint signing". Select all digital documents and all Digital Signatures which are coming from all signers and press "Confirm". The system will process the digital document of each signer through the hash function, which the same algorithm used to create a digital signature. One by one, the hash value of the digital document of each signer is derived, until finishing all. (To avoid any confusion in next step, name them as "all hash values of Doc"). The system compares all hash values, which are derived from each signer's digital document. If all hash values are the same value, it is confirmed that all signers signed on the same digital document. The system will decrypt the Digital Signature with the signer's Public Key, one by one, resulting in the original hash value before being encrypted, unit finishing all. (To avoid any confusion in next step, name them as "all hash values of Sig"). The system compares all hash values derived from the hash function of the digital documents of each signer (all hash values of Doc) and all hash values resulted from decryption of the Digital Signature with each signer's Public Key (all hash values of Sig). If they are the same value, it is confirmed that the digital document was signed by each person correctly.

Then go to the functionality of "Broadcasting an initial data" and select the digital document (picking only one data, as all are the same), the Digital Signatures of each signer and Time of signing the document of each signer. Press "Confirm". The system will broadcast the initial data of the digital document (being signed), the Digital Signatures of each signer and Time of signing the document of each signer via internet system to all Nodes. In some implementations, the display of a digital document (being signed) may present with attached symbols to indicate that the document was signed, such as the pictures of each signature.

Step No. 5 Create the main block. All Nodes 132 will receive and then validate the initial data. Eventually, if all validation is correct, the main block is created. The Digital Signature which is stored inside Data segment of the block can be verified in the following step. In some implementations, the right to verify the Digital Signature is limited to some certain persons associated with the digital document. For example, if the signer submits the digital document to a recipient, then the recipient will have the right to verify it.

Step No. 6 Verify all Digital Signatures. The person who has the right to verify the Digital Signatures turns on the program and goes to the functionality of "Digital signature" and selects the sub-function of "Digital signatures verification for joint signing". Select the digital document and all Digital Signatures of each signer and press "Confirm". The system will process the digital document through the hash function, which the same algorithm used to create a digital signature. The hash value is derived. (To avoid any confusion in next step, name it as the "hash value of Doc").

The system will decrypt all Digital Signatures with each signer's Public Key, one by one, resulting in the original hash value before being encrypted, until finishing all. (To avoid any confusion in next step, name them as "all hash values of Sig").

Step No. 7 Report the verification result. The system compares the hash value derived from the hash function of the digital documents (hash value of Doc) and all hash values resulted from decryption of each Digital Signature with each signer's Public Key (all hash values of Sig). If they are the same value, it is confirmed that the digital document was jointly signed by all indicated persons (who own indicated Public Keys). If there is a mismatch, this indicates that the digital document was not jointly signed by all indicated persons whose Public Keys are used in the validation process. This could come from following causes. In case of that Public Key of any indicated person cannot decrypt the Digital Signature, that indicated person did not sign on the document. In case of that a certain Public Key of which indicated person can decrypt its Digital Signature but not the same hash value of the digital document, the certain indicated person technically signed on the other digital document. Not sign on the presented digital document. The system reports the verification result of the Digital Signatures to the person who has the right to verify it.

The Main Blockchain System consists of a wide variety of main blockchain lines, being created for the purposes of the creator. However, all blockchain lines are controlled under Delete Control Blockchain System, Edit Control Blockchain System and Forward Control Blockchain System, as well as emerging within Owner Blockchain System for the same data owner. Once the data owner wants to delete existing data, edit existing data or forward existing data within any main blockchain line, it will be operated within the same Delete Control Blockchain System, Edit Control Blockchain System and Forward Control Blockchain System. Every new data block which has been created within any types of blockchain line, will also emerge within Owner Blockchain System and being connected for the same data owner. For example, the first blockchain line was created for the purpose of keeping a medical record of patients, while the second blockchain line was created for financial transactions. Every time a person with identity in the system performs a health check, applying Multi Dimension Blockchain System, the system will create a data block within the first blockchain line. Every time the same person makes a financial transaction, applying Multi Dimension Blockchain system, the system will create a data block within the second blockchain line. Those two blocks will emerge within his or her owner blockchain line. Once he or she wants to delete any of those two blocks, he or she needs to create a delete-command block within Delete Control Blockchain System. The same manner is applied for editing and forwarding any of those two blocks. To create a new main blockchain line within Main Blockchain System, the creator can define and specify the rules and conditions according to the purpose of the creation. Moreover, it can be defined for the condition of ownership of the information. The ownership can belong to either the creator of initial data, or other person or other group of persons. To appoint the right of information to other, it requires that the specified person or the specified group accepts and approves it during the process of creating the initial data first. In some implementations, the blockchain line for medical record may apply for a medical doctor who checks up with a patient, and assign the ownership of that medical record to the patient. However, it requires the patient to accept his ownership during create the initial data of medical record first.

Figure 17:
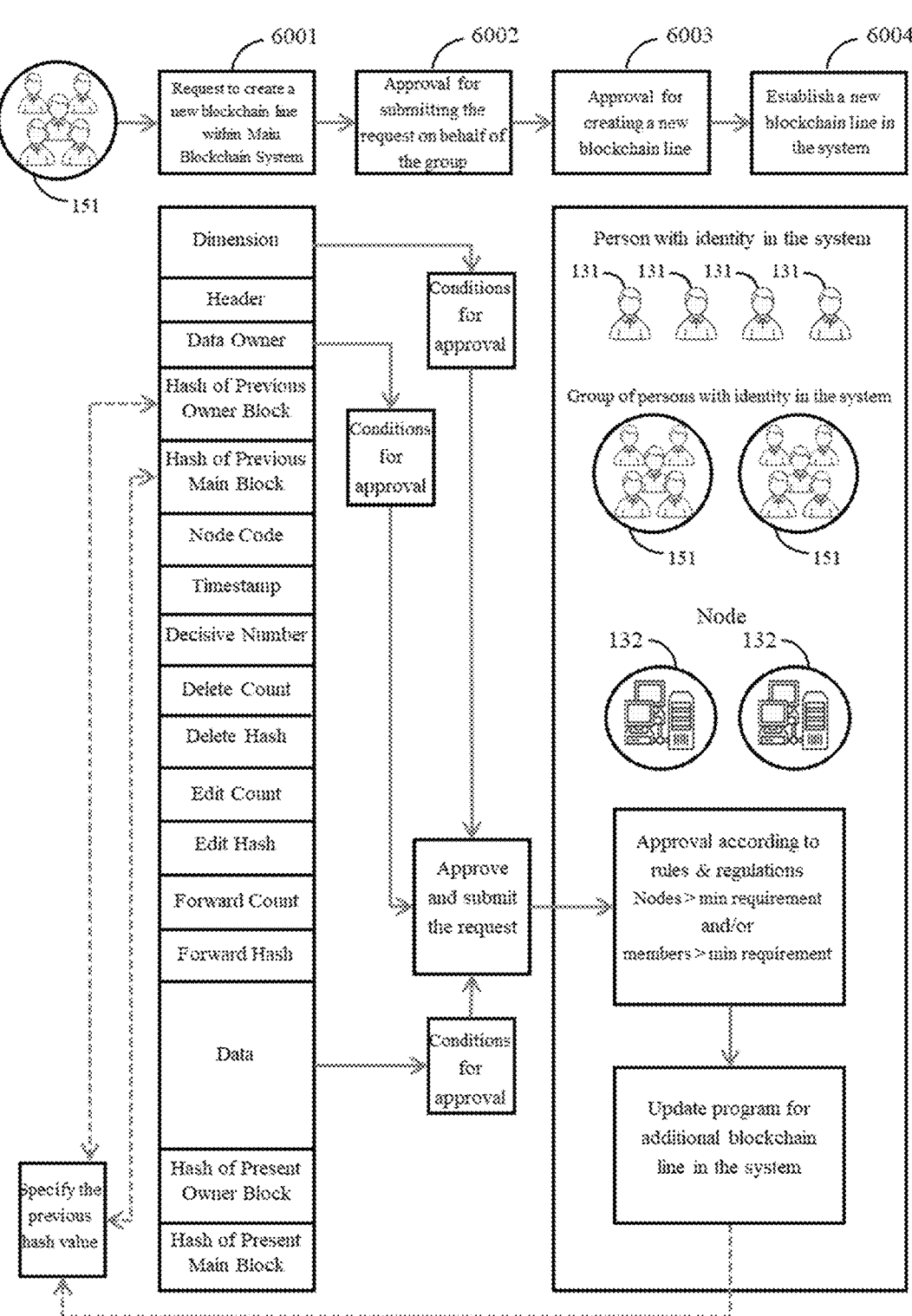
FIG. 17 shows a process of creating a new main blockchain line within Main Blockchain System according to an embodiment of the present invention.

FIG. 17 shows a process of creating a new main blockchain line within Main Blockchain System according to an embodiment of the present invention.

In step 6001, a request to create a new blockchain line within the Main Blockchain System is made. A member of the group of persons with identity in the system 151 selects the functionality of "Creating a new blockchain line within Main Blockchain System". The system will request the following information: Part of Dimension field—Name Dimension and Describe the scope and objective; Part of Data Owner field—Define user type and define the ownership conditions; Part of Data segment—Define Parameters, Define the data field, Define the formulas and Set instructions and execution programs.

In step 6002, approval for submitting the request on behalf of the group is sought. The request for creating a new blockchain line, considered as an initial data, will be forwarded to the members of group who have the right to approve initial data. Once the approvers have submitted their approval exceeding the minimum requirement, without any reject within specified period, the request for creating a new blockchain line is deemed to have been done on behalf of the group. Then it is broadcast into the system.

In step 6003, approval for creating a new blockchain line is obtained. The request for creating a new blockchain line which has been broadcast is considered and approved by the authorized authority, according to defined user type of the blockchain line. The approver will consider on three conditional factors of Dimension, Data Owner and Data whether they are suitable for the purpose of use or not. Once an approver has approved it, the approval result will be submitted into the system. At the same time, it will receive information of approval results from other approvers in the system. Other users in the system, both with and without permission, will be waiting to receive the approval results as well. If the number of approval results is greater than the number specified by the system, the system of each user will recognize that the request to create a new blockchain line has been approved and will continue to create the new blockchain line on the system.

In step 6004, the new blockchain line is established on the system. Once the system of each user recognizes that the request to create a new blockchain line has been approved, Blockchain Processing Logic 138 of Node 132 will update to add a newly main blockchain line with following essences. The name of the new blockchain line will be the name given in the request at part of Dimension field. Eligibility for the new blockchain line must be a person with identity in the system 131 or a group of persons with identity in the system 151 as specified in the request at part of Data Owner field. When users who have rights to use the new blockchain line create the initial data, the operation of data input, data attachment, and other executions will be performed along with what have been specified in the request at part of Data segment. Update list of main blockchain line into the selection of all the associated functionalities. Configure the hash value to be store in "Hash of Previous Main Block" inside the genesis block. In some implementations, this may define the value of "0". In some implementations, this may define the value which is derived from the hash function of part of Dimension field. Configure the hash value to be store in "Hash of Previous Owner Block" inside the genesis block. In some implementations, this may define the value of "0". In some implementations, this may define the value which is derived from the hash function of part of Data Owner field. Mobile Application System 109 of the portable communication device 102 will update to add a newly main blockchain line in the same manner. This is in accordance with the functionality that is designed to be performed on the portable communication device, subject to the technical limitations of the device. The Newly main blockchain line which has been established in Main Blockchain System will be ready for use to create its new main block, connecting with its previous block and next coming block, according to rules and regulations of Main Blockchain System. Its new main block also emerges in Owner Blockchain System and connected with other blocks with the same owner. Eventually its new main block can be deleted, edited and forwarded according to rules and regulations of deleting data, editing data and forwarding data respectively.

A key feature of the Multi Dimension Blockchain System is the traceability of all interrelated data blocks. This includes the verification of data inside the block whether its hash value is correct or not. Verification of data blocks that are linked together in the same blockchain line, or even being linked across blockchain lines of different dimensions is possible. One of the tools for traceability is a linked list, which records the structure and order of the block within blockchain line, with internal pointers and external pointers to facilitate the accessing to a desired block for verification. There are three methods of traceability and these are described below with reference to FIG. 18, FIG. 19 and FIG. 20.

Figure 18:
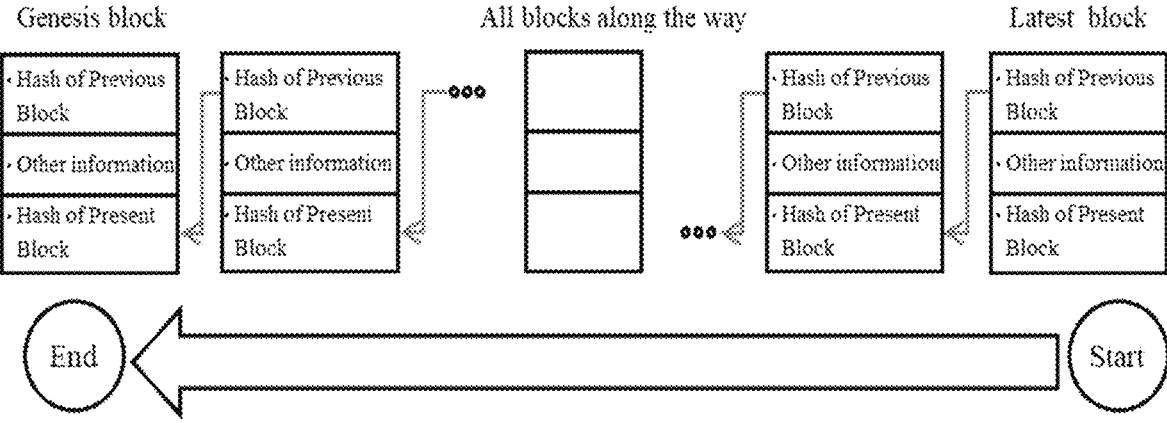
FIG. 18 shows a method of authenticating blockchain data according to an embodiment of the present invention.
Figure 18:
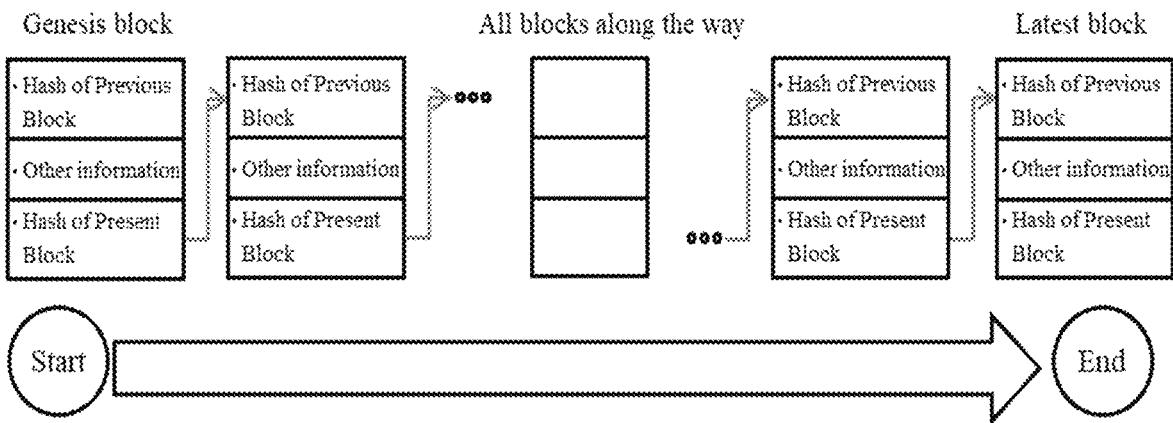

FIG. 18 shows a method of authenticating blockchain data according to an embodiment of the present invention. The method shown in FIG. 18 involves tracing blocks within a particular blockchain line. The method is as follows. Initially, the desired blockchain line is selected to perform the traceability. The system will limit the check only for those data blocks of which Dimension field meeting the criteria.

Then the latest Block within the blockchain line is selected, facilitating by the linked list to point the latest block. It is also possible to find the latest block by using Timestamp value.

Then, the hash value of the previous block is retrieved. The hash value of the previous block is stored, depending on type, as follows: For Main Blockchain System, it is stored at Hash of Previous Main Block field. For Delete Control Blockchain System, it is stored at Hash of Previous Delete Control Block field. For Edit Control Blockchain System, it is stored at Hash of Previous Edit Control Block field. For Forward Control Blockchain System, it is stored at Hash of Previous Forward Control Block field. For Owner Blockchain System, it is stored at Hash of Previous Owner Block field.

Then, the linked list is checked using the hash value of the previous block as an internal pointer to access through the previous block, whose present hash value is matched. The present hash value is stored, depending on type, as follows: For Main Blockchain System, it is stored at Hash of Present Main Block field. For Delete Control Blockchain System, it is stored at Hash of Present Delete Control Block field.

For Edit Control Blockchain System, it is stored at Hash of Present Edit Control Block field. For Forward Control Blockchain System, it is stored at Hash of Present Forward Control Block field. For Owner Blockchain System, it is stored at Hash of Present Owner Block field.

The above process is repeated to access through the previous blocks one by one.

Retrieve the hash value of the previous block. Check the linked list by using the hash value of the previous block as the internal pointer to access through the previous block, whose present hash value is matched and keep going on.

Once the genesis block is reached, the process stops then stops. The genesis block contains a special system-defined value to distinguish itself. The special value is stored at Hash of Previous Main Block field, Hash of Previous Delete Control Block field, Hash of Previous Edit Control Block field, Hash of Previous Forward Control Block field, or Hash of Previous Owner Block field, depending on the type of blockchain. In some implementations, a special value for genesis block is the hash value being derived from Dimension value. In some implementation, a special value for the genesis block is the value of "0".

The system will perform another round of traceability, but this time is from the genesis block to the latest block as follows.

Select the genesis block within the blockchain line, facilitating by the external pointer of linked list to point the genesis block.

Retrieve the hash value of the present block, which is stored, depending on type, as follows: For Main Blockchain System, it is stored at Hash of Present Main Block field. For Delete Control Blockchain System, it is stored at Hash of Present Delete Control Block field. For Edit Control Blockchain System, it is stored at Hash of Present Edit Control Block field. For Forward Control Blockchain System, it is stored at Hash of Present Forward Control Block field. For Owner Blockchain System, it is stored at Hash of Present Owner Block field.

Check the linked list by using the hash value of the present block as the internal pointer to access through the next block, which stores the hash value of previous block at the same value. The hash value of previous block is stored, depending on type, as follows: For Main Blockchain System, it is stored at Hash of Previous Main Block field. For Delete Control Blockchain System, it is stored at Hash of Previous Delete Control Block field. For Edit Control Blockchain System, it is stored at Hash of Previous Edit Control Block field. For Forward Control Blockchain System, it is stored at Hash of Previous Forward Control Block field. For Owner Blockchain System, it is stored at Hash of Previous Owner Block field.

Repeat the following processes to access through the latest block one by one. Retrieve the hash value of the present block. Check the linked list by using the hash value of the present block as the internal pointer to access through the next block, which stores the hash value of previous block at the same value and keep going on.

Once the latest block is reached, the process stops. If done successfully, it is confirmed that there is no foreign block being inserted within the blockchain line, and no blockchain fork (where a blockchain diverges into more than one path forward) as well.

The above method can be applied to all types of blockchain line, including Main Blockchain System, Delete Control Blockchain System, Edit Control Blockchain System, Forward Control Blockchain System and Owner Blockchain System.

Figure 19:
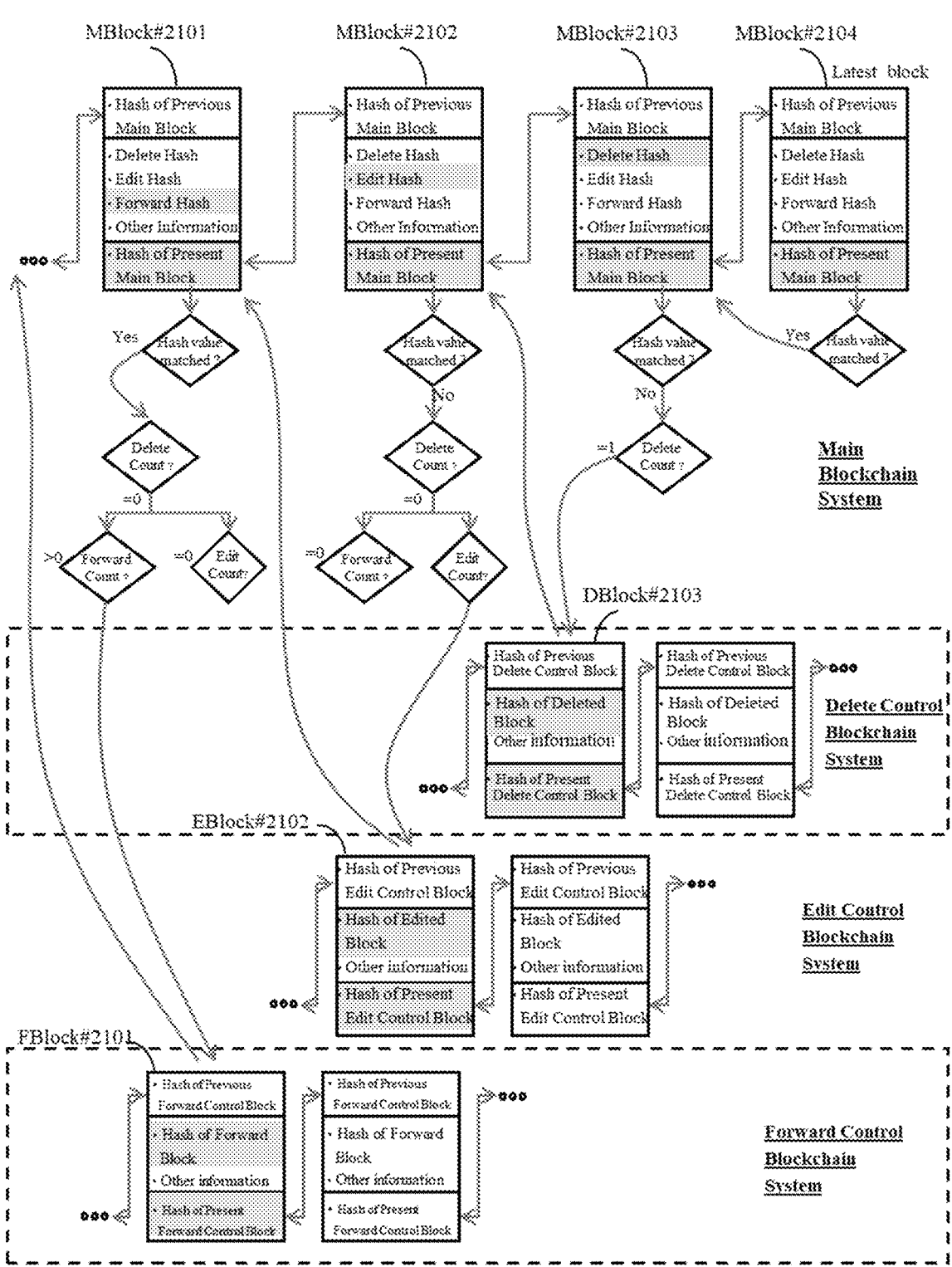
FIG. 19 shows a method of authenticating blockchain data according to an embodiment of the present invention.

FIG. 19 shows a method of authenticating blockchain data according to an embodiment of the present invention. The method shown in FIG. 19 involves tracing a main blockchain line to verify the correctness of data within a particular main blockchain line.

Initially, the desired main blockchain line on which to perform traceability is selected. The system will limit to check only for those main blocks of which Dimension field meeting the criteria.

Then, the latest main block within the main blockchain line is selected, facilitating by the linked list to point the latest main block. It is also possible to find the latest block by using Timestamp value.

The data inside the latest block is processed through the hash function and compared with Hash of Present Main Block.

There are 5 possible cases following the comparison of the hash function with the Hash of Present Main Block.

Case 1: If matched, it confirms that data inside the main block is correct. The system will then go through to check the preceding main blocks one after another. As shown in FIG. 19, MBlock #2104 is the latest main block. When the data inside the main block is processed through the hash function and found that "hash value" derived from the hash function of the data inside the block="hash value" at Hash of Present Main Block field. This indicates that the data inside MBlock #2104 is correct.

"Process of accessing through the previous main block" starts with the system retrieving the hash value of the previous main block, which is stored in the Hash of Previous Main Block. The linked list is checked using the hash value of the previous main block as an internal pointer to access through the previous main block, whose present hash value is matched. As shown in FIG. 19, the Hash of Previous Main Block of MBlock #2104 is used as the internal pointer to Hash of Present Main Block of MBlock #2103. The data inside the main block (the desired previous main block) is processed through the hash function and compared with Hash of Present Main Block of its own and the process continues.

Case 2: If Delete Count="1", the data inside the main block has been deleted with the delete-command block. The value of the delete-command block, which is stored at Delete Hash field is then retrieved. The linked list is checked using the hash value of the delete-command block as an internal pointer to access the delete-command block, whose Hash of Present Delete Control Block is matched. In some implementations, the system can check the linked list by using "Hash of Present Main Block" as an internal pointer to access through the delete-command block, whose "Hash of Deleted Block" is matched.

The data inside the delete-command block is then checked using the hash function and compared with Hash of Present Delete Control Block. If matched, this confirms that data inside the delete-command block is correct and the deletion of data inside the Data segment of the main block was performed correctly. The system will then go through checks on the previous main blocks one after another.

As shown in FIG. 19, MBlock #2103 is the previous main block. When the data inside the main block is processed through the hash function and found that "hash value" derived from the hash function of data inside MBlock #2103+"hash value" at Hash of Present Main Block field. This indicates that the data inside MBlock #2103 is incorrect and the data has been changed. When checking and finding that Delete Count="1", this indicates that the data inside Data segment of MBlock #2103 has been deleted. The value at Delete Hash field of MBlock #2103 is used as the internal pointer to Hash of Present Delete Control Block of the delete-command block, to access the delete-command block DBlock #2103. Alternately the value at Hash of Present Main Block field of MBlock #2103 is used as the internal pointer to Hash of Deleted Block of the delete-command block, to access the delete-command block DBlock #2103. The data inside the delete-command block DBlock #2103 is processed with the hash function and if it is found that "hash value" derived from the hash function of data inside DBlock #2103="hash value" at Hash of Present Delete Control Block field, this indicates that the delete-command block DBlock #2103 is correct and the deletion of the data inside Data segment of MBlock #2103 was performed with correctness. In this case, the system will proceed to process the preceding main block.

If Delete Count="0", the data inside the main block has not been deleted. The system will continue to check Forward Count field and Edit Count field.

Case 3: If Delete Count="0" and Forward Count="0" but Edit Count>"0", the data inside the main block has been edited with the edit-command block. The hash value of the edit-command block, which is stored at Edit Hash field is retrieved. The linked list is checked using the hash value of the edit-command block as an internal pointer to access the edit-command block, whose Hash of Present Edit Control Block is matched. In some implementations, the system can check the linked list using "Hash of Present Main Block" as an internal pointer to access the edit-command block, whose "Hash of Edited Block" is matched. The data inside the edit-command block is processed with the hash function and compared with Hash of Present Edit Control Block. If matched, it confirms that data inside the edit-command block is correct and the modification of data inside Data segment of the main block was performed with correctness. The system will then go through to check the preceding main blocks one after another.

As shown in FIG. 19, MBlock #2102 is currently the previous main block. When the data inside the main block is processed with the hash function and if it is found that "Hash value" derived from the hash function of data inside MBlock #2102+"hash value" at Hash of Present Main Block field, this indicates that the data inside MBlock #2102 is incorrect and the data has been changed. When checking and finding that Delete Count="0", it indicates that the data inside Data segment of MBlock #2102 has not been deleted. When checking and finding that Edit Count>"0" while Forward Count=0, it indicates that the data has been modified by the edit-command block. The value at Edit Hash field of MBlock #2102 is used as the internal pointer to Hash of Present Edit Control Block of the edit-command block, to access the edit-command block EBlock #2102. Alternatively, the value at Hash of Present Main Block field of MBlock #2102 is used as the internal pointer to Hash of Edited Block of the edit-command block, to access through the edit-command block EBlock #2102. The data inside the edit-command block EBlock #2102 is processed with the Hash function and if it is found that "hash value" derived from the hash function of data inside EBlock #2102="hash value" at Hash of Present Edit Control Block field, this indicates that the edit-command block EBlock #2102 is correct and the modification of data inside Data segment of MBlock #2102 was performed with correctness. In this case, the system will proceed for "Process of accessing through the previous main block" to access through the preceding main block for next verification.

Case 4: If Delete Count="0" and Edit Count="0" but Forward Count>"0", the data inside the main block has been forwarded with the forward-command block. The hash value of the forward-command block, which is stored at Forward Hash field is retrieved. The linked list by using the hash value of the forward-command block as an internal pointer is checked to access through the forward-control block whose Hash of Present Forward Control Block is matched. In some implementations, the system can check the linked list by using "Hash of Present Main Block" as an internal pointer to access through the forward-command block, whose "Hash of Forwarded Block" is matched. The data inside the forward-command block is processed with the hash function and compared with Hash of Present Forward Control Block. If matched, this confirms that data inside the forward-command block is correct and the transmission of data from Data segment of the main block was performed with correctness. The system will then go through to check the preceding main blocks one after another.

As shown in FIG. 19, MBlock #2101 is currently the previous main block. When the data inside the main block is processed through the hash function and if it is found that "hash value" derived from the hash function of data inside MBlock #2101="hash value" at Hash of Present Main Block field, this indicates that the data inside MBlock #2101 is correct and the data has not been changed. When checking and finding that Delete Count="0" and Forward Count>"0" while Edit Count="0", this indicates that the data has been forwarded by the forward-command block. The value at Forward Hash field of MBlock #2101 is used as the internal pointer to Hash of Present Forward Control Block of the forward-command block, to access through the forward-command block FBlock #2101. Alternately, the value at Hash of Present Main Block field of MBlock #2101 is used as the internal pointer to Hash of Forwarded Block of the forward-command block, to access through the forward-command block FBlock #2101. The data inside the forward-command block FBlock #2101 is processed with the hash function and if it is found that "hash value" derived from the hash function of data inside FBlock #2101="hash value" at Hash of Present Forward Control Block field, this indicates that the forward-command block FBlock #2101 is correct and the transmission of data from Data segment of MBlock #2101 was performed with correctness. In this case, the system will proceed for "Process of accessing through the previous main block" to access through the preceding main block for next verification.

Case 5: This is a combination of Case No. 3 and Case No. 4 which Delete Count="0" while Edit Count>"0" and Forward Count>"0", this indicates that the original data was edited and forwarded to other user in the system. The verification requires both processes of Case No. 3 and Case No. 4 as follows: The value at Edit Hash field of the main block is used as the internal pointer to Hash of Present Edit Control Block of the edit-command block, to access through the edit-control block. Then, the data inside the edit-command block is processed the hash function and compared with Hash of Present Edit Control Block. If there is a match, this confirms that data inside the edit-command block is correct and the modification of data inside Data segment of the main block was performed with correctness. The value at Forward Hash field of the main block is used as the internal pointer to Hash of Present Forward Control Block of the forward-command block, to access through the forward-command block. Then the data inside the forward-command block is processed with the hash function and compared with Hash of Present Forward Control Block. If there is a match, this confirms that data inside the forward-command block is correct and the transmission of data from Data segment of the main block was performed with correctness.

The system will continue to verify the preceding main blocks one after another, by taking "Process of accessing through the previous main block" and applying the cases 1 to 5, until the genesis main block is reached. Once the genesis main block is reached, this confirms that data inside all blocks within the desired main blockchain line is correct.

Figure 20:
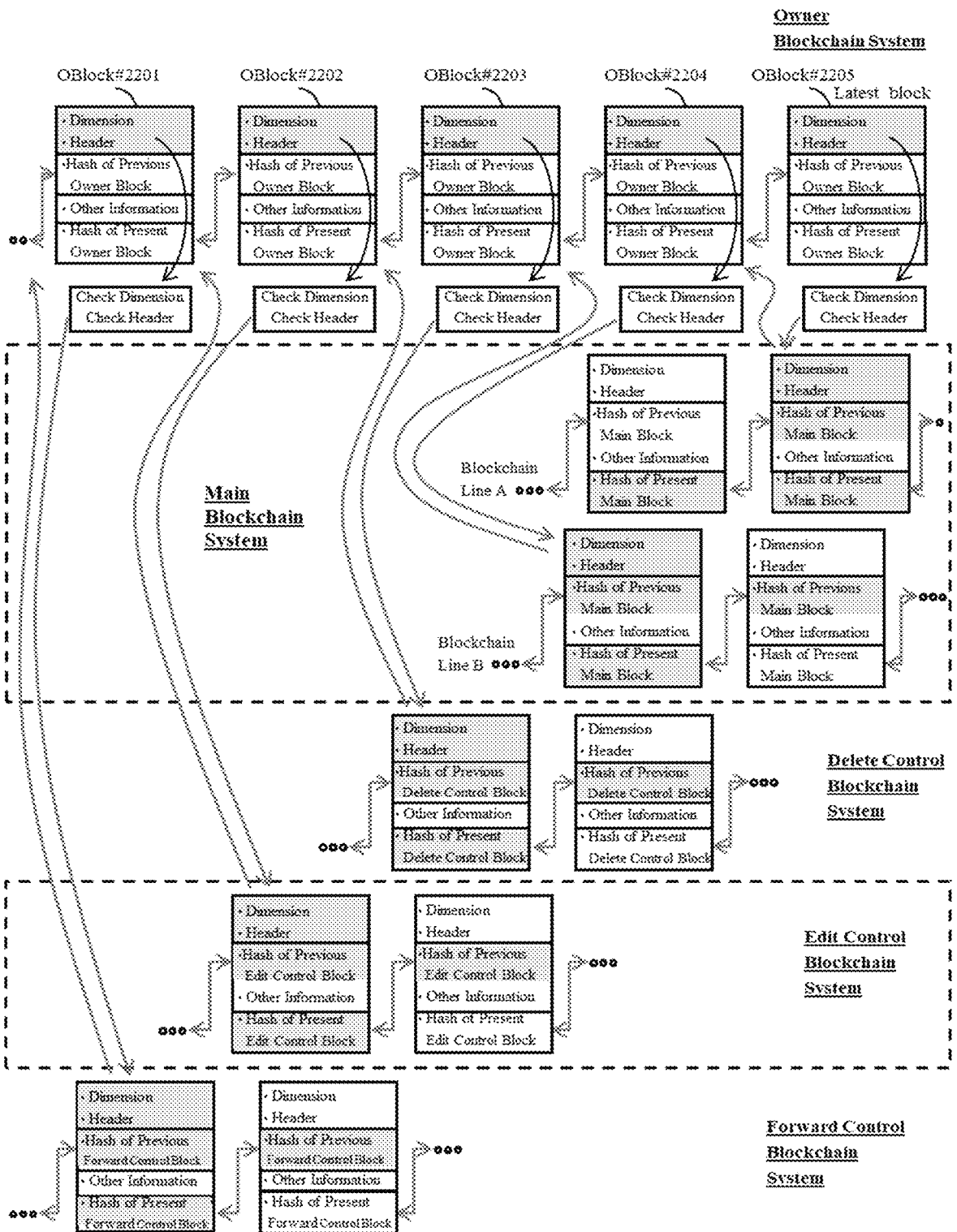
FIG. 20 shows a method of authenticating blockchain data according to an embodiment of the present invention.

FIG. 20 shows a method of authenticating blockchain data according to an embodiment of the present invention. The method shown in FIG. 20 involves tracing data insider owner blocks of a specific data owner.

Initially, the desired owner blockchain line within Owner Blockchain System is selected to perform traceability. The system will limit to check only for those blocks of which Data Owner field meeting the criteria. Then, the latest owner block within the owner blockchain line is selected by using the linked list to point the latest owner block. It is also possible to find the latest owner block using Timestamp value.

The preliminary verification starts in which the system processes the data of the owner block through the hash function and compare it with the hash value which is stored inside its own block, depending on type, as follows. For Main Blockchain System, it is stored at Hash of Present Main Block field. For Delete Control Blockchain System, it is stored at Hash of Present Delete Control Block field. For Edit Control Blockchain System, it is stored at Hash of Present Edit Control Block field. For Forward Control Blockchain System, it is stored at Hash of Present Forward Control Block field.

If there is a match, the data passes the preliminary verification. Then, the data at Dimension field and Header field are read to go to the blockchain line with the same Dimension and go to the block at the same Header. There are 5 possible cases.

Case 1: Dimension a Main Blockchain System. As shown in FIG. 20, OBlock #2205 is the latest block. After checking its Dimension field, it specifies for a type of Main Blockchain System, and within the main blockchain line of "A". "Verifying the block before" is performed by retrieving the hash value of the previous block, which is stored at the Hash of Previous Main Block field. The linked list is checked using the hash value of the previous block as an internal pointer to access the previous block, whose present hash value is matched. The data inside the block (the desired previous main block) is processed with the hash function and compared with Hash of Present Main Block. If there is a match, this indicates that data inside the previous main block is correct. "Verifying the block after" is performed by retrieving the hash value which is stored at the Hash of Present Main Block field. The linked list is checked using the hash value of the present block as an internal pointer to access through the immediate next block, whose Hash of Previous Main Block is matched. The data inside the block (the desired immediate next main block) is processed with the hash function and compared with Hash of Present Main Block. If there is a match, this indicates that data inside the immediate next main block is correct. It confirms that the owner block is truly within that particular main blockchain line of Main Blockchain System. The "Process of accessing through the previous owner block" starts with the system retrieving the hash value of the previous owner block, which is stored in the Hash of Previous Owner Block. The linked list is checked using the hash value of the previous owner block as an internal pointer to access the previous owner block, whose Hash of Present Owner Block is matched. It then becomes the current-focused block for verification.

As shown in FIG. 20, the Hash of Previous Owner Block of OBlock #2205 is used as the internal pointer to Hash of Present Owner Block of OBlock #2204. The system will proceed for "The preliminary verification" of the current-focused block. If there is a match, it passes the preliminary verification. The data at Dimension field and Header field is read to go through the blockchain line with the same Dimension and go to the block at the same Header.

Case 2: Dimension specifies a Main Blockchain System, but in a different main blockchain line. As shown in FIG. 20, OBlock #2204 is the current-focused block for verification. After checking its Dimension field, it specifies for a type of Main Blockchain System, and within the main blockchain line of "B". "Verifying the block before" and "Verifying the block after" in the same manner of Case 1. If there is a match, this confirms that the current-focused owner block is truly within that particular main blockchain line of Main Blockchain System. The system will then proceed for "Process of accessing through the previous owner block" to access through the previous owner block for next verification.

As shown in FIG. 20, the Hash of Previous Owner Block of OBlock #2204 is used as the internal pointer to Hash of Present Owner Block of OBlock #2203. The system then proceeds to "The preliminary verification" of the current-focused block. If there is a match, it passes the preliminary verification. The data at Dimension field and Header field are then read to go to the blockchain line with the same Dimension and go to the block at the same Header.

Case 3: Dimension specifies a Delete Control Blockchain System. As shown in FIG. 20, OBlock #2203 is the current-focused block for verification. After checking its Dimension field, it specifies for a type of Delete Control Blockchain System. "Verifying the block before" and "Verifying the block after" are performed in the same manner as described above in Case 1, using Hash of Previous Delete Control Block and Hash of Present Delete Control Block as internal pointers to access the desired blocks within Delete Control Blockchain System. If there is a match, this confirms that the current-focused owner block is truly within Delete Control Blockchain System. The system then proceeds to "Process of accessing through the previous owner block" to access the previous owner block for next verification. As shown in FIG. 20, the Hash of Previous Owner Block of OBlock #2203 is used as the internal pointer to Hash of Present Owner Block of OBlock #2202. The system then proceeds to "The preliminary verification" of the current-focused block. There is a match, it passes the preliminary verification. The data at Dimension field and Header field are read to go to the blockchain line with the same Dimension and go to the block at the same Header.

Case 4: Dimension specifies an Edit Control Blockchain System. As shown in FIG. 20, OBlock #2202 is the current-focused block for verification. After checking its Dimension field, it specifies an Edit Control Blockchain System. "Verifying the block before" and "Verifying the block after" are performed in the same manner as Case 1, using Hash of Previous Edit Control Block and Hash of Present Edit Control Block as internal pointers to access the desired blocks within Edit Control Blockchain System. If there is a match, this confirms that the current-focused owner block is truly within Edit Control Blockchain System. The system then proceeds to "Process of accessing through the previous owner block" to access the previous owner block for next verification.

As shown in FIG. 20, Hash of Previous Owner Block of OBlock #2202 is used as the internal pointer to Hash of Present Owner Block of OBlock #2201. The system proceeds to "The preliminary verification" of the current-focused block. If there is a match it passes the preliminary verification. The data at Dimension field and Header field are read to go to the blockchain line with the same Dimension and go to the block at the same Header.

Case 5: Dimension specifies a Forward Control Blockchain System. As shown in FIG. 20, OBlock #2201 is the current-focused block for verification. After checking its Dimension field, it specifies for a Forward Control Blockchain System. "Verifying the block before" and "Verifying the block after" are performed in the same manner as Case 1, using Hash of Previous Forward Control Block and Hash of Present Forward Control Block as internal pointers to access the desired blocks within Forward Control Blockchain System. If there is a match, this confirms that the current-focused owner block is truly within Forward Control Blockchain System.

The system will continue to verify the previous owner blocks one after another, by "Process of accessing through the previous owner block", "The preliminary verification" and applying Case 1 to Case 5, until the genesis owner block is reached. Once the end at the genesis owner block is reached, this confirms that all data inside the owner blocks of the desired owner is correct.

The traceability system within Multi Dimension Blockchain System would operate in 2 approaches. The first approach is to operate automatically. The system will automatically perform the traceability at every specified period, such as every day, every week or every two weeks. The traceability will carry on as follows:

Operate with the method shown in FIG. 18: Traceability for the completeness of the data blocks within a particular blockchain line. Start with Main Blockchain System for all blockchain lines. Continue with Delete Control Blockchain System. Continue with Edit Control Blockchain System. Continue with Forward Control Blockchain System. Continue with Owner Blockchain System for all blockchain lines of each data owner.

In some implementations, the system may not perform the traceability of Owner Blockchain System since all the owner blocks are already overlapping within Main Blockchain System and Control Blockchain System.

Operate with the method shown in FIG. 19: Traceability for the correctness of data inside the main block within a particular main blockchain line. Verify all main blockchain lines within Main Blockchain System.

Operate with the method shown in FIG. 20: Traceability for the correctness of data inside the owner block of each particular data owner. Verify all owner blockchain lines of each data owner within Owner Blockchain System. In some implementations, the system may perform only with the method shown in FIG. 18 and the method shown in FIG. 19, but not with the method shown in FIG. 20, because Owner Blockchain System already overlaps with Main Blockchain System and Control Blockchain System.

In some implementations, a random verification for some groups of blockchain lines in each round may be performed, without verification for all at one time. Those groups which have been verified in this round, will be waived for the next rounds of verification, until that all the rest of the groups are verified.

The second approach is to operate manually. A person will command for the execution of traceability as desired, associated with his or her right on the data block. The process of manual traceability is as follows:

A person with identity in the system 131 selects the functionality of "Traceability" and selects the sub-function of "Verify a data block within a blockchain line". Then, the desired block is selected. Ownership of the block may be required to select the desired block for verification. The system will then perform verification with the method shown in FIG. 18. The verification goes through the whole line of that selected block. The system will continue to perform the method shown in FIG. 19. The system will then present the result of the traceability. If everything is correct, "Correctness", is reported. If something wrong is identified "Data Error" is reported and the anomalies found from the verification are indicated.

The user may also select: "Verify the owner blockchain line by the owner". Then the system will perform verification with the method shown in FIG. 18 of the data blocks within a particular blockchain. The verification will go through the whole owner blockchain line associated with the data owner. The system will also perform verification with the method shown in FIG. 20. The system will present the result of the traceability. "Correct" is reported is everything is correct and "Data Error" is reported along with indications of the anomalies found from the verification, if something wrong is identified.

All these traceability system helps to confirm the correctness and help to find out if there is an error in the local storage record of each Node, which may come from malfunction or any attack by malicious persons. Therefore, the correction and updating good data can be enabled promptly.

The data blocks are stored on the distributed database of all Nodes within Multi Dimension Blockchain System. Each Node consistently has the same processing program and database system. However, to ensure the consistency and correctness of the data blocks within the Multi Dimension Blockchain System, there are requirements and procedures of data reconciliation between all Nodes, along with the correction and updating good data if required.

The requirements for reconciling the data blocks between all Nodes are as follows: Every Node broadcasts the data blocks being stored in their database system at every specified period, such as every day, every week or every two weeks. Every Node receives those data blocks to compare with the data blocks being stored at their stations. Verification for each single data block is performed repeatedly by comparing with the same data block receiving from different Nodes, until getting verification result of correctness more than a specified number. Then it is counted that the validity of the aforementioned data block has been verified.

In some implementations, the system may specify the verification result of correctness more than half of total number of active Nodes. Once the verification is completed for all data blocks within the blockchain line, the system will record the verification time. If a verification result of mismatch is more than the specified number, then the data block is treated as an unverified data block. Further verification is performed on the unverified data block. If an anomaly is found, the data block is updated with the correct one and the anomaly is recorded. If an anomaly is not found, the system will report it to the person who owns or controls the Node for further investigation. A verification result of mismatch will be broadcast to other Nodes for the following benefits: To recognize which Nodes send anomalous data blocks into the system. To recognize which Nodes have recorded unverified data blocks. To recognize which unverified data blocks have not been discovered for any anomalies after further verification.

The person who owns or controls the Node, whose unverified data blocks have not been discovered, must proceed for finding the root cause and report to every other Nodes for acknowledgment. The persons who own or control the Nodes, jointly consider for correcting, improving or taking any actions against the issues, such as improving to new version of the program, or removing the Nodes with consistency of anomalous data blocks out of the system, etc.

The procedure for reconciling the data blocks between Nodes consists of automatic operations by the program and actions taken by persons who own or control the Nodes as follows.

The procedure of an automatic verification and correction by the program is as follows: The Node broadcasts the data blocks being stored in its database system. The Node receives those data blocks from other Nodes to compare with the data blocks being stored at its Node. Verification for each single data block is performed repeatedly until a verification result of correctness more than the specified number is achieved. Then it is considered that the validity of the data block has been verified. The verification for all data blocks within the blockchain line is completed. Then the system will record the verification time. If verification result has mismatch that is more than the specified number, then the data block is treated as an unverified data block. The system will examine the data inside the block to find the error portion. In a case when the hash value of the previous block being stored inside its own block is not matched, this indicates that the link is accessing through a totally different previous block. The linked list is checked using the hash value of the previous block as an internal pointer to access through the previous block, whose present hash value is matched. If the previous block is not found, it confirms that only the particular block is an error. Then the database system can be updated using the good data block from other Nodes. If the previous block is found, repeated accessing through the prior previous block, one after another, is performed until the genesis block is reached. If the genesis block, associated with rules and conditions of that blockchain line, is not found, this indicates that the blockchain line is not genuine in the system. In this case, the database system by using the good blockchain line from other Nodes.

In case in which another part of data (beside the hash value of the previous block) is not matched, this indicates there may be a change on this part of data. A comparison is performed with of the hash value of the present block being stored inside its own block. If not matched, this indicates that the particular block is an error. Then the block can be update using the good data block from other Nodes. If there is a match of the hash value, then parts of data which have not been processed through the hash function are verified. If those parts of data are not matched, this indicates that the particular block is an error. Again, the block on the node is updated using the good data block from other Nodes. If those other parts of data are matched, the data of the block is processed with the hash function and compared with the hash value of present block being stored inside its own block. If there is no matched, this indicates that the particular block is an error. the block on the node is updated using the good data block from other Nodes. If those hash values are matched, this indicates that there is something wrong with the system. It urgently requires the persons who own or control the Nodes to take a corrective action jointly. Then, the verification result of mismatch will be broadcast to other Nodes for the following acknowledgements: Recognize which Nodes send anomalous data blocks into the system; Recognize which Nodes have recorded unverified data blocks; Recognize which unverified data blocks have not been discovered for any anomalies after further verification.

The procedure of verification and corrective actions taken by persons with identity in the system who owns or controls the Nodes is as follows: Persons who own or control the Nodes receive a notification message and report of verification result of mismatch for Nodes broadcasting and storing the anomalous data blocks. Those persons carry out a joint investigation to find out the cause of the malfunction and agree on the corrective action. In some implementation, they may agree to improve and upgrade the program. Then a joint investigation is carried out on those Nodes with issues of broadcasting and storing the anomalous data blocks. Then agree on warning or punishment. In some implementations, if the mistake took place with intention, it may be punished by terminating and eliminating both the Node and the person who owns or control the Node out of the system. Persons who own or control the Nodes receive a notification message and report of verification result of mismatch for unverified data block not being discovered for any anomalies.

The digital document inside a data block within Multi Dimension Blockchain System is stored with a stability and security system and it is difficult to falsify and edit by any persons who have a malicious intension. The data block is distributed for its storage on every Nodes which have reconciled for its correctness periodically. Eventually, the digital data inside the data block can still be retrieved and accessed for use as an original one without a change on it. However, some work environments require a printout document (on paper). Therefore, it needs to have procedures and requirements for printing out so that the printout (paper) will have the same effect as the original document.

Figure 21:
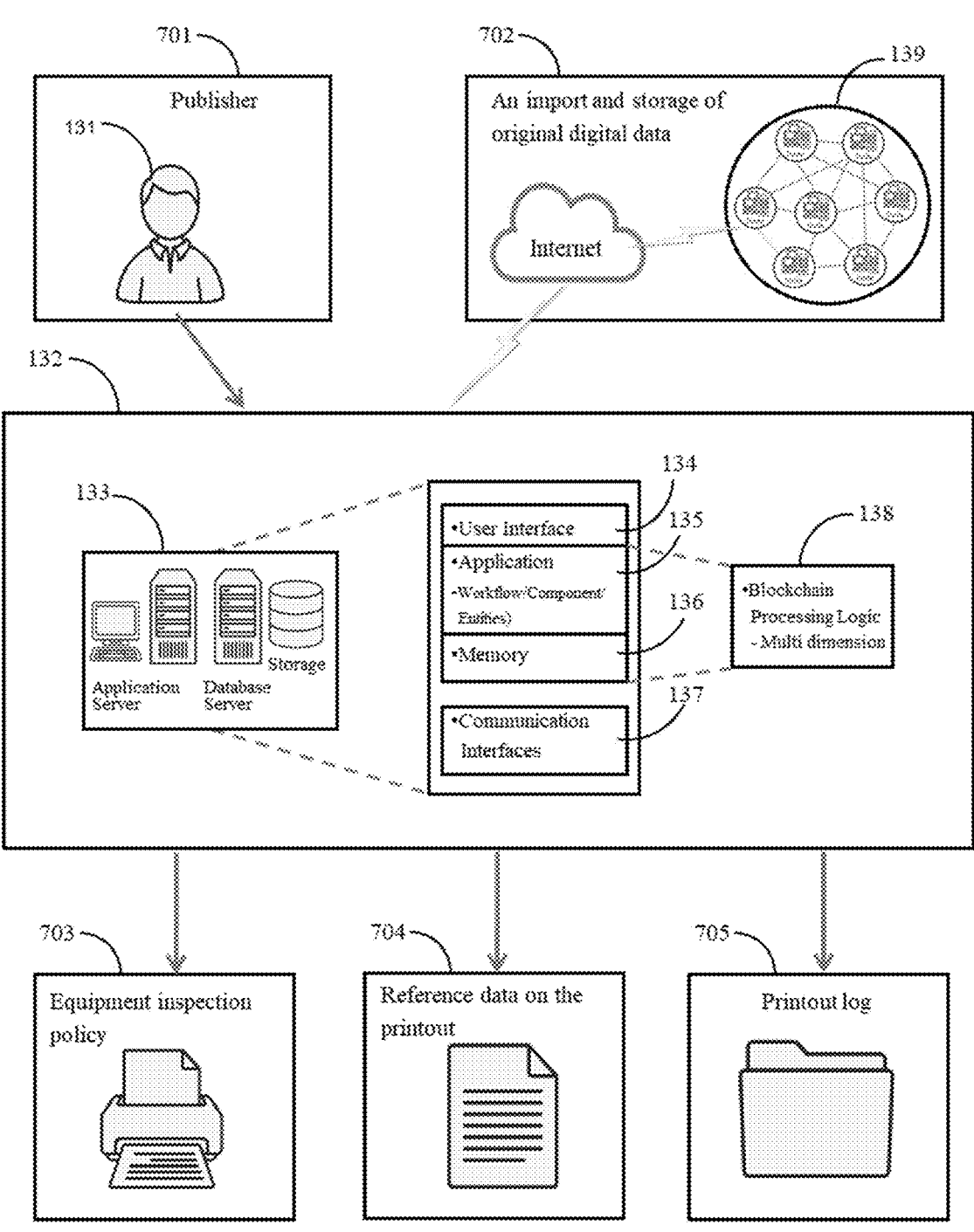
FIG. 21 shows a system for managing printout from a Multi Dimension Blockchain System according to an embodiment of the present invention.

FIG. 21 shows a system for managing printout from a Multi Dimension Blockchain System according to an embodiment of the present invention.

The system interacts with a publisher 701. The publisher may be the owner of the digital data and it is limited to print out his or her digital data only from the Node 132 or a digital data controller who owns or controls the Node 132 being operated for printing out, with the permission of the data owner. Import and storage of original digital data 702 takes place by interacting with nodes 139 of the blockchain system. The digital data to be printed out is stored in a data block within Multi Dimension Blockchain System. Therefore, the import of publication's original digital data falls into one of these following categories. (I) It starts with an initial data which the other Node broadcasts into the system. Then the Node imports and examines it. Eventually the Node earns the right to creating it as a prototype block, before storing it in its own database system, and broadcasting it to other Nodes. (This is the data block which the Node creates by itself.) (II) It is a prototype block which has been created and broadcasted by the other Node, who has the right to create the prototype block. Then the Node imports and examines it, before storing it in the database system. (This is the data block which the Node receives from the other after creation.) (III) It is a data block which the other Node broadcasts into the system for reconciliation process. Then the Node imports and uses it through reconciliation process. Once the Node finds the error on its own data block, the updating for the correct data block is taking place. Eventually the imported correct one is stored in the database system. (This is the data block which the Node updates for correction after the reconciliation process.)

The system stores an Equipment inspection Policy 703. This comprises a register of all equipment and devices associated with the printing out process, such as a list of printers; a list of preventive maintenance, testing and inspection of registered equipment and devices, associated with method and duration of each activity and a record of the practices of preventive maintenance, testing, inspection, repair and replacement with details specifying by whom and when the practices were operated.

In some implementations, there may be a common blockchain line to keep record of all Nodes for their practices of equipment inspection policy. This helps to confirm the compliance of each Node for its practices on printing-out requirements.

Reference data on the printout 704: To generate the printout, if the publisher wishes some reference data to appear on the printout, there will be one or more selections of reference as follows: Printout comes from which blockchain line, such as specifying Dimension. Printout comes from which data block, such as specifying Header. Printout comes from which Node. Printout is prepared by whom and in which status, such as data owner or Node controller who get the permission from the data owner. Printout comes from which printer, such as specifying the equipment number as registered under the equipment inspection policy. Printout is generated on which date and at which time.

Printout log 705: when the printout is generated, the system will keep the record of printing out in the printout log, with at least the following information. The original data comes from which blockchain line and which data block. The Node which generates the printout. The person who generates the printout, and in which status (data owner or Node controller). The printer which generates the printout. Time of printing out.

The process of printing out is as follows: A person with identity in the system 131 who owns or controls the Node 132 turns on the program of Multi Dimension Blockchain System on the computer system 133 and goes to functionality of "Printout management" and selects a sub-function of "Generating a printout". They select the desired blockchain line and the data block which store the desired original data for printout. They then select: the original data which the person has the right to access for printing out; the references which to appear on the printout; and the printer which is registered under the equipment inspection policy. Then the printer will generate the printout document. The system will record the detail of printing-out process and relevant information in the printout log. Generating a printout, complying with the aforementioned requirements and procedures, ensures that the printout is correctness and consistent with the original data stored inside the data block within Multi Dimension Blockchain System, with traceability to source of data as well as to a person, a Node and time generating the printout.

Whilst the foregoing description has described exemplary embodiments, it will be understood by those skilled in the art that many variations of the embodiments can be made within the scope and spirit of the present invention.

The invention claimed is:

1. A method of modifying data stored in a blockchain system, the blockchain system comprising a main blockchain system comprising a main blockchain comprising a target block in which the data to be modified is stored, a control blockchain system comprising a modify control blockchain and an owner blockchain comprising a plurality of owner blockchains each corresponding to a respective user of the blockchain system, the main blockchain, the modify control blockchain and the owner blockchain being stored on a plurality of nodes of the blockchain system, the method comprising:

receiving a modify command request, the modify command request comprising an indication of the target block, an indication of a modify command and an indication of a user requesting the command;

creating a new modify control block on the modify control blockchain, the new modify control block comprising an indication of a hash value of the target block of the main blockchain;

determining a hash value of the new modify control block;

broadcasting the new modify control block to the nodes of the blockchain system, wherein, in response to receiving the new modify control block, the nodes of the blockchain system modify data stored in the target block of the main blockchain according to the modify command and store an indication of the hash value of the new modify control block in the target block of the main blockchain; and creating a new owner block on the owner blockchain corresponding to the user, the new owner block comprising an indication of the hash value of the new modify control block.

2. The method according to claim 1, wherein the indication of the target block is generated in response to a user selection on the owner blockchain corresponding to the user of an owner block which stores a hash value of the target block on the main blockchain.

3. The method according to claim 1, wherein, in response to receiving the new modify control block, the nodes of the blockchain system increase a modify count indicator stored in the target block of the main blockchain.

4. The method according to claim 1, wherein the new modify control block further comprises an indication of a hash value of an owner block immediately preceding the new owner block on the owner blockchain corresponding to the user.

5. The method according to claim 1, wherein the modify command request is a delete command request.

6. The method according to claim 1, wherein the modify command request is an edit command request.

7. A method of forwarding data stored in a blockchain system, the blockchain system comprising a main blockchain system comprising a main blockchain comprising a target block in which the data to be modified is stored, a control blockchain system comprising a forward control blockchain and an owner blockchain comprising a plurality of owner blockchains each corresponding to a respective user of the blockchain system, the main blockchain, the forward control blockchain and the owner blockchain being stored on a plurality of nodes of the blockchain system, the method comprising:

receiving a forward command request, the forward command request comprising an indication of the target block, an indication of a forward command and an indication of a user requesting the command;

creating a new forward control block on the forward control blockchain, the new forward control block comprising an indication of a hash value of the target block of the main blockchain;

determining a hash value of the new forward control block;

forwarding data stored in the target block of the main blockchain according to the forward command;

broadcasting the new forward control block to the nodes of the blockchain system, wherein, in response to receiving the new forward control block, the nodes of the blockchain system store an indication of the hash value of the new forward control block in the target block of the main blockchain; and creating a new owner block on the owner blockchain corresponding to the user, the new owner block comprising an indication of the hash value of the new forward control block.

8. The method according to claim 7, wherein the indication of the target block is generated in response to a user selection on the owner blockchain corresponding to the user of an owner block which stores a hash value of the target block on the main blockchain.

9. The method according to claim 7, wherein, in response to receiving the new forward control block, the nodes of the blockchain system increase a forward count indicator stored in the target block of the main blockchain.

10. The method according to claim 7, wherein the new forward control block further comprises an indication of a hash value of an owner block immediately preceding the new owner block on the owner blockchain corresponding to the user.

11. A method of authenticating data stored in a blockchain system, the blockchain system comprising a main blockchain system comprising a main blockchain comprising a target block in which the data to be authenticated is stored, a control blockchain system comprising a modify control blockchain and an owner blockchain comprising a plurality of owner blockchains each corresponding to a respective user of the blockchain system, the main blockchain, the modify control blockchain and the owner blockchain being stored on a plurality of nodes of the blockchain system, the method comprising:

identifying that a block of the main blockchain has been modified;

accessing a modify control block of the modify control blockchain;

authenticating the modify control block of the modify control blockchain; and authenticating the modified block based on the result of authenticating the modify control block of the modify control blockchain.

12. The method according to claim 11, wherein identifying that a block of the main blockchain has been modified comprises applying a hash function to the block and comparing the result with a hash value stored in the block.

13. The method according to claim 11, wherein assessing a modify control block of the modify control blockchain comprises using a hash value of the modify control block stored in the block of the main blockchain as a pointer.

14. The method according to claim 11, wherein assessing a modify control block of the modify control blockchain comprises using a hash value of the block of the main blockchain as a pointer.

15. The method according to claim 11, wherein identifying that the block has been modified further comprises accessing a modify count indicator stored in the target block of the main blockchain.

16. A non-transitory computer readable medium carrying computer executable instructions which when executed by a processor cause the processor to carry out a method according to claim 1.

17. A data processing system configured to carry out a method according to claim 1.

18. A portable communication device configured to carry out a method according to claim 1.

* * * * *